(12) United States Patent
Ludwig et al.

(10) Patent No.: US 9,019,237 B2
(45) Date of Patent: Apr. 28, 2015

(54) MULTITOUCH PARAMETER AND GESTURE USER INTERFACE EMPLOYING AN LED-ARRAY TACTILE SENSOR THAT CAN ALSO OPERATE AS A DISPLAY

(75) Inventors: Lester F. Ludwig, San Antonio, TX (US); Seung Eun Lim, San Francisco, CA (US)

(73) Assignee: Lester F. Ludwig, San Antonio, TX (US)

( * ) Notice: Subject to any disclaimer, the term of this patent is extended or adjusted under 35 U.S.C. 154(b) by 821 days.

(21) Appl. No.: 12/418,605

(22) Filed: Apr. 5, 2009

(65) Prior Publication Data
US 2009/0254869 A1    Oct. 8, 2009

Related U.S. Application Data

(60) Provisional application No. 61/123,217, filed on Apr. 6, 2008, provisional application No. 61/097,869, filed on Sep. 18, 2008, provisional application No. 61/199,896, filed on Nov. 20, 2008, provisional application No. 61/210,809, filed on Mar. 23, 2009.

(51) Int. Cl.
| | |
|---|---|
| G06F 3/042 | (2006.01) |
| G06F 3/038 | (2013.01) |
| G06F 3/0488 | (2013.01) |
| G06K 9/00 | (2006.01) |

(52) U.S. Cl.
CPC ............ *G06F 3/038* (2013.01); *G06F 3/04883* (2013.01); *G06K 9/00375* (2013.01)

(58) Field of Classification Search
None
See application file for complete search history.

(56) References Cited

U.S. PATENT DOCUMENTS

| | | |
|---|---|---|
| 4,692,739 A | 9/1987 | Dorn |
| 4,748,676 A | 5/1988 | Miyagawa |
| 4,899,137 A | 2/1990 | Behrens et al. |

(Continued)

FOREIGN PATENT DOCUMENTS

| | | |
|---|---|---|
| EP | 0 574 213 A1 | 12/1993 |

OTHER PUBLICATIONS

Dulberg, M. S., et al. An Imprecise Mouse Gesture for the Fast Activation of Controls, IOS Press, Aug. 1999, [online] [retrieved on Jul. 9, 2013] URL: http://www.csc.ncsu.edu/faculty/stamant/papers/interact.pdf.gz, 10 pgs.

(Continued)

*Primary Examiner* — Joseph Haley
*Assistant Examiner* — Ifedayo Iluyomade

(57) ABSTRACT

A user interface employs a tactile sensor comprising an LED array, the user interface producing a rich flux of independently-adjustable interactive control parameters, rates of change, and symbols derived from these as well as tactile shapes, patterns, gestures, syntaxes, and phrases from each of one or more regions of contact or proximity. At least three independently-adjustable interactive real-time control parameters, plus rates and symbols, from the touch of a single finger tip. Running sums can be employed during scans so individual sensor measurements need not be stored. The tactile sensor array can be partitioned into sections or modules with separate scanning loops and/or processors. The LED array can serve as a visual display. To reject ambient light, the LED array can be configured to emit and respond to modulated light reflected from a user finger to LEDs configured, at least at a moment of measurement, to act as a photodiode.

20 Claims, 40 Drawing Sheets

(56) References Cited

U.S. PATENT DOCUMENTS

| | | |
|---|---|---|
| 5,237,647 A | 8/1993 | Roberts et al. |
| 5,270,711 A | 12/1993 | Knapp |
| 5,292,999 A | 3/1994 | Tumura |
| 5,341,133 A | 8/1994 | Savoy |
| 5,347,295 A | 9/1994 | Agulnick et al. |
| 5,357,048 A | 10/1994 | Sgroi |
| 5,378,850 A | 1/1995 | Tumura |
| 5,386,219 A | 1/1995 | Greanias |
| 5,420,936 A | 5/1995 | Fitzpatrick |
| 5,440,072 A | 8/1995 | Willis |
| 5,442,168 A | 8/1995 | Gurner et al. |
| 5,459,282 A | 10/1995 | Willis |
| 5,471,008 A | 11/1995 | Fujita et al. |
| 5,475,214 A | 12/1995 | DeFranco et al. |
| 5,565,641 A | 10/1996 | Gruenbaum |
| 5,585,588 A | 12/1996 | Tumura |
| 5,592,572 A | 1/1997 | Le |
| 5,592,752 A | 1/1997 | Fu |
| 5,659,145 A | 8/1997 | Weil |
| 5,659,466 A | 8/1997 | Norris et al. |
| 5,665,927 A | 9/1997 | Taki et al. |
| 5,668,338 A | 9/1997 | Hewitt et al. |
| 5,675,100 A | 10/1997 | Hewlett |
| 5,717,939 A | 2/1998 | Bricklin et al. |
| 5,719,347 A | 2/1998 | Masubachi et al. |
| 5,719,561 A | 2/1998 | Gonzales |
| 5,724,985 A | 3/1998 | Snell |
| 5,741,993 A | 4/1998 | Kushimiya |
| 5,748,184 A | 5/1998 | Shieh |
| 5,763,806 A | 6/1998 | Willis |
| 5,786,540 A | 7/1998 | Westlund |
| 5,801,340 A | 9/1998 | Peter |
| 5,805,137 A | 9/1998 | Yasutake |
| 5,824,930 A | 10/1998 | Ura et al. |
| 5,827,989 A | 10/1998 | Fay et al. |
| 5,841,428 A | 11/1998 | Jaeger et al. |
| 5,850,051 A | 12/1998 | Machover et al. |
| 5,852,251 A | 12/1998 | Su et al. |
| 5,889,236 A | 3/1999 | Gillespie et al. |
| 5,932,827 A | 8/1999 | Osborne et al. |
| 5,969,283 A | 10/1999 | Looney et al. |
| 5,977,466 A | 11/1999 | Muramatsu |
| 5,986,224 A | 11/1999 | Kent |
| 6,005,545 A | 12/1999 | Nishida et al. |
| 6,037,937 A | 3/2000 | Beaton et al. |
| 6,047,073 A | 4/2000 | Norris et al. |
| 6,051,769 A | 4/2000 | Brown, Jr. |
| 6,100,461 A | 8/2000 | Hewitt |
| 6,107,997 A | 8/2000 | Ure |
| 6,140,565 A | 10/2000 | Yamauchi et al. |
| 6,204,441 B1 | 3/2001 | Asahi et al. |
| 6,225,975 B1 | 5/2001 | Furuki et al. |
| 6,285,358 B1 | 9/2001 | Roberts |
| 6,288,317 B1 | 9/2001 | Willis |
| 6,310,279 B1 | 10/2001 | Suzuki et al. |
| 6,310,610 B1 | 10/2001 | Beaton et al. |
| 6,320,112 B1 | 11/2001 | Lotze |
| 6,323,846 B1 | 11/2001 | Westerman et al. |
| 6,360,019 B1 | 3/2002 | Chaddha |
| 6,363,159 B1 | 3/2002 | Rhoads |
| 6,373,475 B1 | 4/2002 | Challis |
| 6,392,636 B1 | 5/2002 | Ferrari |
| 6,392,705 B1 | 5/2002 | Chaddha |
| 6,400,836 B2 | 6/2002 | Senior |
| 6,404,898 B1 | 6/2002 | Rhoads |
| 6,408,087 B1 | 6/2002 | Kramer |
| 6,570,078 B2 | 5/2003 | Ludwig |
| 6,610,917 B2 | 8/2003 | Ludwig |
| 6,703,552 B2 | 3/2004 | Haken |
| 6,793,619 B1 | 9/2004 | Blumental |
| 7,030,860 B1 | 4/2006 | Hsu et al. |
| 7,348,946 B2 | 3/2008 | Booth |
| 7,408,108 B2 | 8/2008 | Ludwig |
| 7,557,797 B2 | 7/2009 | Ludwig |
| 7,598,949 B2 | 10/2009 | Han |
| 7,611,409 B2 | 11/2009 | Muir et al. |
| 8,154,529 B2 | 4/2012 | Sleeman |
| 8,169,414 B2 | 5/2012 | Lim |
| 8,170,346 B2 | 5/2012 | Ludwig |
| 8,179,376 B2 | 5/2012 | Griffin |
| 8,345,014 B2 | 1/2013 | Lim |
| 2001/0036299 A1 | 11/2001 | Senior |
| 2002/0005108 A1 | 1/2002 | Ludwig |
| 2002/0093491 A1 | 7/2002 | Gillespie et al. |
| 2003/0003976 A1 | 1/2003 | Mura |
| 2003/0151592 A1 | 8/2003 | Ritter |
| 2004/0074379 A1 | 4/2004 | Ludwig |
| 2004/0118268 A1 | 6/2004 | Ludwig |
| 2004/0245438 A1* | 12/2004 | Payne et al. ............... 250/221 |
| 2004/0251402 A1* | 12/2004 | Reime ....................... 345/175 |
| 2005/0179651 A1 | 8/2005 | Ludwig |
| 2006/0001914 A1 | 1/2006 | Mesmer |
| 2006/0086896 A1* | 4/2006 | Han ........................... 250/221 |
| 2006/0252530 A1 | 11/2006 | Oberberger et al. |
| 2007/0044019 A1 | 2/2007 | Moon |
| 2007/0063990 A1 | 3/2007 | Park |
| 2007/0229477 A1* | 10/2007 | Ludwig ..................... 345/173 |
| 2008/0010616 A1 | 1/2008 | Algreatly |
| 2008/0034286 A1 | 2/2008 | Selby |
| 2008/0143690 A1 | 6/2008 | Jang |
| 2008/0150848 A1 | 6/2008 | Chung et al. |
| 2008/0158172 A1* | 7/2008 | Hotelling et al. ......... 345/173 |
| 2008/0164076 A1 | 7/2008 | Orsley |
| 2008/0259053 A1 | 10/2008 | Newton |
| 2008/0297482 A1 | 12/2008 | Weiss |
| 2008/0300055 A1 | 12/2008 | Lutnick |
| 2008/0309634 A1 | 12/2008 | Hotelling et al. |
| 2009/0006292 A1 | 1/2009 | Block |
| 2009/0027351 A1 | 1/2009 | Zhang et al. |
| 2009/0124348 A1 | 5/2009 | Yoseloff et al. |
| 2009/0146968 A1 | 6/2009 | Narita et al. |
| 2009/0167701 A1 | 7/2009 | Ronkainen |
| 2009/0254869 A1 | 10/2009 | Ludwig |
| 2010/0013860 A1 | 1/2010 | Mandella |
| 2010/0044121 A1 | 2/2010 | Simon |
| 2010/0060607 A1 | 3/2010 | Ludwig |
| 2010/0079385 A1 | 4/2010 | Holmgren |
| 2010/0087241 A1 | 4/2010 | Nguyen et al. |
| 2010/0090963 A1 | 4/2010 | Dubs |
| 2010/0110025 A1 | 5/2010 | Lim |
| 2010/0117978 A1 | 5/2010 | Shirado |
| 2010/0177118 A1 | 7/2010 | Sytnikov |
| 2010/0231612 A1 | 9/2010 | Chaudhri et al. |
| 2010/0232710 A1 | 9/2010 | Ludwig |
| 2010/0289754 A1 | 11/2010 | Sleeman et al. |
| 2010/0302172 A1 | 12/2010 | Wilairat |
| 2010/0328032 A1 | 12/2010 | Rofougaran |
| 2011/0007000 A1 | 1/2011 | Lim |
| 2011/0037735 A1 | 2/2011 | Land |
| 2011/0057953 A1 | 3/2011 | Horodezky |
| 2011/0063251 A1 | 3/2011 | Geaghan |
| 2011/0086706 A1 | 4/2011 | Zalewski |
| 2011/0202889 A1 | 8/2011 | Ludwig |
| 2011/0202934 A1 | 8/2011 | Ludwig |
| 2011/0260998 A1 | 10/2011 | Ludwig |
| 2011/0261049 A1 | 10/2011 | Cardno et al. |
| 2011/0285648 A1 | 11/2011 | Simon et al. |
| 2012/0007821 A1 | 1/2012 | Zaliva |
| 2012/0034978 A1 | 2/2012 | Lim |
| 2012/0056846 A1 | 3/2012 | Zaliva |
| 2012/0108323 A1 | 5/2012 | Kelly et al. |
| 2012/0192119 A1 | 7/2012 | Zaliva |
| 2012/0194461 A1 | 8/2012 | Lim |
| 2012/0194462 A1 | 8/2012 | Lim |
| 2012/0195522 A1 | 8/2012 | Ludwig |
| 2012/0223903 A1 | 9/2012 | Ludwig |
| 2012/0235940 A1 | 9/2012 | Ludwig |
| 2012/0262401 A1 | 10/2012 | Rofougaran |
| 2012/0280927 A1 | 11/2012 | Ludwig |
| 2012/0317521 A1 | 12/2012 | Ludwig |

(56) References Cited

U.S. PATENT DOCUMENTS

2013/0009896 A1     1/2013   Zaliva
2013/0038554 A1     2/2013   West

OTHER PUBLICATIONS

Moyle, M., et al. A Flick in the Right Direction: A Case Study of Gestural Input, Conferences in Research and Practice in Information Technology, vol. 18, Jan. 2005; New Zealand, [online] [retrieved on Jul. 9, 2013] URL:http://www.cosc.canterbury.ac.nz/andrew.cockburn/papers/moyle-cockburn.pdf, 27 pgs.

Maltoni, D., et al., "Handbook of Fingerprint Recognition," Springer Professional Computing, 2nd ed. 2009, XVI, p. 74, p. 361, [online] [retrieved on Jul. 9, 2013] URL: http://books.google.com/books?id=1Wpx25D8qOwC&pg=PA361&lpg=PA361&dq=fingerprint+minutiae, 2 pgs.

VeriFinger Information, [online] [retrieved on Jun. 11, 2013] URL: http://www.fingerprint-it.com/_sol_verifinger.html, 2 pgs.

Prabhakar S., et al., Learning fingerprint minutiae location and type, Pattern Recognition 2003, 36, [online] URL: http://www.cse.msu.edu/biometrics/Publications/Fingerprint/PrabhakarJainPankanti_MinaLocType_PR03.pdf, pp. 1847-1857.

Garcia Reyes, E., An Automatic Goodness Index to Measure Fingerprint Minutiae Quality, Progress in Pattern Recognition, Image Analysis and Applications, Lecture Notes in Computer Science vol. 3773, 2005, pp. 578-585, [online] [retrieved on Jun. 2, 2013] URL: http://www.researchgate.net/publication/226946511_An_Automatic_Goodness_Index_to_Measure_Fingerprint_Minutiae_Quality/file/d912f50ba5e96320d5.pdf.

Kayaoglu, M., et al., Standard Fingerprint Databases: Manual Minutiae Labeling and Matcher Performance Analyses, arXiv preprint arXiv:1305.1443, 2013, 14 pgs, [online] [retrieved on Jun. 2, 2013] URL: http://arxiv.org/ftp/arxiv/papers/1305/1305.1443.pdf.

Alonso-Fernandez, F., et al., Fingerprint Recognition, Chapter 4, Guide to Biometric Reference Systems and Performance Evaluation, (Springer, London, 2009, pp. 51-90, [online] [retrieved on Jun. 2, 2013] URL: http://www2.hh.se/staff/josef/public/publications/alonso-fernandez09chapter.pdf.

Image moment, Jul. 12, 2010, 3 pgs, [online] [retrieved on Jun. 13, 2013] URL: http://en.wikipedia.org/wiki/Image_moment.

Nguyen, N., et al., Comparisons of sequence labeling algorithms and extensions, Proceedings of the 24th International Conference on Machine Learning, 2007, [online] [retrieved on Jun. 2, 2013] URL: http://www.cs.cornell.edu/~nhnguyen/icml07structured.pdf, pp. 681-688.

Nissen, S., Implementation of a Fast Artificial Neural Network Library (FANN), Department of Computer Science University of Copenhagen (DIKU)}, Oct. 31, 2003, [online] [retrieved on Jun. 21, 2013] URL: http://mirror.transact.net.au/sourceforge/f/project/fa/fann/fann_doc/1.0/fann_doc_complete_1.0.pdf, 92 pgs.

Igel, C., et al., Improving the Rprop Learning Algorithm, Proceedings of the Second International ICSC Symposium on Neural Computation (NC 2000), 2000, 2000, [online] [retrieved on Jun. 2, 2013] URL: http://citeseerx.ist.psu.edu/viewdoc/download?doi=10.1.1.17.3899&rep=rep1&type=pdf, pp. 115-121.

Bishop, C.M., Pattern Recognition and Machine Learning, Springer New York, 2006, pp. 561-593.

Euler Angles, 2011, [online] [retrieved on Jun. 30, 2011] URL: http://en.wikipedia.org/w/index.php?title=Euler_angles&oldid=436460926, 8 pgs.

Electronic Statistics Textbook, StatSoft, Inc., 2011, [online] [retrieved on Jul. 1, 2011] URL: http://www.statsoft.com/textbook, 1 pg.

Central Moment, Dec. 16, 2009, [online] [retrieved on Oct. 26, 2010] URL: http://en.wikipedia.org/w/index.php?title=Central_moment&oldid=332048374.

Local regression, Nov. 16, 2010, [online] [retrieved on Jun. 28, 2011] URL: http://en.wikipedia.org/w/index.php?title=Local_regression&oldid=416762287.

USPTO Notice of Allowance dated Jun. 6, 2013 issued in U.S. Appl. No. 13/846,830, filed Mar. 18, 2013.

Hernandez-Leon, R., et al., Classifying using Specific Rules with High Confidence, 9th Mexican International Conference on Artificial Intelligence, IEEE, Nov. 2010, pp. 75-80.

Fang, Y., et al., Dynamics of a Winner-Take-All Neural Network, Neural Networks, 9(7), Oct. 1996, pp. 1141-1154.

Viberg, M., Subspace Fitting Concepts in Sensor Array Processing, Department of Electrical Engineering, Linkoping University, 1989, Sweden, 15 pgs.

Moog, R. A., The Human Finger—A Versatile Electronic Music Instrument Component, Audio Engineering Society Preprint, 1977, New York, NY, 4 pgs.

Johnson, C., Image sensor tracks moving objects in hardware, Electronic Engineering Times, Apr. 5, 1999, 1 pg.

Kaoss pad dynamic effect/controller, Korg Proview Users' magazine Summer 1999, 2 pgs.

Leiberman, D., Touch screens extend grasp Into consumer realm, Electronic Engineering Times, Feb. 8, 1999.

Lim, et al., A Fast Algorithm for Labelling Connected Components in Image Arrays, Technical Report Series, No. NA86-2, Thinking Machines Corp., 1986 (rev. 1987), Cambridge, Mass., USA, 17 pgs.

Pennywitt, K., Robotic Tactile Sensing, Byte, Jan. 1986, 14 pgs.

Review of KORG X-230 Drum (later called Wave Drum), Electronic Musician, Apr. 1994, 1 pg.

Rich, R., Buchla Lightning MIDI Controller, Electronic Musician, Oct. 1991, 5 pgs.

Rich, R., Buchla Thunder, Electronic Musician, Aug. 1990, 4 pgs.

Dario P., et al., Tactile sensors and the gripping challenge, IEEE Spectrum, vol. 5, No. 22, Aug. 1985, pp. 46-52.

Snell, J. M., Sensors for Playing Computer Music with Expression, Proceedings of the Intl. Computer Music Conf. at Eastman, 1983, pp. 113-126.

Verner J., Artif Starr Switch Company Ztar 624-D, Electronic Musician, Nov. 1994, 5 pgs.

Lippold Haken, An Indiscrete Music Keyboard, Computer Music Journal, Spring 1998, pp. 30-48.

USPTO Notice of Allowance dated May 8, 2013 issued in U.S. Appl. No. 12/541,948, filed Aug. 15, 2009.

Buxton, W. A. S., Two-Handed Document Navigation, XEROX Disclosure Journal, 19(2), Mar./Apr. 1994 [online] URL: http://www.billbuxton.com/2Hnavigation.html, pp. 103-108.

USPTO Notice of Allowance dated Mar. 20, 2012 issued in U.S. Appl. No. 12/724,413, filed Mar. 15, 2010.

USPTO Notice of Allowance dated Jan. 10, 2008 issued in U.S. Appl. No. 10/683,914, filed Oct. 10, 2003.

USPTO Notice of Allowance dated Nov. 9, 2012 issued in U.S. Appl. No. 12/502,230, filed Jul. 13, 2009.

USPTO Notice of Allowance dated Mar. 12, 2012 issued in U.S. Appl. No. 12/511,930, filed Jul. 29, 2009.

USPTO Notice of Allowance dated May 16, 2013 issued in U.S. Appl. No. 13/441,842, filed Apr. 7, 2012.

USPTO Notice of Allowance dated May 24, 2013 issued in U.S. Appl. No. 13/442,815, filed Apr. 9, 2012.

USPTO Notice of Allowance dated Dec. 24, 2002 issued in U.S. Appl. No. 09/812,870, filed Mar. 19, 2001.

Otsu's method, [online] [retrieved on Jun. 26, 2013] URL: http://en.wikipedia.org/wiki/Otsu_method, Sep. 13, 2010, 2 pgs.

Principal component analysis, [online] [retrieved on Jun. 26, 2013] URL: http://en.wikipedia.org/wiki/Principal_component_analysis, Feb. 25, 2011, 9 pgs.

USPTO Notice of Allowance dated May 30, 2013 issued in U.S. Appl. No. 13/442,806, filed Apr. 9, 2012.

DIY Touchscreen Analysis, MOTO, [online] [retrieved on May 12, 2013] URL: http://labs.moto.com/diy-touchscreen-analysis/, Jul. 15, 2010, 23 pgs.

Wilson, T.V., How the iPhone Works, howstuffworks, [online] [retrieved on May 12, 2013] URL: http://electronics.howstuffworks.com/iphone2.htm, Jan. 8, 2011, 11 pgs.

Walker, G., Touch and the Apple iPhone, Veritas et Visus, [online] [retrieved on May 12, 2013] URL: http://www.veritasetvisus.com/VVTP-12,%20Walker.pdf, Feb. 2007, pp. 50-54.

(56) References Cited

OTHER PUBLICATIONS

Han, J., Multi-Touch Sensing through LED Matrix Displays (video), [online] [retrieved on May 12, 2013] "http://cs.nyu.edu/~jhan/ledtouch/index.html," Feb. 18, 2011, 1 pg.

Roberts Cross, [online] [retrieved on May 12, 2013] URL: http://en.wikipedia.org/wiki/Roberts_Cross, Jul. 20, 2010, visited Feb. 28, 2011, 3 pgs.

Sobel Operator, [online] [retrieved on May 12, 2013] URL: http://en.wikipedia.org/wiki/Sobel_operator, Mar. 12, 2010, visited Feb. 28, 2011, 5 pgs.

Prewitt, [online] [retrieved on May 12, 2013] URL: http://en.wikipedia.org/wiki/Prewitt, Mar. 15, 2010, visited Feb. 28, 2011, 2 pgs.

Coefficient of variation, [online] [retrieved on May 12, 2013] URL: http://en.wikipedia.org/wiki/Coefficient_of_variation, Feb. 15, 2010, visited Feb. 28, 2011, 2 pgs.

Canny edge detector, [online] [retrieved on May 12, 2013] http://en.wikipedia.org/wiki/Canny_edge_detector, Mar. 5, 2010, 4 pgs.

Polynomial regression, [online] [retrieved on May 12, 2013] http://en.wikipedia.org/wiki/Polynomial_regression, Jul. 24, 2010, 4 pgs.

Pilu, M., et al., Training PDMs on models: The Case of Deformable Superellipses, Proceedings of the 7th British Machine Vision Conference, Edinburgh, Scotland, 1996, pp. 373-382, [online] [retrieved on Feb. 28, 2011] URL: https://docs.google.com/viewera=v&pid=explorer&chrome=true&srcid=0BxWzm3JBPnPmNDI1MDIxZGUtNGZhZi00NzJhLWFhZDMtNTJmYmRiMWYyMjBh&authkey=CPeVx4wO&hl=en.

Osian, M., et al., Fitting Superellipses to Incomplete Contours, IEEE Computer Society Conference on Computer Vision and Pattern Recognition Workshops (CVPRW '04), Jun. 2004, 8 pgs.

Hough transform, [online] [retrieved on Feb. 13, 2010] URL: http://en.wikipedia.org/wiki/Hough_transform, Feb. 13, 2010, 7 pgs.

Tactile Pressure Measurement, Pressure Mapping Systems, and Force Sensors and Measurement Systems, [online] [retrieved on Aug. 6, 2013] URL: http://www.tekscan.com, 2 pgs.

Tactile Surface Pressure and Force Sensors, Sensor Products LLC, Oct. 26, 2006, [online] [retrieved on Aug. 6, 2013] URL: http://www.sensorprod.com, 2 pgs.

Pressure Profile Systems, Jan. 29, 2011, [online] [retrieved on Jan. 29, 2011] URL: http://www.pressureprofile.com, 1 pg.

Xsensor Technology Corporation, Feb. 7, 2011, [online] [retrieved on May 12, 2013] URL: http://www.xsensor.com, 1 pg.

Balda AG, Feb. 26, 2011, [online] [retrieved on May 12, 2013] URL: http://www.balda.de, 1 pg.

Cypress Semiconductor, Feb. 28, 2011, [online] [retrieved on May 12, 2013] URL: http://www.cypress.com, 1 pg.

Synaptics, Jan. 28, 2011, [online] [retrieved on May 12, 2013] URL: http://www.synaptics.com, 1 pg.

Venolia, D., et al., T-Cube: A Fast, Self-Disclosing Pen-Based Alphabet, CHI '94 Proceedings of the SIGCHI Conference on Human Factors in Computing Systems, Apr. 24-28, 1994, pp. 265-270.

Davis, R. C., et al., NotePals: Lightweight Note Taking by the Group, for the Group, University of California, Berkeley, Computer Science Division, 1998, 8 pgs.

Rekimoto, Jun, Pick-and-Drop: A Direct Manipulation Technique for Multiple Computer Environments, Sony Computer Science Laboratory Inc., Tokyo, Japan, 1997, [online] [retrieved on May 30, 2013] URL: http://www.sonycsl.co.jp/person/rekimoto/papers/uist97.pdf, 8 pgs.

Davis, R. C., et al., NotePals: Lightweight Note Sharing by the Group, for the Group, [online] [retrieved on Jun. 2, 2013] URL: http://dub.washington.edu:2007/projects/notepals/pubs/notepals-chi99-final.pdf, 9 pgs.

Want, R., et al., The PARCTAB ubiquitous computing experiment, 1995-1996, [online] [retrieved on Jun. 10, 2013] URL: http://www.ece.rutgers.edu/~parashar/Classes/02-03/ece572/perv-reading/the-parctab-ubiquitous-computing.pdf, 44 pgs.

* cited by examiner

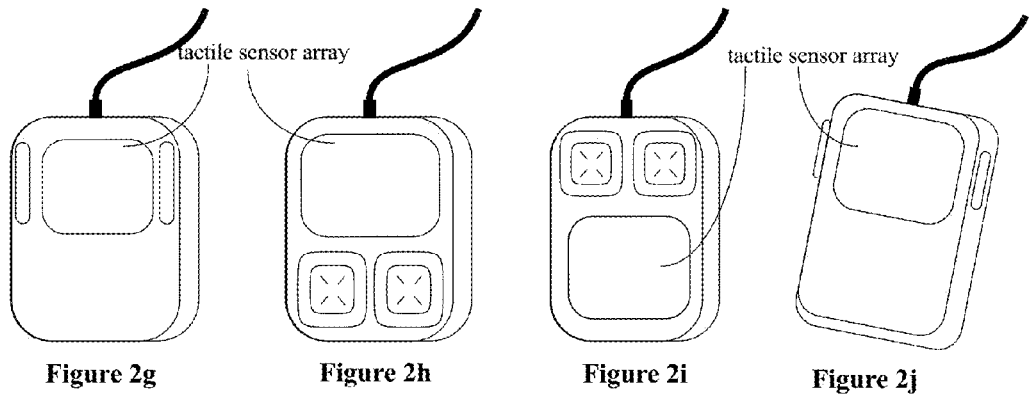
Figure 2g  Figure 2h  Figure 2i  Figure 2j
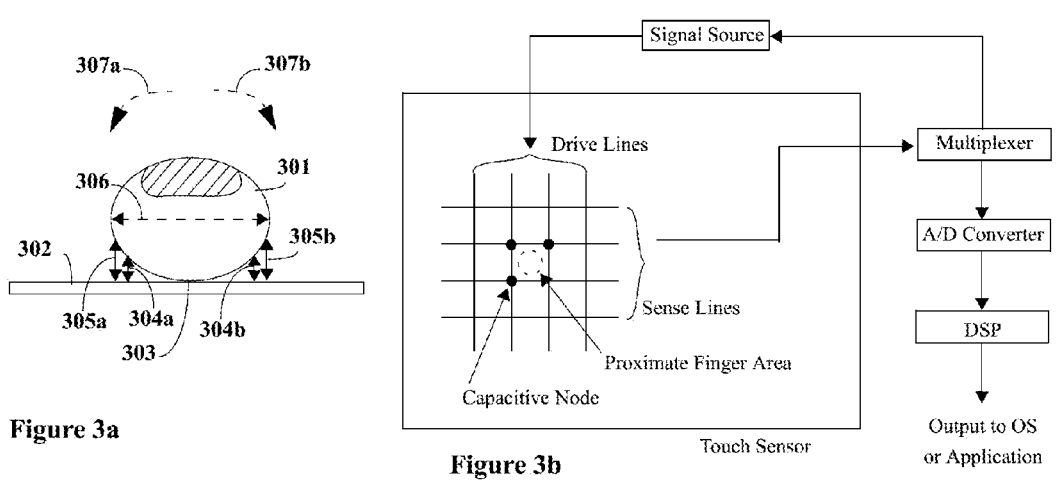
Figure 3a
Figure 3b
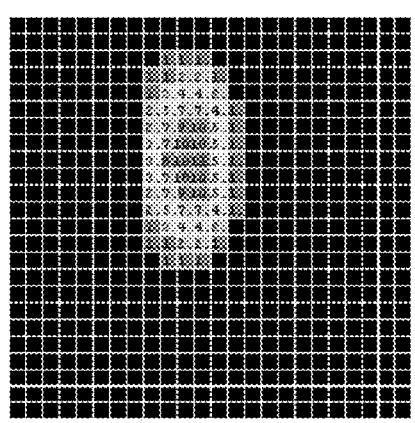
Figure 3c
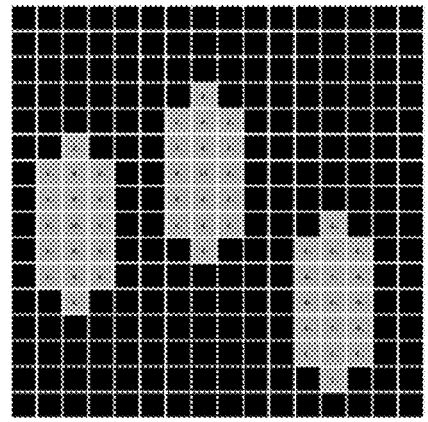
Figure 3d

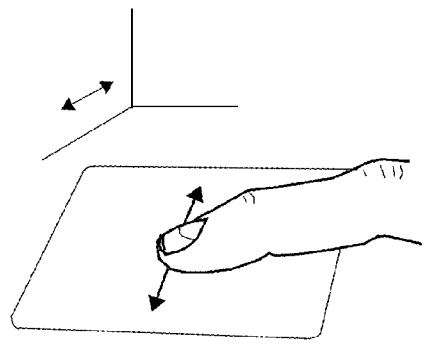
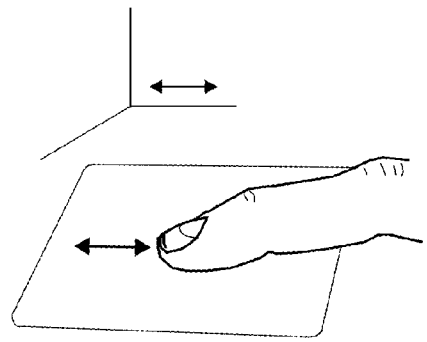
Figure 4a  Figure 4b
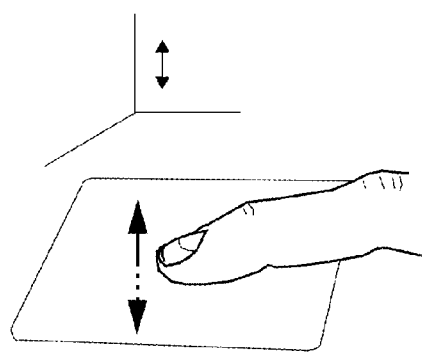
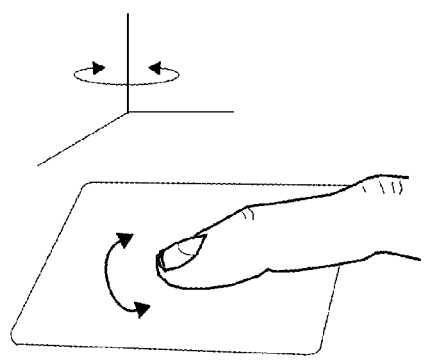
Figure 4c  Figure 4d
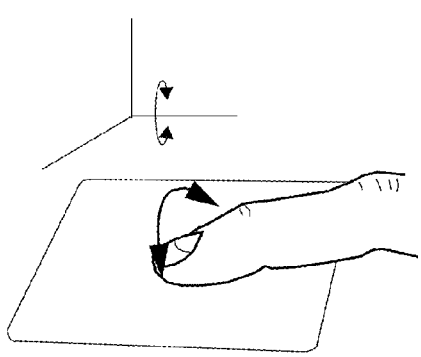
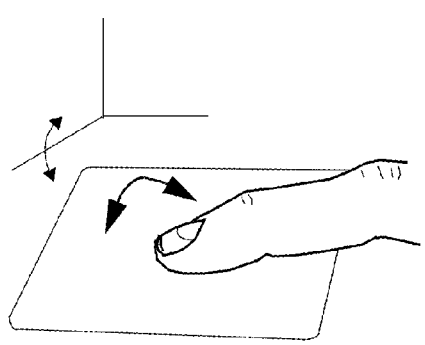
Figure 4e  Figure 4f

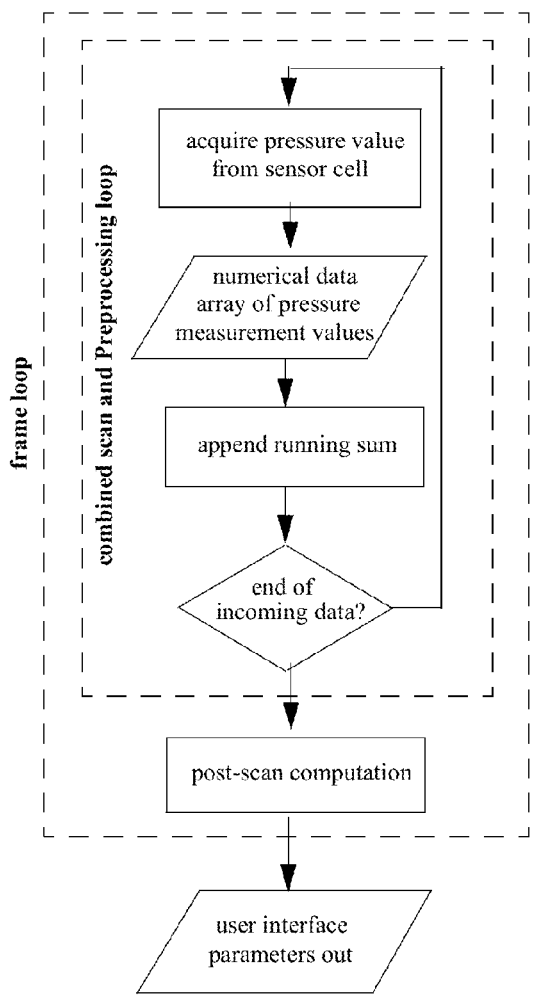 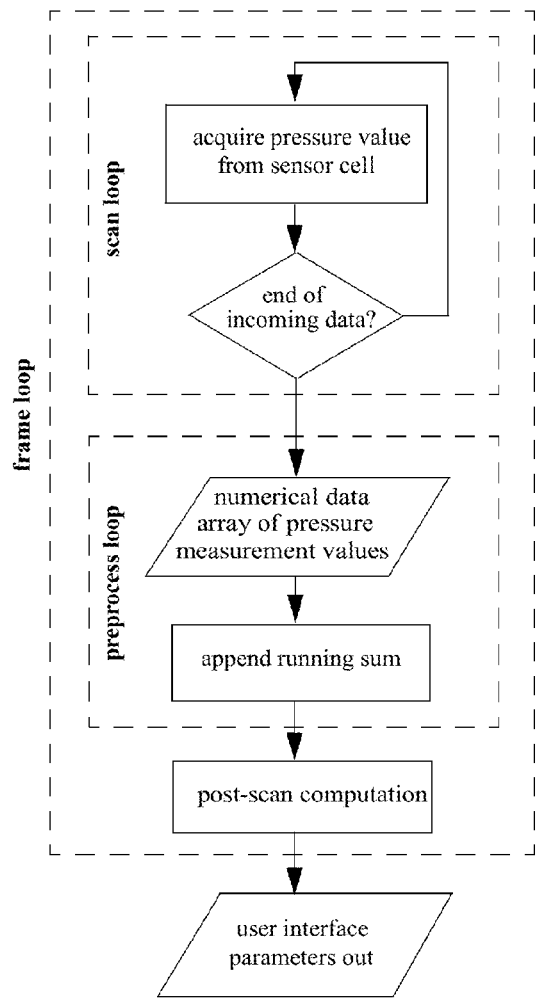
Figure 9a                    Figure 9b

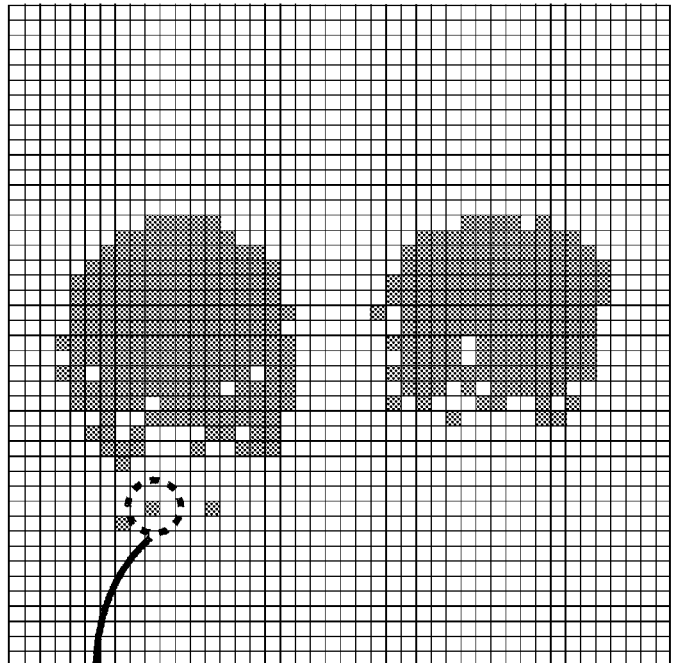
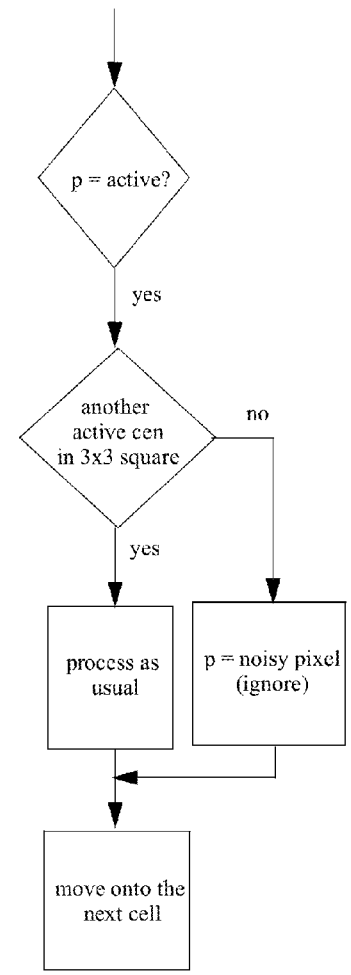
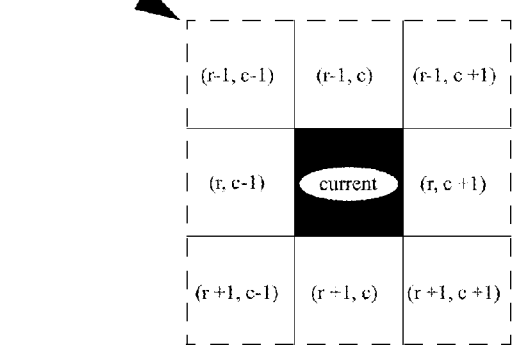
Figure 10a                                    Figure 10b

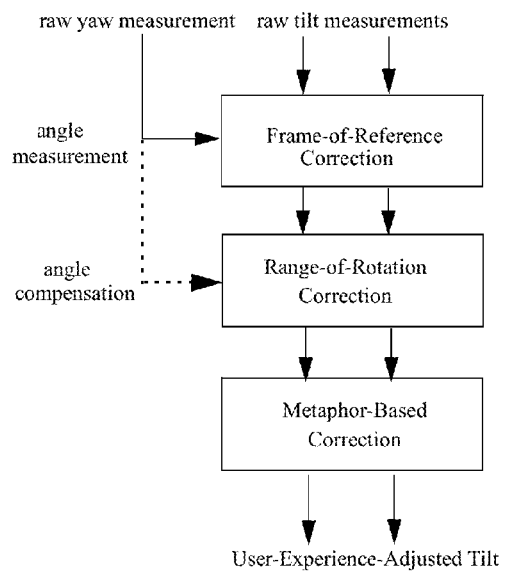
Figure 13  User-Experience-Adjusted Tilt
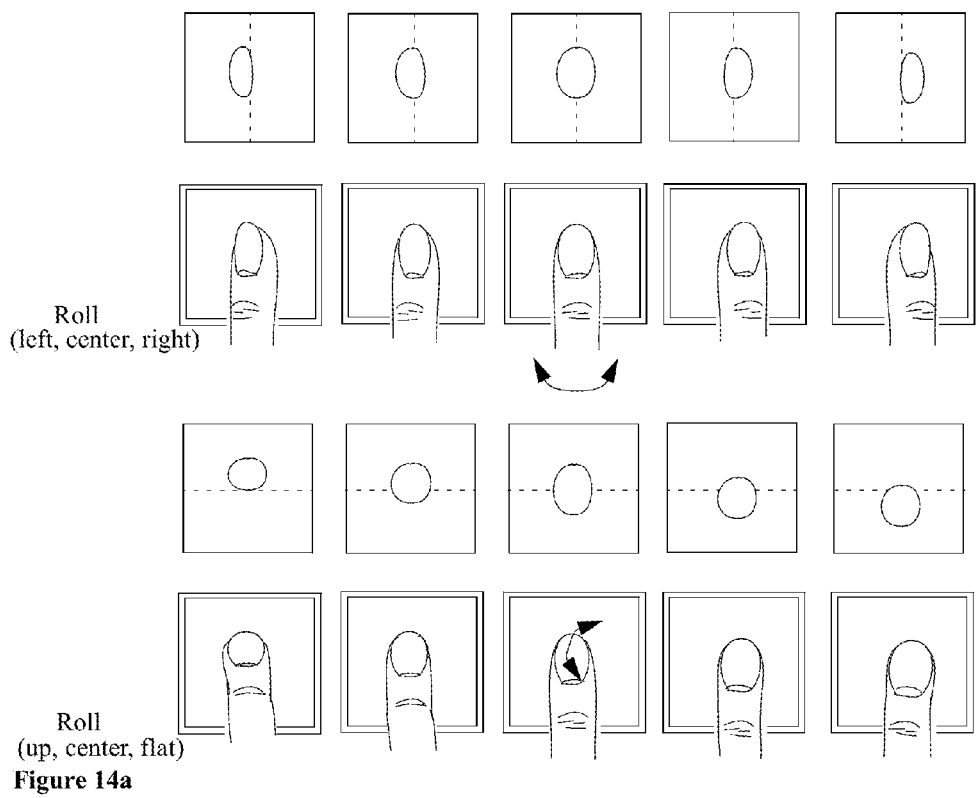
Roll
(left, center, right)
Roll
(up, center, flat)
Figure 14a

 
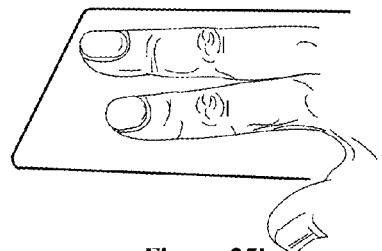 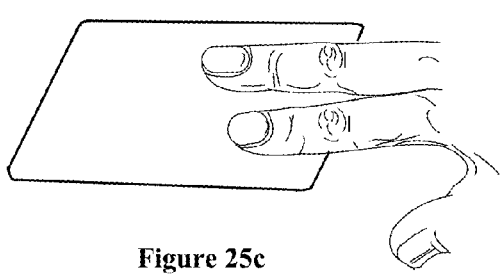
Figure 25b    Figure 25c
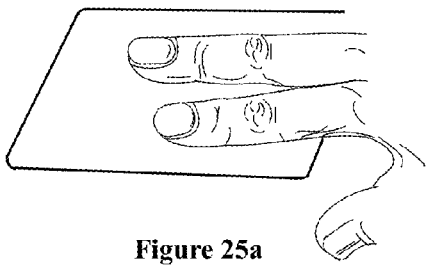
Figure 25a
 
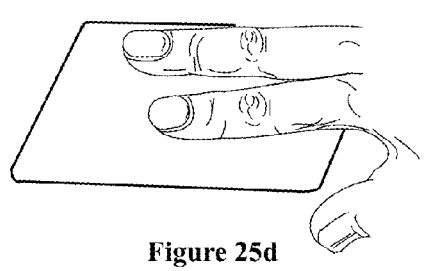 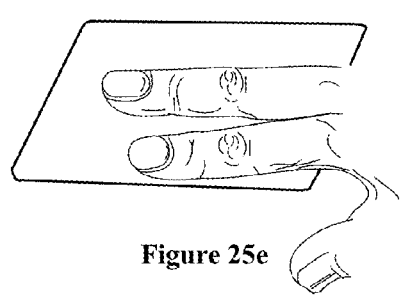
Figure 25d    Figure 25e

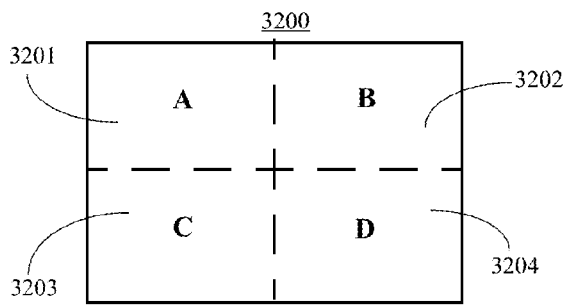
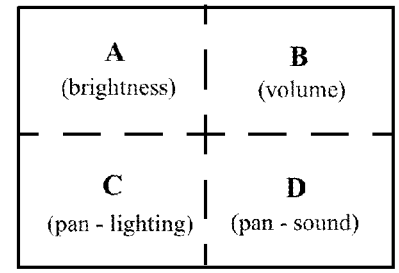
Figure 32a
Figure 32b
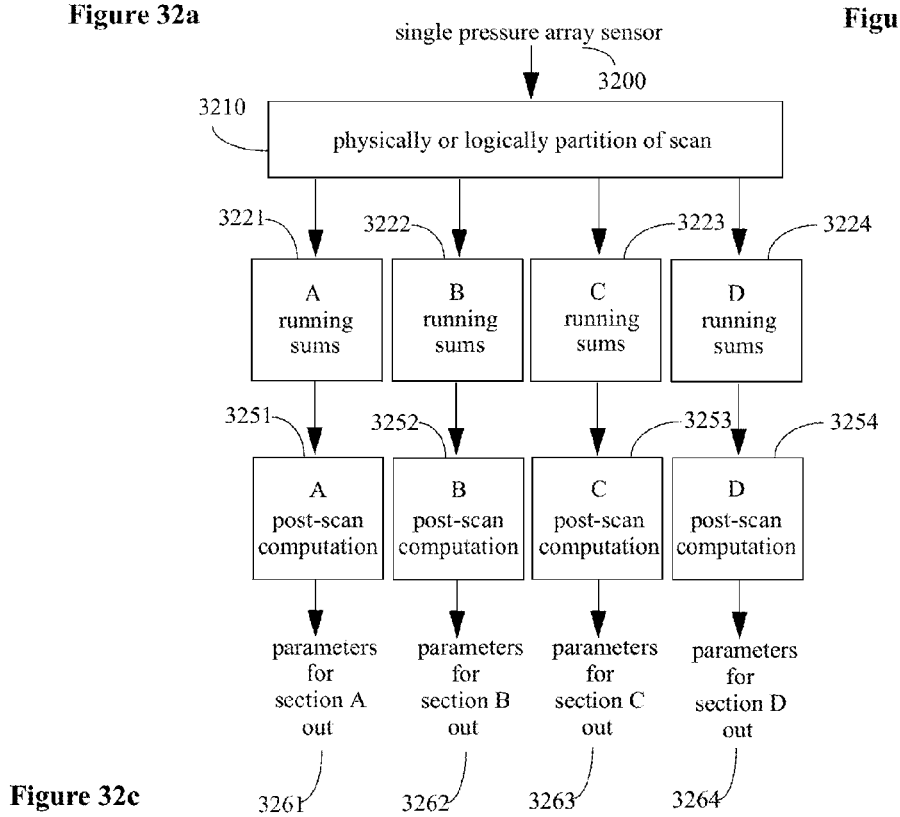
Figure 32c
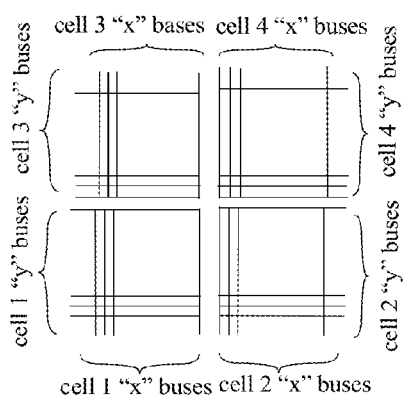
Figure 33

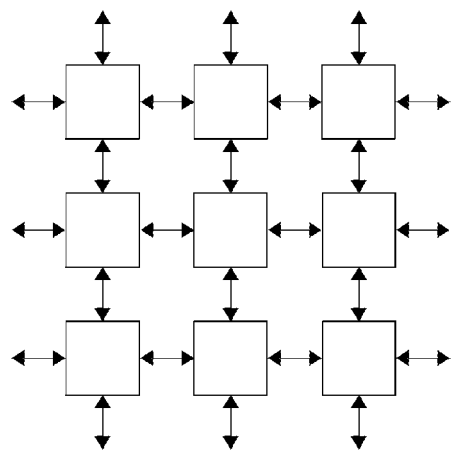
Figure 37
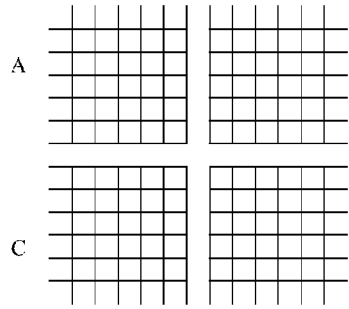
Figure 38a
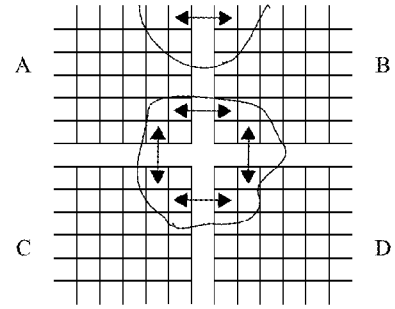
Figure 38b
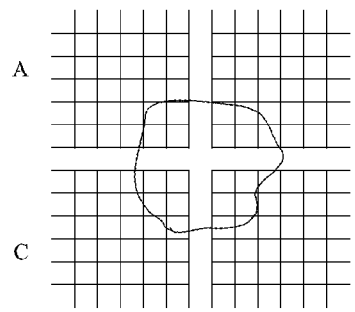
Figure 38c
$$\begin{bmatrix} X_{total} = X_A + X_B + X_C + X_D \\ U_{total} = U_A + U_B + U_C + U_D \\ Y_{total} = Y_A + Y_B + Y_C + Y_D \\ V_{total} = V_A + V_B + V_C + V_D \\ W_{total} = W_A + W_B + W_C + W_D \\ N_{total} = N_A + N_B + N_C + N_D \end{bmatrix} \rightarrow \text{Further Post-Scan Processing}$$
Figure 38d
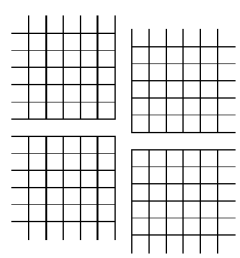
Figure 39a
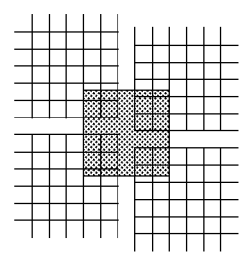
Figure 39b

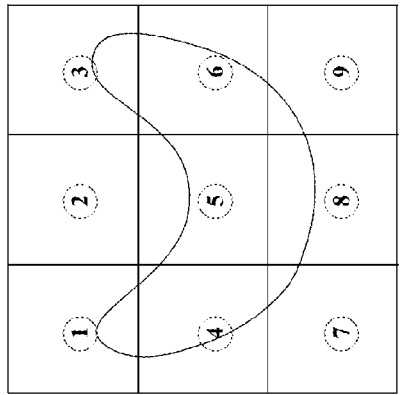
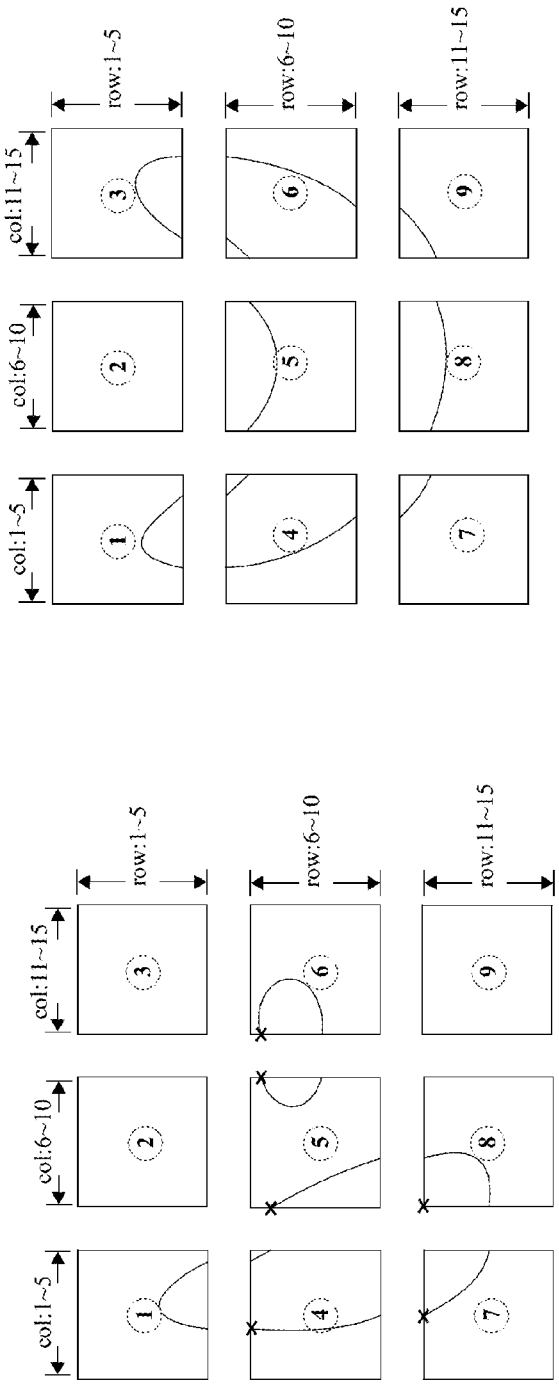
Figure 44
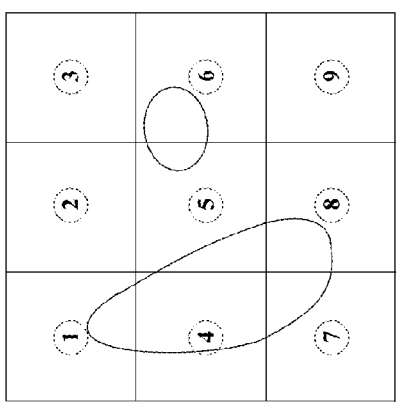
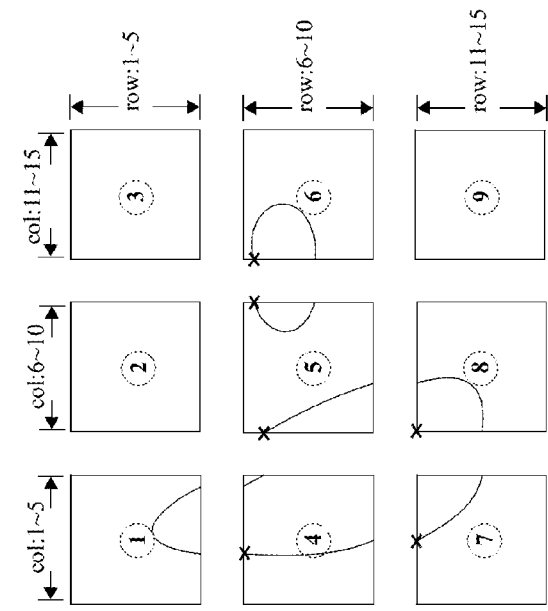
Figure 43

MULTITOUCH PARAMETER AND GESTURE USER INTERFACE EMPLOYING AN LED-ARRAY TACTILE SENSOR THAT CAN ALSO OPERATE AS A DISPLAY

RELATED CASES

Pursuant to 35 U.S.C. §119(e), this application claims the benefit of an earlier filing date and right of priority to the following provisional applications: U.S. 61/123,217 "Multi-Parameter Extraction Algorithms for Pressure Images from User Interface Pressure Sensor Arrays" by inventor Lester F. Ludwig (filed Apr. 6, 2008), provisional patent application U.S. 61/097,869 "Multi-Parameter Extraction Algorithms for Tactile Images from User Interface Tactile Sensor Arrays, Including Handling of Multiple Areas of Contact and Serrated and Non-Convex Image" by Lester F. Ludwig and Seung E. Lim (filed Sep. 17, 2008), and provisional patent application U.S. 61/199,896 "Distributed Multi-Parameter Extraction Algorithms for Tactile Images from Physically- or Logically-Partitioned User Interface Tactile Sensor Arrays" by Lester F. Ludwig and Seung E. Lim (filed Nov. 20, 2008), and provisional patent application U.S. 61/210,809 "Multi-Parameter Extraction Algorithms for Tactile Images from User Interface Tactile Sensor Arrays" by Lester F. Ludwig and Seung E. Lim (filed Mar. 23, 2009). The contents of all four provisional applications are incorporated by reference in their entirety.

BACKGROUND OF THE INVENTION

This patent application relates to the derivation of a large number of parameters in essentially real-time from tactile image data measured by a tactile sensor array, for example a pressure sensor array or proximity sensor array, configured for example as a touchpad user interface device, and more specifically to algorithms, systems, and methods for translating individual or temporal sequences of numerical data sets obtained from a tactile sensor array into information which can be used to control an associated or external system.

SUMMARY OF THE INVENTION

In an embodiment, the tactile sensor array employed by the invention may be a pressure sensor array, a proximity sensor array, or another type of sensor array such as a video camera.

In an embodiment, the system and method derives at least three independently-adjustable interactive control parameters from the contact of a single finger tip.

In an embodiment, the system and method derives a plurality of independently-adjustable interactive control parameters from the contact of two or more fingers.

In an embodiment, the system and method derives a plurality of independently-adjustable interactive control parameters from the contact with parts of the hand.

In an embodiment, the system and method provide handling of regions with non-convex shapes.

In an embodiment, the system and method calculate the rate of change of one or more of the independently-adjustable interactive control parameters.

In an embodiment, the system and method provide shape recognition functions.

In an embodiment, the system and method provide gesture recognition functions.

In an embodiment, the system and method produce one or more symbols.

In an embodiment, the system and method provide syntax functions.

In an embodiment, the system and method provide parsing functions.

In an embodiment, the system and method provide for implementations wherein the tactile sensor comprises a plurality of partitioned sections.

BRIEF SUMMARY OF THE DRAWINGS

FIGS. 2a through 2j depict various physical devices incorporating the tactile sensor array employed by the invention.

FIG. 3a illustrates the side view of a finger lightly touching the surface of a tactile sensor array.

FIG. 3b shows a popularly accepted view of a typical cellphone or PDA capacitive proximity sensor implementation.

FIG. 3c is a graphical representation of an exemplary tactile image produced by contact of a human finger on a tactile sensor array. FIG. 3d provides a graphical representation of an exemplary tactile image produced by contact with multiple human fingers on a tactile sensor array.

FIGS. 4a-4f illustrate exemplary six parameters that can be independently controlled by the user and subsequently recorded by algorithmic processing as provided for by invention.

FIGS. 9a and 9b illustrate two approaches of acquiring and algorithmically processing data from the tactile sensor array leveraging the running sum embodiments provided for by the invention.

FIG. 10a illustrates an example of noisy pixels (below the left blob). FIG. 10b illustrates an example of a median filter type noise filtering operation.

FIG. 13 illustrates correcting tilt coordinates with knowledge of the measured yaw angle, compensating for the expected tilt range variation as a function of measured yaw angle, and matching the user experience of tilt with a selected metaphor interpretation.

FIGS. 14a and 14b illustrate examples of how the shape and area of contact varies depending on the movement of a finger on the tactile sensor array.

FIGS. 22a, 22b, 23a, 23b, 24a-24e, and 25a-25e depict various two-finger contact postures with a tactile sensor array.

FIG. 32a illustrates an exemplary partition of a single tactile sensor array. FIG. 32b depicts a simple exemplary stage control application wherein each partition of the larger tactile sensor array is directed to a different control function. FIG. 32c illustrates an exemplary running sum arrangement for partitioning the scan of a single tactile sensor array into separately scanned regions and directing them to separate corresponding post-scan computations.

FIG. 33 depicts an example single unitary tactile-sensor array that is electrically divided into partitions by splitting electrical scanning interconnection busses into separate sections.

FIG. 37 illustrates an exemplary signal flow among neighboring tactile sensor array modules as provided for by the invention.

FIG. 38a depicts a partitioned tactile sensor area. FIG. 38b depicts two exemplary contiguous regions of contact that span multiple neighboring partitions. FIG. 38c depicts an exemplary contiguous region of contact that spans four neighboring partitions. FIG. 38d depicts an exemplary running sum aggregation arrangement.

FIG. 39a depicts an exemplary situation wherein four sensor array modules are misaligned with respect to one another. FIG. 39b depicts an exemplary calibration approach to address misalignment using an object of known size and shape as provided for by the invention.

FIGS. 41a-41c, 42-44, 45a-45c, 46a, and 46b contain tactile sensor arrays various types of partitions spanned by various tactile pressure, proximity, etc. as provided for by the invention.

DETAILED DESCRIPTION

In an embodiment, the present invention derives a plurality of independently-adjustable interactive control parameters from human contact with a tactile sensor array, such as a pressure sensor array or proximity sensor array, or another type of sensor array such as a video camera or LED array.

Figure 1:
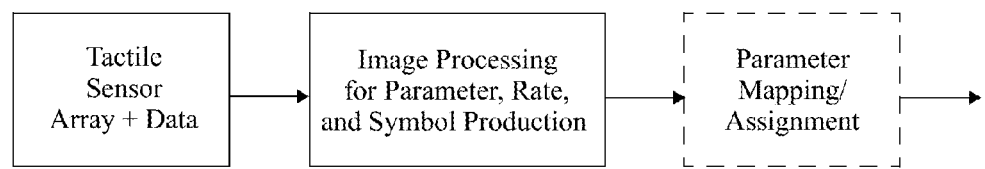
FIG. 1 depicts an exemplary realization wherein a tactile sensor array is provided with real-time or near-real-time data acquisition capabilities.

FIG. 1 depicts an exemplary realization wherein a tactile sensor array is provided with real-time or near-real-time data acquisition capabilities. The captured data reflects spatially distributed tactile measurements (such as pressure, proximity, etc.). The tactile sensory array and data acquisition stage provides this real-time or near-real-time tactile measurement data to a specialized image processing arrangement for the production of parameters, rates of change of those parameters, and symbols responsive to aspects of the hand's relationship with the tactile or other type of sensor array. In some applications, these measurements may be used directly. In other situations, the real-time or near-real-time derived parameters can be directed to mathematical mappings (such as scaling, offset, and/or nonlinear warpings) in real-time or near-real-time into real-time or near-real-time application-specific parameters or other representations useful for applications. In some embodiments, general purpose outputs may be assigned to variables defined or expected by the application.

FIGS. 2a-2d illustrate various exemplary physical arrangements for incorporating a tactile sensor array, such as a pressure sensor array or proximity sensor array configured as a touchpad user interface device. For example, the system may comprise a sensor array, interface electronics, and at least one processor. The tactile sensor array may be comprised of a regular array of pressure, proximity, or other form of tactile measurement cells. In some embodiments, the resulting array can provide a real-time or near-real-time tactile image of the array reflecting aspects of the hand's relationship with the tactile or other type of sensor array.

Figure 2A:
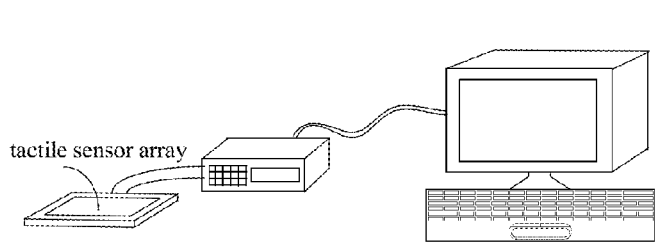
Figure 2D:
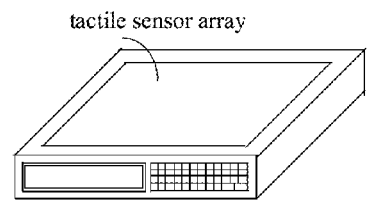
Figure 2B:
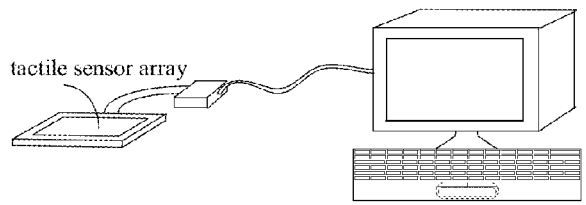

As shown in the exemplary embodiment of FIG. 2a, the interface hardware may provide associated controls and/or visual indicators or display. Alternatively, as illustrated in the exemplary embodiment of FIG. 2b, any associated controls may be part of a GUI operating on the associated computer or other article of equipment, and associated interface hardware may be in a separate enclosure, allowing for the sensor array to be readily replaced with various formats that may match hand size, etc. In yet another exemplary implementation, the sensor array and associated interface hardware also may be configured to share the same housing as shown in the exemplary embodiment of FIG. 2c. Alternatively, the tactile sensor array, interface electronics, and a processor may also be configured to share one table-top, notebook, or hand-held housing in various for factors, for example as in the exemplary embodiment shown in FIG. 2d.

Figure 2E:
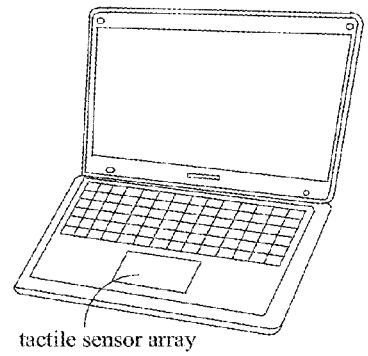
Figure 2C:
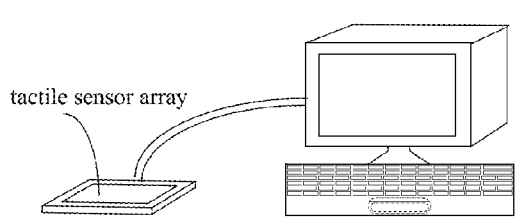
Figure 2F:
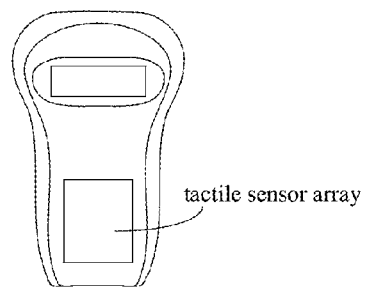

In yet another application setting, the sensor array and interface hardware may be implemented as a touchpad module within a laptop personal computer as shown in FIG. 2e. In yet further exemplary embodiments, the tactile sensor array may be configured as a touchpad element that is incorporated into a handheld device such as a field measurement instrument, bench test instrument, PDA, cellular phone, signature device, etc. An exemplary depiction of this is shown in FIG. 2f.

In yet further exemplary embodiments, the tactile sensor array may be configured as a touchpad element that is incorporated into a traditional handheld mouse. This touchpad element may be, for example, located on top of the body of a traditional hand-operated "mouse" computer user interface pointing device, as shown in FIG. 2g through FIG. 2j. The modified mouse could also provide traditional buttons: for example on either side of the tactile sensor array (as in FIG. 2g), near the side of the tactile sensor array more proximate to the user (as in FIG. 2h), near the side of the tactile sensor array furthest from the user (as in FIG. 2i), on the sides of the mouse housing body (as in FIG. 2j), etc. Alternatively, no traditional buttons may be provided. In one embodiment without traditional buttons, the tactile sensor array itself may provide a modality that provides a replacement for these traditional buttons, for example n response to a press or tap in various regions of the tactile sensor array. In any of these, as well as other embodiments apparent to one skilled in the art, the body of the mouse and layout of various elements described may be styled in various fashions in accordance with ergonomic or commercial appeal considerations.

In any of various embodiments, such as the exemplary ones provided above or others, the tactile sensor array may be transparent or translucent and include an underlying visual display such as an alphanumeric and/or graphics and/or image display such as an LED array display, a backlit LCD, etc. Such an underlying display may be used to render geometric boundaries or labels for soft-key functionality implemented with the tactile sensor array, to display status information, etc.

In any of various embodiments, such as the exemplary ones provided above or others, the tactile sensor array obtains or provides individual measurements in every enabled cell in the sensor array and provides these as numerical values. The numerical values may be communicated in a numerical data array, as a sequential data stream, or in other ways. When regarded as a numerical data array with row and column ordering that can be associated with the geometric layout of the individual cells of the sensor array, the numerical data array may be regarded as representing a tactile image.

A tactile sensor array should not be confused with the "null/contact" touchpad which, in normal operation, acts as a pair of potentiometers. These "null/contact" touchpads do not produce pressure images, proximity images, or other image data but rather, in normal operation, two voltages linearly corresponding to the location of a left-right edge and forward-back edge of a single area of contact. Such "null/contact" touchpads, which are universally found in existing laptop computers, are discussed and differentiated from tactile sensor arrays in U.S. Pat. No. 6,570,078 and pending U.S. patent application Ser. No. 11/761,978 (pre-grant publication US 2007/0229477). Before leaving this topic, it is pointed out that these the "null/contact" touchpads nonetheless can be inexpensively adapted with simple analog electronics to provide at least primitive multi-touch capabilities as taught in U.S. Pat. No. 6,570,078 and pending U.S. patent application Ser. No. 11/761,978 (therein, paragraphs [0022]-[0029], for example).

One implementation of a tactile sensor array is a pressure sensor array. Pressure sensor arrays discussed in U.S. Pat. No. 6,570,078 and pending U.S. patent application Ser. No. 11/761,978. These typically operate by measuring changes in electrical (resistive, capacitive) or optical properties of an elastic material as the material is compressed. Prominent manufacturers and suppliers of pressure sensor arrays include Tekscan, Inc. (307 West First Street., South Boston, Mass., 02127, www.tekscan.com), Pressure Profile Systems (5757 Century Boulevard, Suite 600, Los Angeles, Calif. 90045, www.pressureprofile.com), Sensor Products, Inc. (300 Madison Avenue, Madison, N.J. 07940 USA, www.sensorprod-.com), and Xsensor Technology Corporation (Suite 111, 319-2nd Ave SW, Calgary, Alberta T2P 0C5, Canada, www.xsensor.com).

In lieu of a pressure sensor array, a proximity sensor array or effective equivalents (for example, as may be accomplished with a video camera as described in U.S. Pat. No. 6,570,078 and pending U.S. patent application Ser. No. 11/761,978) may be used as a tactile sensor array. In general, a tactile proximity sensor array suitable for use with the present invention can be implemented in a wide variety of ways using any number of techniques or physical effects. The only requirement is that the tactile proximity sensor array produce a multi-level gradient measurement image as a finger, part of hand, or other pliable object varies is proximity in the immediate area of the sensor surface. More specifically, FIG. 3a illustrates the side view of a finger 301 lightly touching the surface 302 of a tactile sensor array. In this example, the finger 301 contacts the tactile sensor surface in a relatively small area 303. In this exemplary situation, on either side the finger curves away from the region of contact 303, where the non-contacting yet proximate portions of the finger grow increasingly far 304a, 305a, 304b, 305b from the surface of the sensor 302. These variations in physical proximity of portions of the finger with respect to the sensor surface should cause each sensor element in the tactile proximity sensor array to provide a corresponding proximity measurement varying responsively to the proximity, separation distance, etc. The tactile proximity sensor array advantageously comprises enough spatial resolution to provide a plurality of sensors within the area occupied by the finger (for example, the area comprising width 306). In this case, as the finger is pressed down, the region of contact 303 grows as the more and more of the pliable surface of the finger conforms to the tactile sensor array surface 302, and the distances 304a, 305a, 304b, 305b contract. If the finger is tilted, for example by rolling in the user viewpoint counterclockwise (which in the depicted end-of-finger viewpoint clockwise 307a) the separation distances on one side of the finger 304a, 305a will contract while the separation distances on one side of the finger 304b, 305b will lengthen. Similarly if the finger is tilted, for example by rolling in the user viewpoint clockwise (which in the depicted end-of-finger viewpoint counterclockwise 307b) the separation distances on the side of the finger 304b, 305b will contract while the separation distances on the side of the finger 304a, 305a will lengthen.

Capacitive proximity sensors may be used in various handheld devices with touch interfaces (e.g., http://electronics.howstuffworks.com/iphone2.htm, http://www.veritasetvisus.com/VVTP-12,%20Walker.pdf, inter alia). Prominent manufacturers and suppliers include Balda AG (Bergkirchener Str. 228, 32549 Bad Oeynhausen, Del., www.balda.de), Cypress (198 Champion Ct., San Jose, Calif. 95134, www.cypress.com), and Synaptics (2381 Bering Dr., San Jose, Calif. 95131, www.synaptics.com). In these sensors, the region of finger contact is detected by variations in localized capacitance resulting from capacitive proximity effects induced by a nearly-adjacent finger. More specifically, the electrical field at the intersection of orthogonally-aligned conductive buses is influenced by the vertical distance or gap between the surface of the sensor array and the skin surface of the finger. The capacitive proximity sensor technology is low-cost, reliable, long-life, stable, and can readily be made transparent. FIG. 3b (adapted from http://www.veritasetvisus.com/VVTP-12,%20Walker.pdf with slightly more functional detail added) shows a popularly accepted view of a typical cellphone or PDA capacitive proximity sensor implementation. In some embodiments the present invention may use the same spatial resolution as current capacitive proximity touchscreen sensor arrays. In other embodiments of the present invention, a higher spatial resolution is advantageous.

Forrest M. Mims is credited as showing that an LED can be used as a light detector as well as a light emitter. Recently, light-emitting diodes have been used as a tactile proximity sensor array (for example, as depicted in the video available at http://cs.nyu.edu/~jhan/ledtouch/index.html). Apparently, such tactile proximity array implementations need to be operated in a darkened environment (as seen in the video in the above web link). In one embodiment provided for by the invention, each LED in an array of LEDs can be used as a photodetector as well as a light emitter, although a single LED can either transmit or receive information at one time. Each LED in the array can sequentially be selected to be set to be in receiving mode while others adjacent to it are placed in light emitting mode. A particular LED in receiving mode can pick up reflected light from the finger, provided by said neighboring illuminating-mode LEDs. The invention provides for additional systems and methods for not requiring darkness in the user environment in order to operate the LED array as a tactile proximity sensor. In one embodiment, potential interference from ambient light in the surrounding user environment can be limited by using an opaque pliable and/or elastically deformable surface covering the LED array that is appropriately reflective (directionally, amorphously, etc. as may be advantageous in a particular design) on the side facing the LED array. Such a system and method can be readily implemented in a wide variety of ways as is clear to one skilled in the art. In another embodiment, potential interference from ambient light in the surrounding user environment can be limited by employing amplitude, phase, or pulse width modulated circuitry and/or software to control the underlying light emission and receiving process. For example, in an implementation the LED array can be configured to emit modulated light modulated at a particular carrier frequency or variational waveform and respond to only modulated light signal components extracted from the received light signals comprising that same carrier frequency or variational waveform. Such a system and method can be readily implemented in a wide variety of ways as is clear to one skilled in the art.

Use of video cameras for gathering control information from the human hand in various ways is discussed in U.S. Pat. No. 6,570,078 and pending U.S. patent application Ser. No. 11/761,978. In another video camera tactile controller embodiment, a flat or curved translucent panel may be used as sensor surface. When a finger is placed on the translucent panel, light applied to the opposite side of the translucent panel reflects light in a distinctly different manner than in other regions where there is no finger or other tactile contact. The image captured by an associated video camera will provide gradient information responsive to the contact and proximity of the finger with respect to the surface of the translucent panel. For example, the parts of the finger that are in contact with the surface will provide the greatest degree of reflection while parts of the finger that curve away from the surface of the sensor provide less reflection of the light. Gradients of the reflected light captured by the video camera can be arranged to produce a gradient image that appears similar to the multilevel quantized image captured by a pressure sensor. By comparing changes in gradient, changes in the position of the finger and pressure applied by the finger can be detected.

In many various embodiments, the tactile sensor array may be connected to interface hardware that sends numerical data responsive to tactile information captured by the tactile sensor array to a processor. In various embodiments, this processor will process the data captured by the tactile sensor array and transform it various ways, for example into a collection of simplified data, or into a sequence of tactile image "frames" (this sequence akin to a video stream), or into highly refined information responsive to the position and movement of one or more fingers and/or other parts of the hand.

As to further exemplary detail of the latter example, a "frame" refers to a 2-dimensional list, number of rows by number of columns, of tactile measurement value of every pixel in a tactile sensor array at a given instance. The time interval between one frame and the next one depends on the frame rate of the system and the number of frames in a unit time (usually frames per second). FIG. 3c is a graphical representation of an exemplary tactile image produced by contact with the bottom surface of the most outward section (between the end of the finger and the most nearby joint) of a human finger on a tactile sensor array. In this exemplary tactile array, there are 24 rows and 24 columns; other realizations may have significantly more (hundreds or thousands) of rows and columns. Tactile measurement values of each cell are indicated by the numbers and shading in each cell. Darker cells represent cells with higher tactile measurement values. Similarly, FIG. 3d provides a graphical representation of an exemplary tactile image produced by contact with multiple human fingers on a tactile sensor array. In other embodiments, there may be a larger or smaller number of pixels for a given images size, resulting in varying resolution. Additionally, there may be larger or smaller area with respect to the image size resulting in a greater or lesser potential measurement area for the region of contact to be located in or move about.

Individual sensor elements in a tactile sensor array may vary sensor-by-sensor when presented with the same stimulus. The invention provides for each sensor to be individually calibrated in implementations where that may be advantageous. Sensor-by-sensor measurement value scaling, offset, and/or nonlinear warpings may be invoked for all or selected sensor elements during data acquisition scans. Similarly, the invention provides for individual noisy or defective sensors may be tagged for omission during data acquisition scans.

FIGS. 4a-4f illustrate exemplary six parameters that can be independently controlled by the user and subsequently recorded by algorithmic processing as provided for by invention. These exemplary parameters are:

POSITIONS/DISPLACEMENTS:
    left-right position or translation (FIG. 4a)
    forward-back position or translation (FIG. 4b)
    more-less downward displacement or translation (pressure) (FIG. 4c)
ANGLES/ROTATIONS:
    pivoting rotation (yaw) (FIG. 4d)
    left-right tilt (roll) (FIG. 4e)
    forward-back tilt (pitch) (FIG. 4f).

Figure 5:
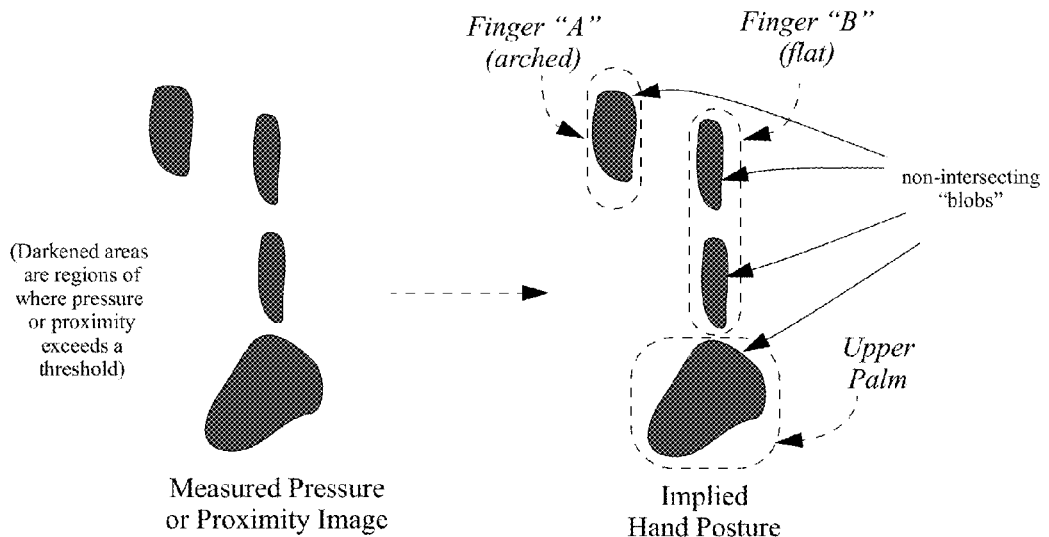
FIG. 5 depicts one of a wide range of tactile sensor images that can be measure by using more of the human hand.

The invention provides robustly for feature-rich capability for tactile sensor array contact with two or more fingers, with other parts of the hand, or with other pliable (and for some parameters, non-pliable) objects. In one embodiment, one finger on each of two different hands can be used together to at least double number of parameters that can be provided. Additionally, new parameters particular to specific hand contact configurations and postures can also be obtained. By way of example, FIG. 5 depicts one of a wide range of tactile sensor images that can be measured by using more of the human hand. U.S. Pat. No. 6,570,078 and pending U.S. patent application Ser. No. 11/761,978 provide additional detail on use of other parts of hand. As an example, multiple fingers may be used with the tactile sensor array, with or without contact by other parts of the hand. The whole hand can be tilted & rotated. The thumb can be independently rotated in yaw angle with respect to the yaw angle held by other fingers of the hand. Selected fingers can be independently spread, flatten, arched, or lifted. The palms and wrist cuff may be used. Shapes of individual parts of the hand and/or combinations of them may be recognized. All of these may be used to provide an extremely rich pallet of primitive control signals that can be used for a wide variety of purposes and applications.

Figure 6:
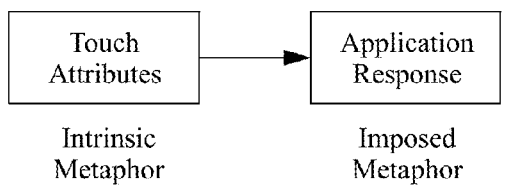
FIG. 6 depicts the setting for the interaction between intrinsic metaphors of the tactile sensor user experience and metaphors imposed by applications.

Additionally, the 3D nature of the six parameters listed above, the notion of touch, configurations of the hand, and abstract relationships among these and the six parameters listed above also gives rise to a new and rich collection of possible user interface metaphors. Many such metaphors are described in U.S. Pat. No. 6,570,078 and pending U.S. patent application Ser. No. 11/761,978, including natural associations with 3D manipulation and abstract hierarchical planes interpreting roll and pitch as parameters in a plane superimposed on the forward-back/left-right position plane. Some metaphors are intrinsic to the invention itself in regards to the user experience of touching the tactile sensor array. Other metaphors may be imposed by applications, such as manipulating a 2D or 3D object in a drawing or CAD application or manipulating the viewpoint in a 3D map viewer, aerial photograph viewer, GIS system display, mathematical surface graphic, etc. FIG. 6 depicts the setting for the interaction between intrinsic metaphors of the tactile sensor user experience, which may be viewed as "touch attributes," and metaphors imposed by applications and how the applications respond to actions taken by the user in the tactile sensor user experience. The arrow depicted represents mappings and assignments required to link the metaphors.

Values for each of the aforementioned six parameters would be derived from information measured by tactile measurement sensor cells whose most recently measured tactile measurement value exceeds a specified threshold. The value of such threshold specified will be assigned to a constant named THRESHOLD. Tactile sensor cells that are currently have tactile measurement values exceeding the threshold will be called "active." A contiguous area of active cells will be called a "blob."

As it turns out, each of the six parameters listed above can be obtained from operations on a collection of sums involving the geometric location and tactile measurement value of each tactile measurement sensor. The "Position Displacement" parameters listed above can be realized by various types of unweighted averages computed across the blob of one or more of each the geometric location and tactile measurement value of each active cell in the image. The pivoting rotation may be calculated from a least-squares slope which in turn involves sums taken across the blob of one or more of each the geometric location and the tactile measurement value of each active cell in the image; alternatively a high-performance adapted eigenvector method taught in co-pending provisional patent application U.S. 61/210,250 "High-Performance Closed-Form Single-Scan Calculation of Oblong-Shape Rotation Angles from Binary Images of Arbitrary Size Using Running Sums" by Lester F. Ludwig (filed Mar. 14, 2009) can be used. The last two tilt parameters, pitch and roll, can be realized by performing calculations on various types of weighted averages or other methods. All of these involve incrementing various running sums as the pixels of the tactile sensor are scanned. This sum-based structure facilitates a fortuitous variety of advantages such as scan-time data compression, flexibly defined sensor partitioning, parallel processing, shape-based parameter interpretation, and sensor aggregation as will be appreciated later.

Figure 7:
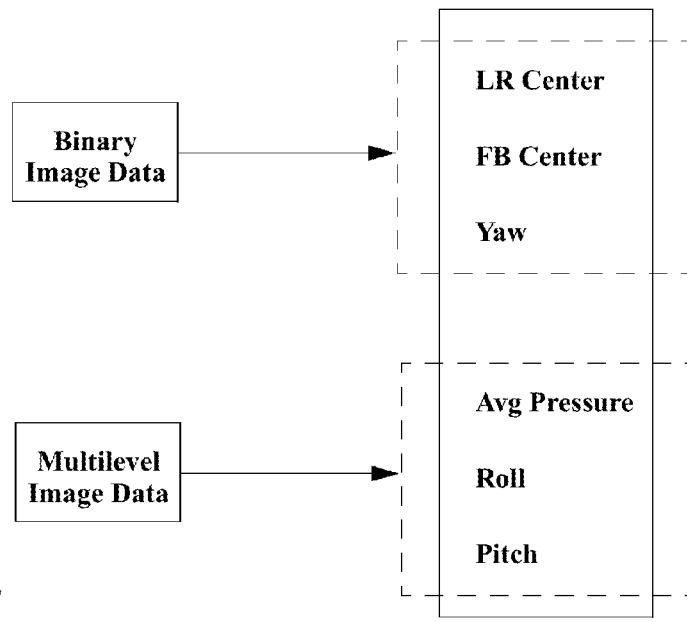
FIG. 7 depicts three parameters readily obtainable from binary threshold image data and three parameters beneficially calculated from gradient (multi-level) image data.

Of the six parameters, the left-right geometric center, forward-back geometric center, and clockwise-counterclockwise yaw rotation can be obtained from binary threshold image data. The average downward pressure, roll, and pitch parameters are in some embodiments beneficially calculated from gradient (multi-level) image data. This partition is summarized in FIG. 7. One remark is that because binary threshold image data is sufficient for the left-right geometric center, forward-back geometric center, and clockwise-counterclockwise yaw rotation parameters, these can be discerned, for example, for flat regions of rigid non-pliable objects. The invention can be further readily extended to discern these three parameters from flat regions with striations or indentations of rigid non-pliable objects.

Figure 8A:
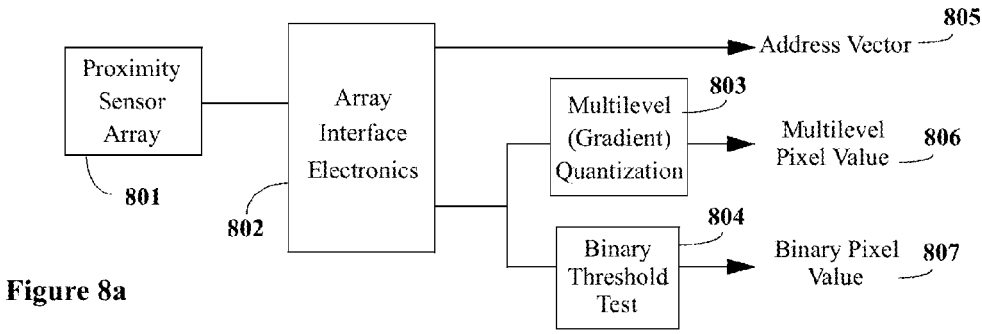
FIGS. 8a-8d depict four examples of ways the binary and gradient (multi-level) data can be produced for use in parameter calculations.
Figure 8B:
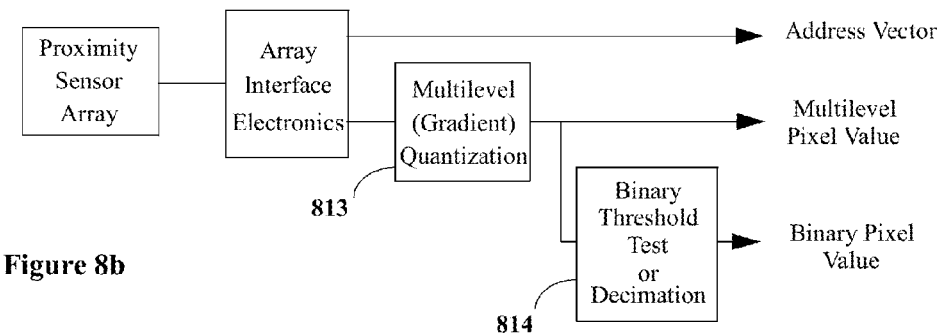
Figure 8C:
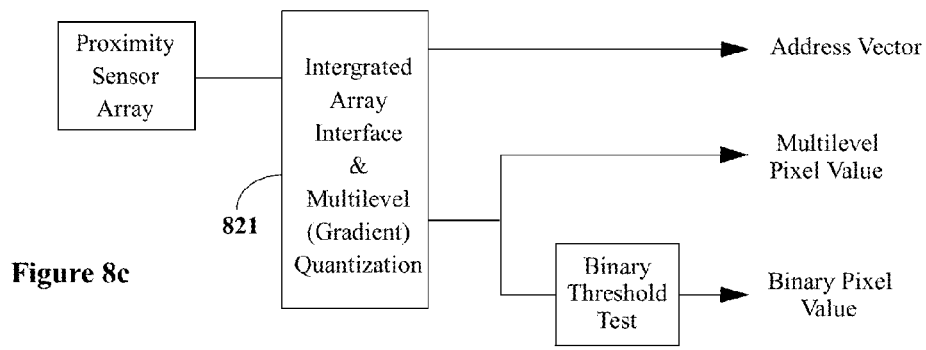
Figure 8D:
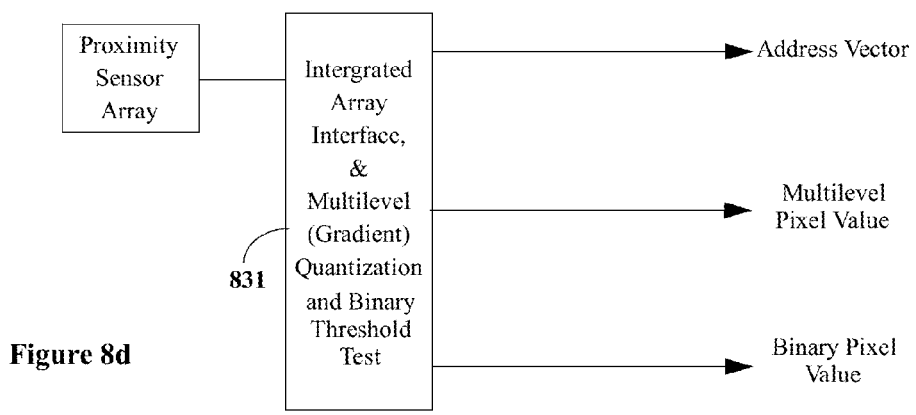

There are a number of ways the binary and gradient (multilevel) data can be produced for use in parameter calculations. FIGS. 8a-8d depict four exemplary examples. FIG. 8a illustrates an exemplary embodiment wherein the sensor array interface electronics 802 generates address vector 805 and passes data to multilevel threshold test 803 and binary threshold test 804. The result is that binary thresholding and multilevel quantization are performed simultaneously. FIG. 8b illustrates another exemplary configuration where multilevel quantization 813 and binary thresholding 814 are performed in a serial arrangement. This arrangement also alternatively enables a binary thresholding operation to be performed through a binary-valued decimation of the multilevel quantization output FIGS. 8c and 8d illustrate additional possible configurations where binary thresholding and quantization can be combined. FIG. 8c illustrates an exemplary configuration where array interface electronics and multilevel quantization are integrated 821 into a common process, algorithm component, or subsystem and wherein multilevel quantization values are passed to the binary thresholding or decimation operation. FIG. 8d illustrates an exemplary configuration where all of array interface electronics, multilevel quantization, and binary threshold processes are integrated together 831. Other variations and embodiments are possible and these are provided for by the invention.

The afore-described running sums can be used in post-scan calculations to determine averages, angles, and other derived measurements. These averages, angles, and other derived measurements can be either used directly or transformed into other types of control signals. The scanned tactile image data can also be presented to shape and image recognition processing. In some embodiments, this could be done in post-scan computation, although various aspects of shape and image recognition processing could be performed during scanning in other embodiments. In some implementations, shape and/or image recognition may be applied to interpreting tactile image data. In other embodiments, shape and/or image recognition may be used to assist with or implement tactile image measurements.

FIGS. 9a and 9b illustrate two different approaches of acquiring and algorithmically processing data from the tactile sensor array leveraging the running sum embodiments described above. FIG. 9a illustrates an embodiment comprising a combined data acquisition and data consolidation loop. In an exemplary embodiment, as each tactile sensor measurement of a given cell is obtained, each of the various running sums are updated. Post-scan computation may be performed when some or all of the data acquisition associated with the scan is finished. FIG. 9b illustrates an alternate embodiment comprising running sum calculations which are not begun until after all data is obtained from a scan of the entire tactile sensor array. These running sum calculations typically involve a data consolidation loop. The method of FIG. 9b can be more practical if the speed of process is inadequate for real-time processing. Other embodiments are possible and are provided for by the invention.

1 Exemplary Algorithmic Embodiments

Attention is now directed towards feature, elements, and methods exemplary software implementations the aforementioned and/or other related parameters from each contiguous tactile image. Specifically illustrated are exemplary calculations of geometric column and row center, average downward displacement or pressure, rotation angle, and horizontal and vertical tilt, which are meaningful representation of the user experience of the movement of a finger, hand, etc. on the tactile sensor array. Features of the invention include:

- Single-blob or multiple-blob,
- Single unitary sensor or an aggregation of multiple sensors,
- Single unitary scan or multiple parallel partitioned scans of a unitary sensor or aggregation of multiple sensors,
- Multiple partitioned scans synchronized or not synchronized,
- Per sensor-element calibration,
- Measurement thresholding,
- Noise-suppression filtering,
- Failed sensor-element exclusion and operation,
- Calculation of applied pressure and two planar centers of hand (or pliable object) contact,
- Calculation of roll, pitch, and yaw angles of hand (or pliable object) contact,
- Production of "continuous" (parameter) values,
- Parallel production of parameter rate (velocity, acceleration) values,
- Linear (scale, offset) and/or nonlinear mappings of parameter and rate values,
- Production of discrete (symbol) values from parameter and rate values,
- Parallel production of discrete (symbol) values from shape recognition,
- Context-driven (for example, shape, number of regions of contact, external instruction, etc.) derivations, mappings, and interpretation of parameter, rate, and symbol values,
- Multiple-blob cases can be processed as multiple completely independent single-blob cases or viewed compositely as a compound object,
- Parallel production of parameter, rate, and symbol values from gesture recognition,
- Syntax and parsing functions,
- Sample-and-hold of "continuous" (parameter) values according to events (for example the parallel production of a symbol),
- And assignment of parameter, rate, and symbol values to system outputs.

In the exposition below, a number of features are first developed in the context of a single unitary sensor and a single contiguous region of contact (more specifically, from the viewpoint of the thresholded measurements, a single blob). These are extended to the multiple contiguous region of contact (multiple-blob) case. Multiple-blob cases can be processed as multiple completely independent single-blobs, or compositely as a compound object. Next, partitioned scans, aggregation of multiple sensors, and distributed implementations are considered. The latter capabilities permit creation of larger sensor systems (including underlying visual displays) from aggregations of smaller modules.

It is noted that other variations and embodiments are also possible and are provided for by the invention.

1.1 Single-Blob Data Acquisition, Processing, and Production of Parameters, Rates, Symbols, and Outputs In this section, a number of capabilities, features, aspects, embodiments, and variations provided for by the invention are described in the context of "single-blob" data acquisition, processing, and production of parameters, rates, symbols, and outputs.

1.1.1 Exemplary Acquisition of Tactile Sensor Data

In one embodiment the tactile measurement value for each cell may be provided in the form of an input stream, *framein. This stream may be a serial input stream, or may be generated from the reading of a text file (for example "framein.txt"). The sequential order or proceeding direction of reading values needs to be consistent with the order of data in the text file. Similarly the algorithm may provide an output stream, *frameout, to another application or write the computation results to a file (for example, "frameout.txt"). Other implementations, for example employing partitions, linked lists, etc., are apparent to one skilled in the art and are provided for by the invention.

1.1.1.1 Exemplary Constants

The number of rows and columns in the sensor array may be respectively defined as constants ROWS and COLS. The THRESHOLD constant was described above. One skilled in the art may utilize other types of implementations that may use other constants, other structures, and/or no constants. These are provided for by the invention.

Alternatively, substitutes for these constants may be implemented as adjustable parameters. In some embodiments the comparative role of the THRESHOLD constant described earlier may be replaced by a varying quantity. This varying quantity may vary over the area of the sensor array, differentiated by groups of individual sensors or individual sensors themselves. In other embodiments, the varying quantity may be part of an adaptive capability of an embodiment.

1.1.1.2 Exemplary Iterator Variables

Variable ri is an iterator used to sequence the index of current row being scanned, and variable ci is an iterator used to sequence the index of current column being scanned. One skilled in the art may utilize other types of implementations that may use other iterators, other structures, and/or no iterators. This is provided for in the invention. Other iterators may be used in various realizations, for example in multi-touch implementations, or in the handling of measurement regions with complex shapes. Examples of these are seen in later discussion.

1.1.1.3 Handling of Individual Noisy, Defective, and Non-Uniform Sensor Elements Some noise conditions may result from flexing conditions within elastic materials comprising a higher resolution tactile sensor array. Additionally, individual tactile sensor elements may be damaged, out of calibration, or operate improperly due to external conditions with sensor interfacing connections or circuitry. As an example, there are three such noisy pixels below the left blob shown in FIG. 10a. To eliminate adverse effect by noisy and defective pixels, as well as small-scale non-convexity resulting from boundary serrations, a filtering process (such as a median filter) may be employed. Other methods, such as tagging the measurements of individual tactile sensor elements for omission or scaling in running sums or other calculations, are also possible and are provided for by the invention.

In an exemplary embodiment, an arrangement to identify and reject noisy and handle isolated problematic measurements of individual tactile sensor elements is provided as a first step during the scanning process, before any calculations are made on the measurement values. In one exemplary approach, the tactile measurement value from an active cell is labeled as a noisy sensor if there are no other active cells surrounding it. In embodiments directed to even higher resolutions, this approach may be extended to include small clusters of active cells if there are sufficiently few other active cells surrounding the cluster. More sophisticated systems may combine noisy cell designations for several cluster sizes so as to more carefully discern blob boundaries or other issues relating to a particular sensor array, type of sensor array, type of blob shape, etc.

Additionally, in some embodiments, an individual sensor that remains noisy for an extended period of time is flagged as a defective sensor. Blob identification and running sum algorithms may, for example, use indices associated with each individual sensor to identify specific sensors flagged as defective at the instant of scanning and accordingly compensate by omitting their measurement value from inclusion in the calculation. Unless the sensor array is sufficiently defective or of a poorly chosen resolution, typically the higher resolution is sufficient for a blob to have enough properly operating active cells to capture general trends in the region of the defective individual sensor without including the noisy measurement.

An example of a median filter type implementation is now provided. Other methods and embodiments are known to those skilled in the art and are provided for by the invention. In general, the "defining range" of surrounding inactive cells may need to be determined based on particulars of a given realization. In an exemplary case to be illustrated, a "defining range" of surrounding inactive cells is set to span a three column by three row range. In an embodiment of this situation, sensors of a previous, current, and next column and previous, current, and next rows are examined. If the current active cell is not the only active cell in that range, that cell is deemed not to be a noisy pixel. Otherwise, a cell is deemed to be an isolated noisy pixel, and its tactile measurement value will be forced to be zero. An exemplary implementation of this process is outlined in FIG. 10b.

The invention provides for a median filter or other noise suppression filters to be included as part of the scanning of the tactile sensor array. This can be accomplished in various ways as the scan progresses as is clear to one skilled in the art. Additionally, the invention provides for each sensor to be individually calibrated in implementations where that may be advantageous. Sensor-by-sensor measurement value scaling, offset, and/or nonlinear warpings may be invoked for all or selected sensor elements during data acquisition scans. Similarly, the invention provides for individual noisy or defective sensors may be tagged for omission during data acquisition scans.

In the remainder of this section, attention is directed to the remainder of the algorithmic elements provided for by the invention assuming any median filter and/or other noise suppression filters, omission of defective sensor element measurement, measurement value scaling, offset, and/or nonlinear warpings have already operated on the measurement data.

1.1.1.4 Exemplary Data Thresholding and Consolidation Via Running-Sum Loops

A scanning loop for sequencing through the geometric location of each tactile sensor cell may be composed of an outer iterative loop and an inner iterative loop, one loop for each of the geometric dimensions of the tactile sensor array. In an exemplary embodiment outer loop sequences the index of the current row being scanned in order, and the inner loop sequences the index of the current column being scanned in order. The order or direction of scanning is irrelevant as long as every cell is sequentially scanned. Other implementations, for example, employing partitions, linked lists, etc., are anticipated and provided for by the invention.

Note that in programming languages such as C, array indices start from 0 instead of 1. In an exemplary embodiment, scanning for each row begins from column 0 to column (COLS-1) and is repeated until the nested loop reaches the last row, (ROWS-1). In other embodiments of the exemplary calculations to be described, array indices may need to be shifted to begin with 1 accordingly as is clear to one skilled in the art. Additionally, other implementation details, adaptations, and variations of the ideas to be presented are provided for by the invention.

In order to define tactile image boundaries and limit the effect of noise, a constant THRESHOLD may be employed so that any tactile measurement value less than the THRESHOLD value are ignored. Tactile measurement sensors measuring tactile measurement values above the THRESHOLD value in a particular scan are referred as "active cells" for that scan herein after.

1.1.1.5 Exemplary Running Sum Variables

A variable, n may be declared as a variable that counts the number of active cells in a blob (i.e., each time an active cell is encountered, n gets incremented by one). Other embodiments are also possible and are provided for by the invention.

Similarly, a variable tp can be defined that builds the sum of the tactile measurement values of active cells, gets incremented by the tactile measurement value of each active cell. Other embodiments are also possible and are provided for by the invention.

A variable csum can be defined that builds the sum of all column indices of active cells for each row. Similarly variable rsum can be defined that builds the sum of all row indices of active cells for each column. Other embodiments are also possible and are provided for by the invention.

A variable wcsum can be defined that builds the sum of all column indices of cells with non-zero tactile measurement values multiplied by the tactile measurement values for each column. Such multiplication gives more "weight" in this sum to cells that measure larger tactile measurement values. Similarly, a variable wrsum can be defined that builds the sum of all row indices of active cells multiplied by the tactile measurement values for each row. Such multiplication gives more "weight" in this sum to cells that measure larger tactile measurement values. These tactile-measurement-weighted sums are later used to obtain weighted-center (center-of-pressure, center-of-relative-proximity, etc.) values in calculations analogous to those used in center-of-mass and moment of inertia calculations. Other embodiments are also possible and are provided for by the invention.

A variable csqsum can be defined that builds the sum of the square of column index for all active cells. Similarly, a variable crsum can be defined that builds the sum of the column index multiplied by row index for all active cells. Such exemplary variables csqsum and crsum, along with csum and rsum, may be used to implement an adapted least squares slope fitting method which through use of an inverse trigonometric function can be used to calculate the angle of finger rotation. Other embodiments are also possible, for example as may be used in singular value decomposition calculations, as is clear to one skilled in the art. These are provided for by the invention.

1.1.2 Exemplary Post-Scan Output Quantities

A post-scan calculation derives interactively adjusted control parameters from the running sums such as described above. Examples of these parameters can include:

POSITIONS/DISPLACEMENTS:
  left-right position or translation (FIG. 4a);
  forward-back position or translation (FIG. 4b);
  more-less downward displacement or translation (pressure) (FIG. 4c);
ANGLES/ROTATIONS:
  pivoting rotation (yaw) (FIG. 4d);
  left-right tilt (roll) (FIG. 4e);
  forward-back tilt (pitch) (FIG. 4f);
SHAPE-RECOGNITION PARAMETERS,
COMPOUND-IMAGE PARAMETERS,
MULTI-TOUCH PARAMETERS.

Positions/displacements and angles/rotations have been considered earlier, while shape-recognition, compound images, and multi-touch will be considered later.

As an example, a variable fitslp can be defined as the angle of pivoting (yaw) rotation of a finger in contact with the sensor array. Similarly, variables ctilt and rtilt can be defined as "raw" horizontal and vertical tilt measurements, respectively, of a finger in contact with the sensor array. Exemplary methods for calculating values for fitslp, ctilt, and rtilt as well as other exemplary parameters will be discussed later. Other embodiments are also possible and are provided for by the invention.

1.1.2.1 Exemplary Post-Scan Calculation of Average Tactile Measurement for a Blob The variable avgp is the average tactile measurement value across all the active cells in a frame and is obtained by dividing the total of tactile measurement values by number of active cells.

$$avgp = tp/n$$

Other embodiments are anticipated and are provided for by the invention.

1.1.2.2 Exemplary Post-Scan Calculation of Geometric Center Coordinates

The value of a variable for geometric column center, ccen, is determined by the sum of column indices of all active cells divided by the number of active cells, n. Similarly the value of a variable for geometric row center, rcen, is determined by the sum of row indices of all active cells divided by the number of active cells, n.

$$ccen = colsum/n$$

$$rcen = rowsum/n$$

Other embodiments are anticipated and are provided for by the invention.

1.1.2.3 Exemplary Post-Scan Calculation of Tactile Measurement Center Coordinates and Tilt Values In one embodiment, the value of horizontal tactile measurement (i.e., pressure center, proximity-center, etc.), cpres, is calculated by dividing weighted column sum, wcsum, by the product of number of active cells and average tactile measurement. Similarly, the value of vertical tactile measurement (i.e., pressure center, proximity-center, etc.) center, rpres, is calculated by dividing weighted row sum, wrsum, by the product of number of active cells and average tactile measurement.

$$cpres = wcsum/n$$

$$rpres = wrsum/n$$

These weighted sums enable the calculation of, for example, the weighted center of the tactile measurement, which can be used in calculating measurements of the tilting of a finger. In one embodiment, a primitive measure of horizontal tilt may be obtained by taking the difference between column center of pressure (or proximity) and geometric column center. Similarly a primitive measure of vertical tilt may be obtained by taking the difference between row center of pressure (or proximity) and geometric row center.

$$ctilt = cpres - ccen$$

$$rtilt = rpres - rcen$$

The greater the separation between the geometric and pressure (or proximity) centers is, the larger the calculated measurement of the tilting of the finger. It is noted that in practice, performance of the roll parameter in particular can be significantly improved over the primitive measure example provided above. Alternate embodiments of these and other measurements are anticipated and are provided for by the invention.

1.1.2.4 Nonlinear Warpings

It is noted that these tilt metrics are raw and in many embodiments may be more meaningful if compensation for finger rotation and various non-linear warpings are included. Further, for significantly large values of finger tilt, there can be a migration of geometric center that may be advantageously corrected for a better user experience.

1.1.2.5 Exemplary Post-Scan Calculation of Rotation Angle

In an exemplary embodiment for calculating finger rotation, a least squares fitting method is used to obtain the slope of an optimally interpolating line. Least squares fitting is a mathematical procedure for finding the best-fitting curve to a given set of points by minimizing the sum of the squares of the offsets. Other embodiments are also possible and are provided for by the invention.

Figure 11:
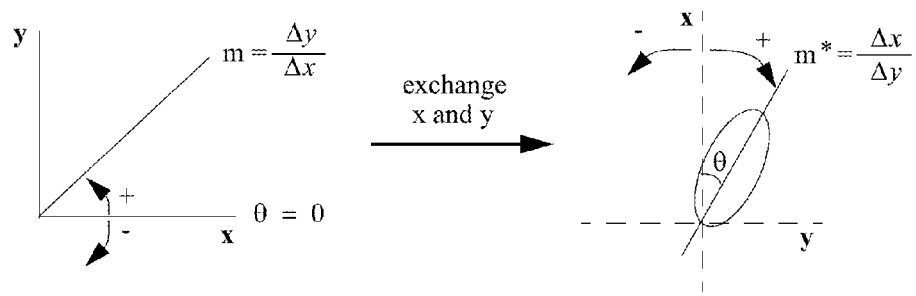
FIG. 11 illustrates use of an approach of reversing row and column coordinates (from the typically assumed coordinate system so as to simultaneously properly orient the zero-angle reference position and sign of the angle while avoiding infinite slope values for the most common natural range of hand positions.

In one embodiment, the geometry and the desired range of slope values may be first organized in such a way that the calculations involving divisions or inverse trigonometric functions do not obtain unbounded values. A convenient approach is to reverse the role of row and column coordinates from that of the typically assumed coordinate system, as shown in FIG. 11. This simple exchange provides at least three benefits:

It properly orients the zero-angle reference position,
It properly orients the sign of the angle, and
It avoids infinite value of slope for the most common natural range of hand positions.

In a thus adapted exemplary least square calculation utilizes the four running sum variables csum, rsum, csqsum, and crsum are summation of column index, row index, square of column index, and product of column index and row index of active cells, in respective order:

$$fitslp = \frac{n\sum_{i=1}^{n} x_i y_i - \sum_{i=1}^{n} x_i \sum_{i=1}^{n} y_i}{n\sum_{i=1}^{n} x_i^2 - \left(\sum_{i=1}^{n} x_i\right)^2}$$
$$= \frac{act(crsum) - csum * rsum}{act(csqsum) - csum * rsum}$$

Leveraging this calculation of (axis-exchanged) slope, an Arctan function can be used to calculate the rotation angle. For example:

$$\text{Arctan}_{radians}(fitslp)$$

Other embodiments for calculating the rotation angle (for example, eigenvectors of quadratic forms such as covariance matrix or 2-dimensional moment of inertia tensor), employing running sums or not, are also possible and are provided for by the invention. In particular, provisional patent application U.S. 61/210,250 "High-Performance Closed-Form Single-Scan Calculation of Oblong-Shape Rotation Angles from Binary Images of Arbitrary Size Using Running Sums" by Lester F. Ludwig (filed Mar. 14, 2009) describes highly efficient approaches for obtaining such eigenvectors in closed-form from running sums made entirely within the scan. This outcome is particularly advantageous as no complicated eigensystem algorithm is required, there is no need to have pre-computed averages available to compute the quadratic variances, the sensor measurement image does not need to be stored, and the number of computations that must be done during an image scan is streamlined. This co-pending provisional patent application is incorporated by reference.

1.1.3 User-Experience Correction of Calculated Parameters

The invention provides for one or more additional user experience enhancements of calculated parameters. Several examples are provided in this section.

1.1.3.1 Correction of Tilt Frame of Reference with Respect to Yaw Angle

Figure 12A:
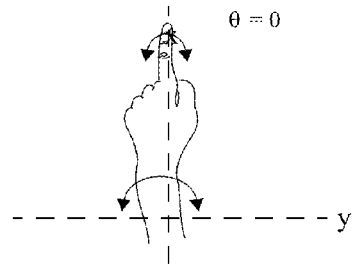
FIGS. 12a-12c illustrate how a rotation matrix may be used for correcting the tilt coordinates with knowledge of the measured yaw angle.
Figure 12B:
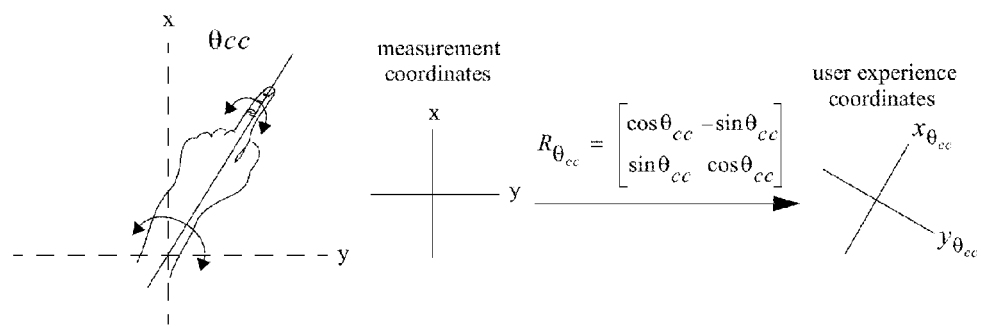
Figure 12C:
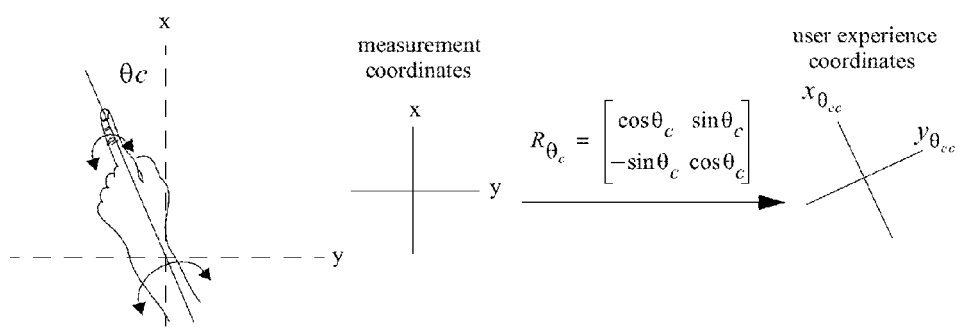

Users may place their wrists and finger at various angles, particularly when using the angle as a means of parameter control. Tilting a finger left or right involves pivoting the wrists, so the natural set of coordinates for the pivoting is always lined up with the angle of forearm and the wrist. The invention provides for a correction to compensate for the yaw angle the user's arm is placed in. A rotation matrix rotates the coordinates of a given vector, interpolating line in this case, by an angle θ. FIGS. 12a-12c illustrate how a rotation matrix such as $$R_\theta = \begin{bmatrix} \cos\theta & -\sin\theta \\ \sin\theta & \cos\theta \end{bmatrix}$$

may be used for correcting the tilt coordinates. An exemplary embodiment of this correction in the data flow is depicted in the top portion of FIG. 13.

1.1.3.2 Correction of Tilt Range of Motion as Restricted by Larger Yaw Angles As a first example of user-experience correction of calculated parameters, it is noted that placement of hand and wrist at a sufficiently large yaw angle can affect the range of motion of tilting. As the rotation angle increases in magnitude, the range of tilting motion decreases as mobile range of human wrists gets restricted. The invention provides for compensation for the expected tilt range variation as a function of measured yaw rotation angle. An exemplary embodiment is depicted in the middle portion of FIG. 13.

1.1.3.3 Tilt Metaphor Correction

As another example of user-experience correction of calculated parameters, the user and application may interpret the tilt measurement in a variety of ways. In one variation for this example, tilting the finger may be interpreted as changing an angle of an object, control dial, etc. in an application. In another variation for this example, tilting the finger may be interpreted by an application as changing the position of an object within a plane, shifting the position of one or more control sliders, etc. Typically each of these interpretations would require the application of at least linear, and typically nonlinear, mathematical transformations so as to obtain a matched user experience for the selected metaphor interpretation of tilt. In one embodiment, these mathematical transformations may be performed as illustrated in the lower portion of FIG. 13. The invention provides for embodiments with no, one, or a plurality of such metaphor interpretation of tilt.

1.1.3.4 Corrections of Geometric Center Measurements During Changes in Finger Tilt FIG. 14a shows the effects tilting of the finger can have on the geometric center. The first two rows of FIG. 14a show exemplary left-right "finger roll" effect resulting to various degrees in response to varying the left-right tilt of the finger. The result comprises a shift of the left-right geometric center (for example the column center). Of these, the top row shows exemplary migration of location of the tactile image corresponding to the exemplary tilt positions of the finger depicted in the lower of the top two rows. Similarly, the last two rows of FIG. 14a show exemplary forward-back "finger tilt" effect resulting to various degrees in response to varying the forward-back tilt of the finger.

The result comprises a shift of forward-back geometric center (for example the row center); of these the upper row shows exemplary migration of location of the tactile image corresponding to the exemplary tilt positions of the finger depicted in the lower of the bottom two rows.

Figure 14B:
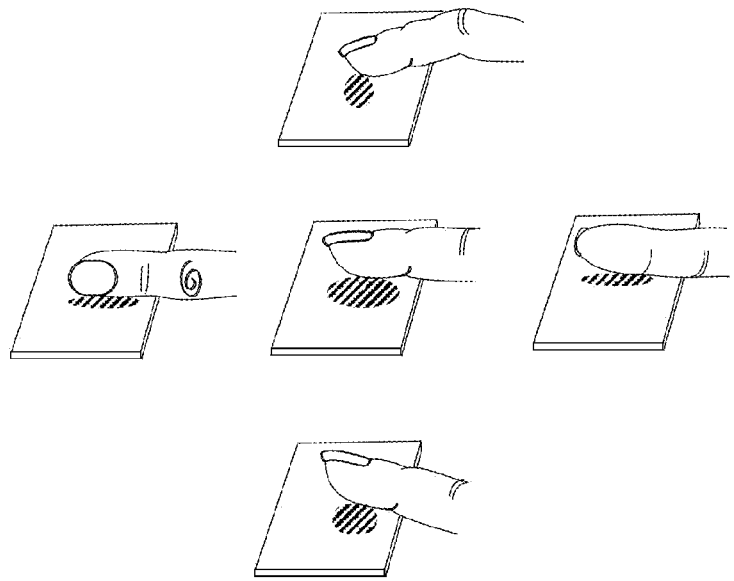

FIGS. 14a and 14b also illustrate examples of how the shape and area of contact varies depending on the movement of a finger on the tactile sensor array. In the provided examples, as the finger is tilted to the left or right, the shape of the area of contact becomes narrower and shifts away from the center to the left or right. Similarly in the provided examples, as the finger is tilted forward or backward, the shape of the area of contact becomes shorter and shifts away from the center forward or backward.

For a better user experience, the invention provides for embodiments to include systems and methods to compensate for these effects (i.e. for shifts in blob size, shape, and center) as part of the tilt measurement portions of the implementation. Additionally, the raw tilt measures can also typically be improved by additional processing.

Figure 15:
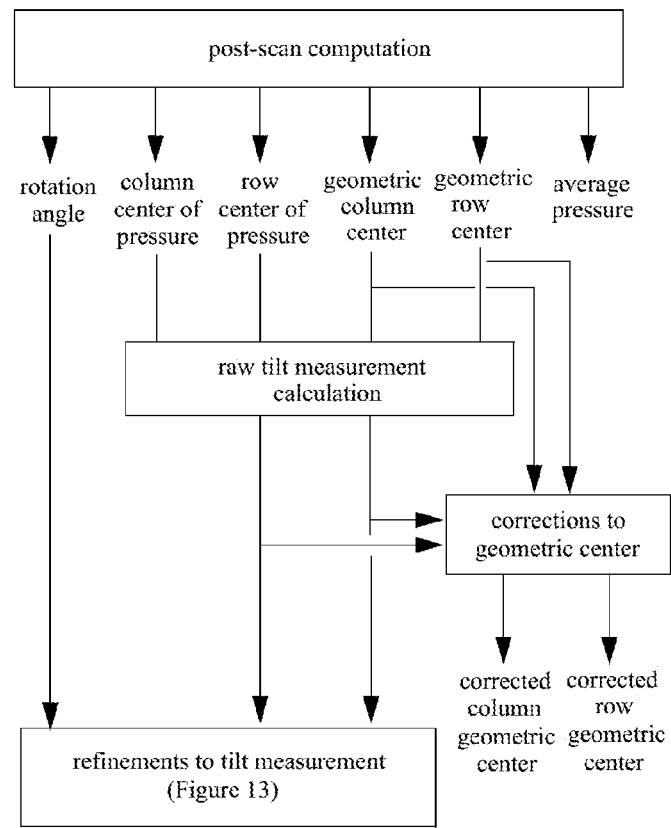
FIG. 15 depicts an exemplary embodiment wherein the raw tilt measurement is used to make corrections to the geometric center measurement under at least conditions of varying the tilt of the finger.

FIG. 15 depicts an exemplary embodiment wherein the raw tilt measurement is used to make corrections to the geometric center measurement under at least conditions of varying the tilt of the finger.

1.1.3.5 Correction of Tilt Influence on Yaw Angle

Figure 16:
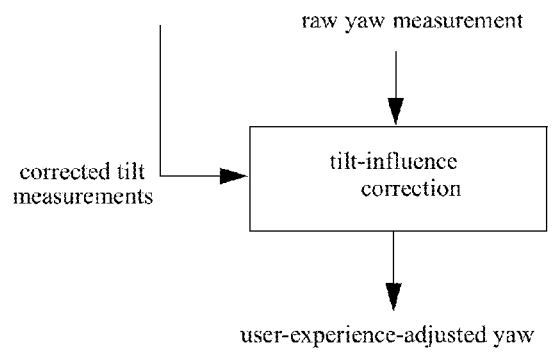
FIG. 16 depicts an exemplary embodiment for yaw angle compensation in systems and situations wherein the yaw measurement is sufficiently affected by tilting of the finger.

Additionally, the invention provides for yaw angle compensation for systems and situations wherein the yaw measurement is sufficiently affected by tilting of the finger. An exemplary embodiment of this correction in the data flow is shown in FIG. 16.

1.1.3.6 Finger Tilt Performance Improvement Via User Training of the System

In an embodiment, the system response can be trained according to example hand motions for a specific user. User training is considered in the next section.

1.1.4 User Trained Pattern-Recognition Version of the System

When using a tactile sensor array any rotation or tilt of the finger typically with in at least some way affect the shape of the tactile image. This affectation can be used in some implementation in assisting with corrections and compensations for finger roll and other effects (for example in correcting the geometric center). This affectation can also be used in some embodiments as an alternative to measure tilt of the finger and other parameters. In some embodiments, this affectation can be exploited so that measure tilt of the finger and other parameters can be made only from using simple threshold (on/off, "binary") tactile images, and hence the tactile sensor array can be simplified to that of a low cost threshold (on/off, "binary") tactile sensor array.

Since there is a great deal of variation from person to person, it is useful to include a way to train the invention to the particulars of an individual's hand and hand motions.

Figure 17A:
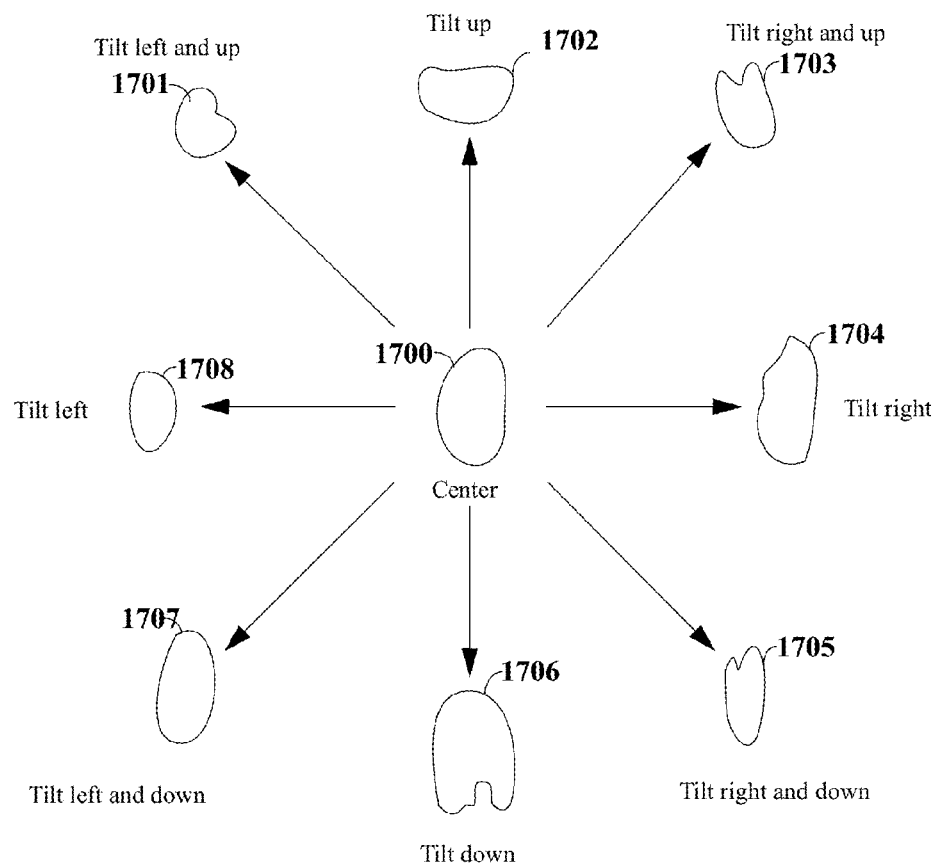
FIG. 17a depicts an exemplary user-measurement training procedure wherein a user is prompted to touch the tactile sensor array in a number of different positions.
Figure 17B:
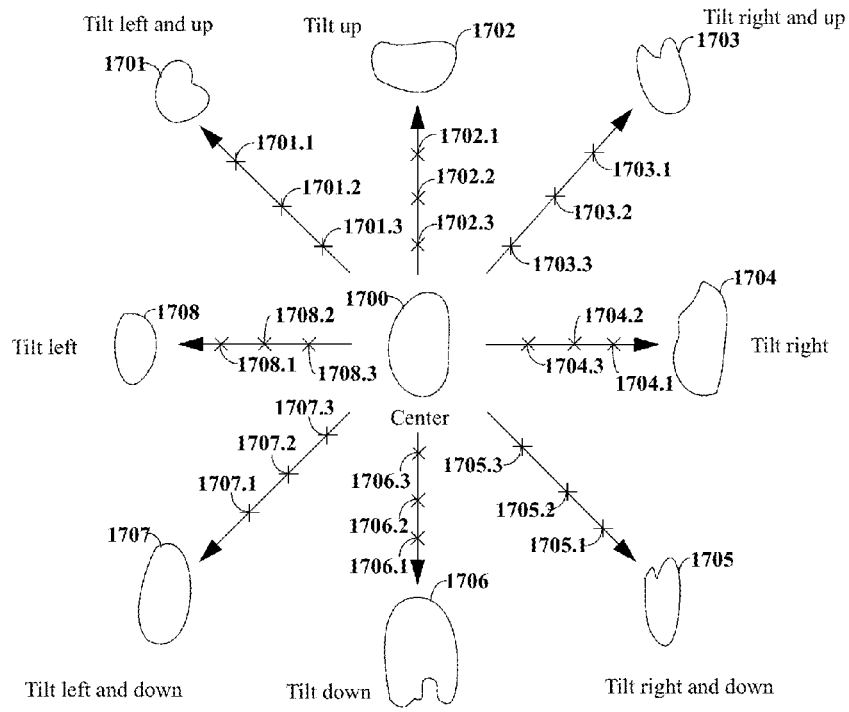
FIG. 17b depicts additional exemplary postures for use in a measurement training procedure for embodiments or cases wherein a particular user does not provide sufficient variation in image shape the training.
Figure 17C:
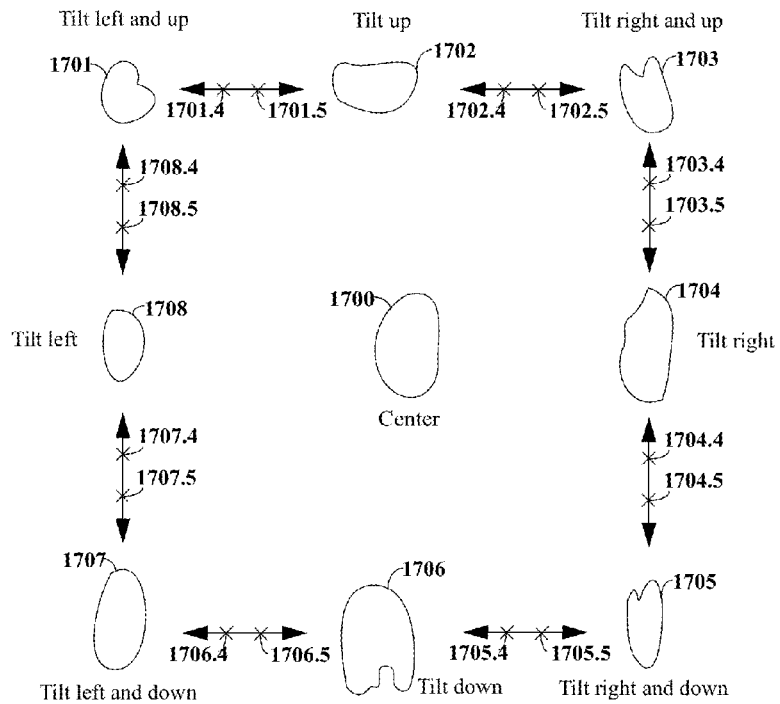
FIG. 17c depicts exemplary boundary-tracing trajectories for use in a measurement training procedure.

For example, in a computer-based application, a measurement training procedure will prompt a user to move their finger around within a number of different positions while it records the shapes, patterns, or data derived from it for later use specifically for that user. Typically most finger postures make a distinctive pattern. In one embodiment, a user-measurement training procedure could involve having the user prompted to touch the tactile sensor array in a number of different positions, for example as depicted in FIG. 17a. In some embodiments only extremal positions are recorded, such as the nine postures 1700-1708. In yet other embodiments, or cases wherein a particular user does not provide sufficient variation in image shape, additional postures can be included in the measurement training procedure, for example as depicted in FIG. 17b. In some embodiments, trajectories of hand motion as hand contact postures are changed may be recorded as part of the measurement training procedure, for example the eight radial trajectories as depicted in FIGS. 17a-17b, the boundary-tracing trajectories of FIG. 17c, as well as others that would be clear to one skilled in the art. All these are provided for by the invention.

The range in motion of the finger that can be measured by the sensor can subsequently be recorded in at least two ways. It can either be done with a timer, where the computer will prompt user to move his finger from position 1700 to position 1701, and the tactile image imprinted by the finger will be recorded at points 1701.3, 1701.2 and 1701.1. Another way would be for the computer to query user to tilt their finger a portion of the way, for example "Tilt your finger ⅔ of the full range" and record that imprint. Other methods are clear to one skilled in the art and are provided for by the invention.

Additionally, this training procedure allows other types of shapes and hand postures to be trained into the system as well. This capability expands the range of contact possibilities and applications considerably. For example, people with physical handicaps can more readily adapt the system to their particular abilities and needs.

Other approaches, applications, and techniques are clear to one skilled in the art and are provided for by the invention.

1.1.5 Shape and Posture Recognition

The invention provides for the recognition of shapes from simple threshold (on/off) tactile images using a variety of techniques. These may include ad-hoc methods (size classification, eccentricity classification, nearest neighbor scoring when compared or correlated with a shape library, etc.), formal shape recognition methods (such as the Hough transform), and various pattern recognition methods as is known to one skilled in the art. These may be used for a variety of functions. They may serve as a key element of the user-trained approaches described above, as an element in supporting compound image handling as described below, in other elements of the invention, and to produce a symbol, event, contextual identifier, or other result.

In some embodiments shape recognition elements may be used to recognize what portion of the hand (or other pliable object) is in contact with or proximate to the tactile sensor array. In some circumstances (for example, flat-finger contact) a single area of contact may imply additional hand posture information. In other circumstances, a constellation of contact areas (for example, a compound image, described further in Section 3, may imply a hand posture. The invention provides for the inclusion of posture recognition features.

1.1.6 Discrete (Symbol) and Continuous Parameters

The invention provides for the production of the following six parameter values from a single blob associated with the hand or other pliable object:

Calculation of downward pressure and two planar centers of contact area

Calculation of roll, pitch, and yaw angles of contact area.

In some embodiments, these six parameter values may take on a wider range (i.e., >3 and typically >>2) numerical values within a consecutive range—in that they are range of numerical values possible, the values taken on by these six parameters will be informally referred to as "continuous" (in contrast to a smaller set of binary values, or a set of non-consecutive "symbols").

These six parameter values may be numerically differentiated in time (for example, by simply taking the difference between values of the current and previous scan) to produce rate measurements for the parameters, such as velocity and (by numerically differentiating velocity) acceleration. These result in additional "continuous" rate values.

One or more parameter values and/or rate values may be individually, in combination, or within a numerical computation, submitted to one or more threshold tests. The outcomes of the threshold tests may be regarded as symbols (for example, what region of the sensor array is the center of contact in, has a roll angle velocity or acceleration exceeded a specified value, etc.). Additionally, aforementioned shape recognition functions may also generate symbols. The invention provides for one or both of the threshold and shape recognition elements to generate more than one symbol at a time (for example, several conditions may be satisfied at the same moment).

Figure 18:
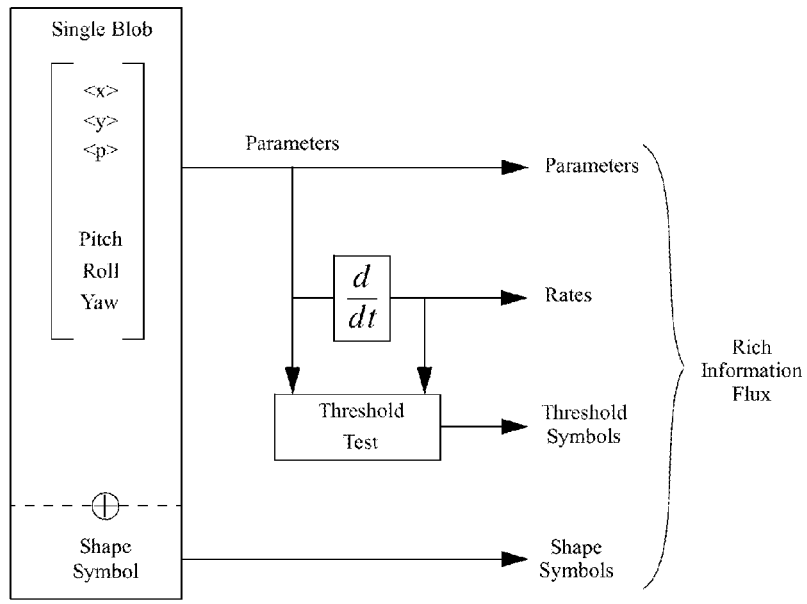
FIG. 18 illustrates an exemplary embodiment wherein parameters, rates, and symbols may be generated responsive to the user's contact with a tactile sensor array.

FIG. 18 illustrates an exemplary embodiment of these approaches. This demonstrates that simple contact with (or other operative stimulus of) the sensor array can produce a rich information flux of parameter, rate, and symbol values. Together with the rich metaphors available with the touch interface, a tremendous range of synergistic user interface opportunities are provided by the present invention.

Figure 19A:
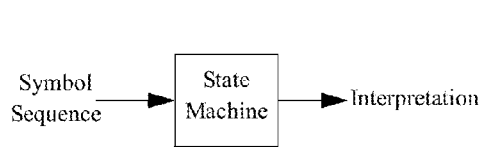
FIGS. 19a-19d depict exemplary operations acting on various parameters, rates, and symbols to produce other parameters, rates, and symbols, including operations such as sample/hold, interpretation, context, etc.
Figure 19B:
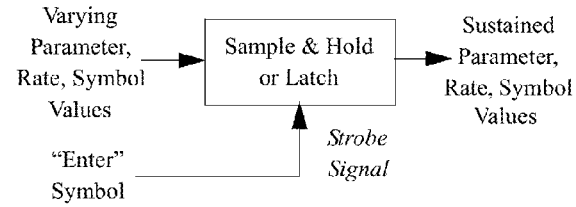
Figure 19C:
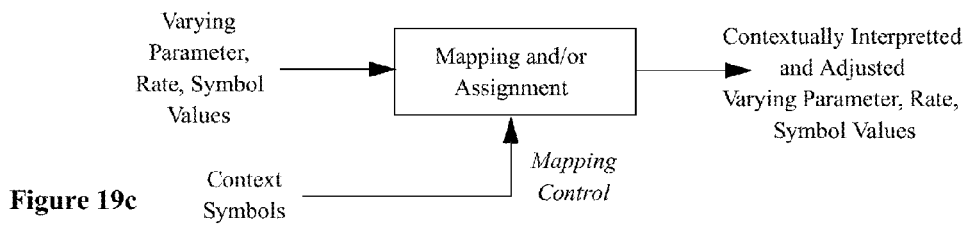
Figure 19D:
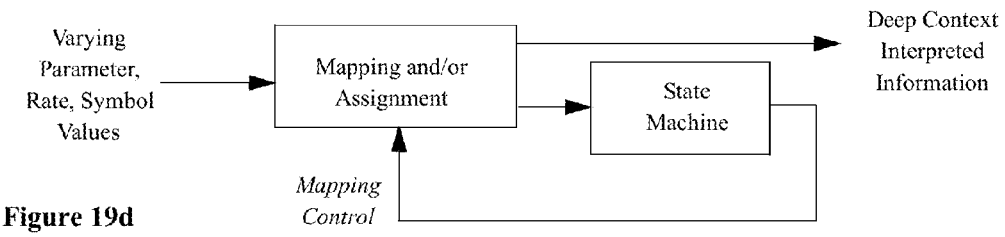

The invention affords and provides for yet further capabilities. For example, sequence of symbols may be directed to a state machine, as shown in FIG. 19a, to produce other symbols that serve as interpretations of one or more possible symbol sequences. In an embodiment, one or more symbols may be designated the meaning of an "Enter" key, permitting for sampling one or more varying parameter, rate, and/or symbol values and holding the value(s) until, for example, another "Enter" event, thus producing sustained values as illustrated in FIG. 19b. In an embodiment, one or more symbols may be designated as setting a context for interpretation or operation and thus control mapping and/or assignment operations on parameter, rate, and/or symbol values as shown in FIG. 19c. The operations associated with FIGS. 19a-19c may be combined to provide yet other capabilities. For example, the exemplary arrangement of FIG. 19d shows mapping and/or assignment operations that feed an interpretation state machine which in turn controls mapping and/or assignment operations. In implementations where context is involved, such as in arrangements such as those depicted in FIGS. 19b-19d, the invention provides for both context-oriented and context-free production of parameter, rate, and symbol values. The parallel production of context-oriented and context-free values may be useful to drive multiple applications simultaneously, for data recording, diagnostics, user feedback, and a wide range of other uses.

1.2 Extensions to Multiple-Blob Cases

In this section, the single blob unitary sensor array case is expanded to cover the multiple blob case. Multiple blobs can result from more than one finger, or contacting the sensor array with parts of the hand (such as a flat finger or palm) where there are sufficient indentations in the portion of contact (such as those associated with the joints of a flat finger). The invention provides for multiple-blob cases to be handled as multiple completely independent single-blob cases, viewed compositely as a compound object, context-specific, or simultaneous combinations of these.

In an exemplary embodiment, a small amount of image-boundary data is kept as the sensor array is scanned. This data can be used to determine if newly scanned active pixels pertain to an existing blob or are from a new blob. Each contiguous blob is assigned an index for identification, and running sums are separately computed. The invention provides for circumstances wherein initially separate identified blobs are found to merge later in the scan. The invention also provides for limiting the roles of spatial quantization effects, noise and individual sensor element failures from confusing blob identification processes.

1.2.1 Discerning Multiple Regions of Contact and Creating Separate Running Sums for Each In order to process data where there are multiple instances of blobs on a tactile sensor array, the system needs to be able to handle computation for multiple instances of blobs. Such computation process will involve pre-scan initialization, scanning process, and running sum calculation stage. In some embodiments, identifying new and existing blobs, keeping track of number of blobs, and updating running sum variables and other data collection for each blob accordingly may all take place simultaneously during the scanning process. Further, identifying new and existing blobs involve identifying edge boundary of blobs and the number of non-active cells in the region being examined.

Figure 20:
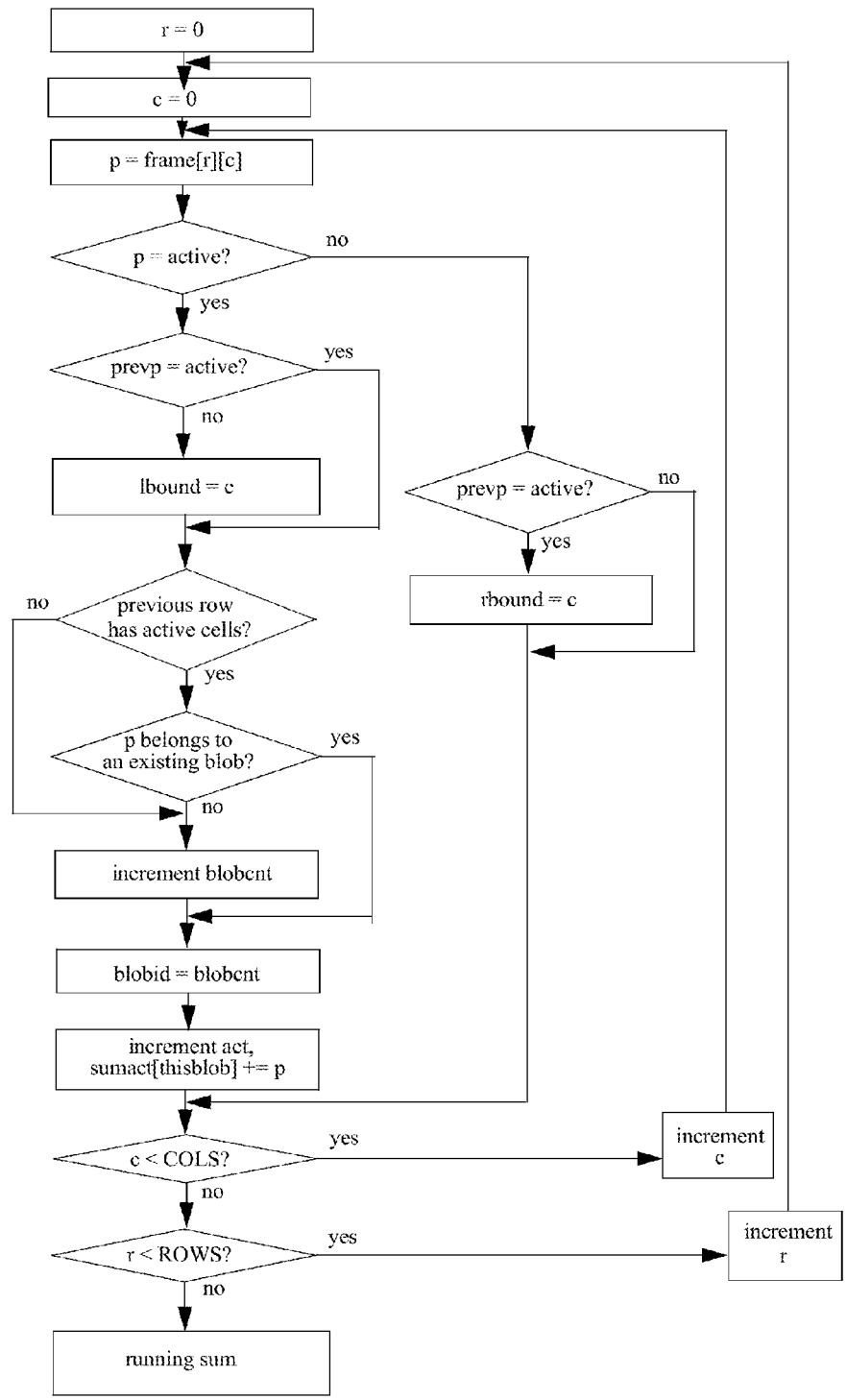
FIG. 20 illustrates an exemplary scanning process sequence.

FIG. 20 illustrates an exemplary scanning process sequence in detail, as explained below.

In pre-scan initialization stage, variables are initialized and empty lists are created. These variables include actcnt, which stores the number of blobs for each frame, totalperblob, which stores the sum of active cells in each blob, totalbcnt, which stores the total number of blobs, bcntthisrow, which stores the number of blobs in the current row, colsum and rowsum, which store the sum of column and row indices in each blob, and wcolsum and wrowsum, and the sum of the product of column and row indices and the tactile measurement value. Also, the lists that store the attributes for each blob are created. These lists include cntperblob, which stores the number of active cells in each blob, and totalperblob, which stores the total tactile measurement values for each blob.

When the scanning process begins, each row of cells is scanned in order, from row 1 to the last row, row ROW. In scanning of each row, each cell of column 1 to the last column, column COLS, is scanned in order.

When a first cell with a tactile measurement value greater than the threshold value is discovered, the first blob is found, and the number of blobs, totalbcnt, is incremented from 0 to 1. It also represents the left edge of the blob in the current row, thus the column index gets assigned to a variable that stores the column index of left side of edge, ledge. If totalbcnt is not zero, the system checks if the current cell is part of an existing blob. The checking process is done by comparing the column indices of left and right edge to that of the previous row. If the difference is 0 or 1, the current cell is deemed to belong to the same previously identified and indexed blob. Otherwise, the current cell is deemed to be part of another (new) blob.

1.2.2 Handling Effects of Higher Sensor Spatial Resolution, Sensor Cell Failure, and Noise for Multiple-Blob Identification Good multiple-blob handling performance with higher sensor spatial resolution becomes more complex when the resolution of tactile sensor array is higher. The higher resolution surprisingly can lead to additional considerations and issues. For example, the pattern of active cells comprising a given blob can often comprise one or more jagged boundary portions, i.e., where the blob boundary is serrated. The top portion of FIG. 10a shows an exemplary graphical representation of the active cells comprising a blob for an exemplary tactile sensor array offering a higher spatial resolution. The serrations at the boundary make the measured blob geometry non-convex, albeit at a small scale.

Without appropriate handling, blob non-convexity (be it at this small-scale of boundary serrations or at a larger scale such as "V" shaped tactile images, "W" shaped tactile images, "hand-print" shaped tactile images, etc.) can confuse the blob count and measurement allocations in the algorithms such as those described above. Larger-scale non-convexity will be considered in a subsequent section. In this section, attention is directed to arrangements for handling non-convexity resulting from small-scale boundary serrations as a "noise" condition that could otherwise cause problems in multiple-blob algorithms.

The aforementioned noise condition may be characterized more generally as follows:

any part of a blob may contain isolated or small clusters of non-active cells, there may be isolated or small clusters of active cells that are not part of a blob.

Here a noisy pixel is regarded as a pixel whose reported tactile measurement values are greater than the threshold as caused by dysfunction or random effects rather than by actual tactile stimulation. For example, there are three such noisy pixels below the left blob shown in FIG. 10a. These "noisy" pixels are sometimes more abundant in the systems with higher resolution. Noisy pixels can have adverse affect on the accuracy of calculation by distorting parameter calculations, confusing shape recognition, and/or being falsely counted as artificial additional blobs.

1.2.3 Exemplary Multiple-Blob Identification and Parsing Algorithm for Convex Blobs and Serrated-Edge Blobs that are Otherwise Convex (Small-Scale Non-Convexity)

In an exemplary implementation, a row scanning process searches for a left boundary or right boundary of blobs of active cells. Attributes of each blob include left boundary column index, right boundary column index, and blob ID. The lists for these attributes are created for each row and updated as the scanning proceeds. As blobs are found and identified, the values of the attributes are appended to the end of the lists in the order they are found, so that the $k^{th}$ element across all the lists belongs to one blob.

In an exemplary embodiment, when an active cell is encountered and if the cell does not belong to a known blob, a record for a new blob is created or populated. In such an approach, then, when the first active cell is detected, the first blob is deemed to have been found. When an active cell is detected after a non-active cell, it is checked if the column index of the cell is within the range of a known blob in the previous row. If this index check test fails, this can be interpreted as implying a new blob has been found: should this be the case, the number of total blobs is incremented by 1, the number of total blobs is assigned as the blob ID, and the column index is recorded.

If an active cell is found and if there are no known blobs in the previous row, this is deemed as a new blob found as there are no known blobs whose range are compared. The series of consecutive, following active cells belong to the same blob as the first active cell in the series, and the test is omitted.

When a non-active cell is detected after an active cell, this means the scanning has reached the right edge of the blob in the current row: the column index of the cell minus one is appended to the list that stores the column index of the right edge of blobs. How the left and right boundary is detected and how blobs are identified will be discussed in more detail in the next section.

1.2.3.1 Finding Left Boundary

A left boundary detected signifies existence of a new blob in the current row being scanned. If there is an active cell against the left edge of the tactile sensor array, column 1 is considered as left boundary in that row of that instance of blob. If the cell at column 2 is active, and the neighboring cell to the left, which is column 1, is not active, column 2 is considered as left boundary in that row of that instance of blob. If the cell at column 3 is active, and cells at column 1 and 2 are non-active, column 3 is considered as left boundary in that row of that instance of blob. And the checking process continues until it reaches the last column. From column 4 to last column, if a cell at column c is active and the two neighboring column cells to the left of that are non-active cells, column c is considered as left boundary in that row of that instance of blob.

The reason for consideration of the neighboring cells is because as the resolution of the tactile sensor array sensor array increases, the measurement data may begin to contain cells inaccurately deemed to be inactive that in fact are supposed to be part of a blob. For simplicity of discussion, such inaccurately inactive cells will be referred to as "blank cells." The data set used in example under consideration tends to contain one or two consecutive blank cells. In other cases where the data sets exhibit a different pattern, a value other than 2 can be chosen according to an empirically determined behavior of data set. For example, if a data set exhibit a maximum of four blank cells that are supposed to be part of a blob, then the number of neighboring cells checked needs to be increased to 4 instead of 2, then column 2, 3, 4, and 5 will be special cases instead of just column 1, 2, and 3 as column numbers less than 5 minus that arbitrary number, 4, will be less than 1. (Some programming languages, such as Mathematica™ required that indices for arrays start with 1; for these languages checking for a cell in column or row number 0 or less will result in an error condition.)

1.2.3.2 Blob Identification

When an active cell is scanned, after the blob ID is identified, all the accounting variables for calculations are updated. When a left boundary of a blob is found, it is checked if the current cell belongs to a known blob. The procedure checks if the current column is within 3 cells to the left boundary and within 3 cells to the right boundary of all existing blobs in the previous row. Again, a value other than 3 can be chosen according to an empirically determined behavior of data set. If the condition meets, the current cell is assigned with the corresponding blob ID. To eliminate redundancy, this test is only executed when left boundary of a blob is found, because any active cell after the left boundary and before the right boundary will have the same blob ID. When a column with left boundary is not within the range, the total number of blobs gets incremented by 1 and a new blob ID is assigned. The new blob ID value is equivalent to the total number of blobs.

1.2.3.3 Finding Right Boundary

Finding right boundary is done in a similar method as finding left boundary. If a non-active cell is detected after an active cell and if the neighboring two cells to the right is non-active, then the previous column is determined to be the right boundary in that row of that instance of blob. If there is an active cell at the right edge of the tactile sensor array, the last column is considered as the right boundary in that row of that instance of blob. If an active cell is in current column being scanned and is in a position that is one column away from the last column, and further if the neighboring cell to the left is active and if the neighboring cell to the right (i.e., the last column) is not active, then the column being scanned is deemed as the right boundary in that row of that particular blob.

1.2.4 Handling Large-Scale Non-Convexity of Blobs

As mentioned earlier, the large-scale shape of blobs also may not always be convex. Depending on which side of a blob the non-convexity is present relative to the direction of scanning, blob accounting algorithms such as those described thus far may give inconsistent results in terms of the numbers of blobs and related calculations. For example, consider an inverted V-shaped blob. As the scanning reaches the bottom part where there is a gap in the shape of the blob, the separate local parts one of the same blob may be recognized as separate blobs. Including a comparison of the information of blobs on the current row and the previous row can be used in addressing this problem. For example, in one embodiment at the end of scanning and processing current row the number of the blobs in the previous row, bcntprevrow, may be compared to the number of the blobs in the current row, bcntthisrow.

If the number of blobs in the current row is less than that of the previous row and if the number of blobs in the current row is not zero, this suggests separate blob regions have merged in the current row (i.e., the blob is V-shaped in that local region). The lists that store blob IDs for both rows, bIDprevrow and bIDthisrow, can be compared to identify the blob that is present in the previous row but not in the current row.

The blob number assigned to such blob may be stored in a variable (for example, a variable named compid) and the blob number assigned to the blob present in both row is stored in another variable (for example, a variable named srcid). Then, the left and right boundary of the blobs identified by compid and srcid can be compared. If the spatial interval between the left and right boundary of the current row spans the spatial interval from the left boundary to the right boundary of the compid blob in the previous row, then the two blob segments associated with the variables (here, compid and srcid) are deemed to be merged. If one of the blobs was incorrectly recognized as another blob and the total number of blobs has been incremented by one, subsequent corrections can be made: The total number of blobs will be decremented by one, and all the elements in running sum variables' list in account of the blob identified by compid will be consolidated to that of the srcid blob. Then the elements at position compid of running sum variables will be emptied and the record will be deleted. On the other hand, if the comparison test fails, it means the scanning has reached the bottom end of the blob identified by compid. This process, which can be used to handle a case such as the example depicted in FIG. 21a, is outlined in FIG. 21b.

Figure 21A:
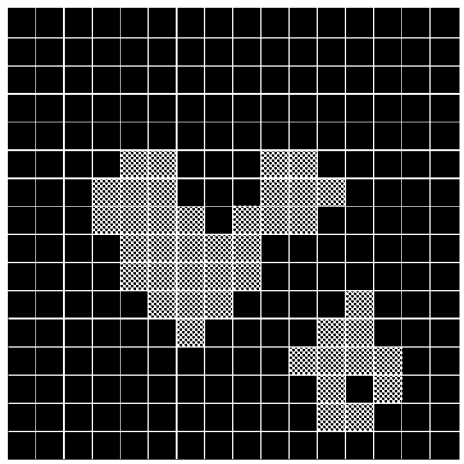
FIG. 21a depicts an exemplary data image (pressure, proximity, etc.) comprising multiple blobs and a defective pixel.

As illustrated in the example depicted in FIG. 21a, at the end of row 8 in this specific case, the list of blob IDs that are present in the current row is {1} and the list of blob IDs that are present in the previous row is {1,2}. So 1 is stored in the variable, srcid, and 2 is stored in the variable, compid. Blob 2, compid, is present in the previous row but not in the current row, thus, the left and right boundary of blob 2 from the previous row will be examined. The column index of the left boundary of blob 2 in the previous row is 10 and that of the right boundary is 12. The left boundary of the blob identified by srcid, blob 1, in the current row is column 4 and the right boundary is column 11. The range of column indices in this same blob is column 1 through column 14, which spans the width of compid, so blob 1 and blob 2 are to be merged. The values of running sum variables of compid, blob 2, will be added to those of srcid, blob 1, and the second element of the lists of the variables will be set to zero, since compid, blob 2, turns out it is not a separate blob.

If the number of blobs in the current row is more than that of the previous row and if the same blob ID appears more than once in the bIDthisrow, the blob may be deemed to have a non-convex shape in the local region, or in other words, the blob is inverted V-shaped. An exemplary graphical representation is illustrated in FIG. 21c.

The process extracts the repeated elements in the bIDthisrow. The elements in the same position as the extracted element from leftb and rightb lists are extracted as well, and they get attached to those of the first occurrence. The leftb and rightb elements now become lists rather than elements. If the test fails, in other words, if there are no repeated blobs, nothing is done. An example embodiment of this exemplary process is outlined in FIG. 21d.

Figure 21C:
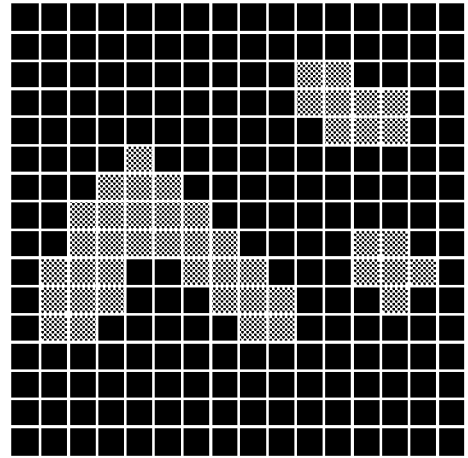
FIG. 21c depicts an exemplary data image comprising an exemplary non-convex blob.
Figure 21B:
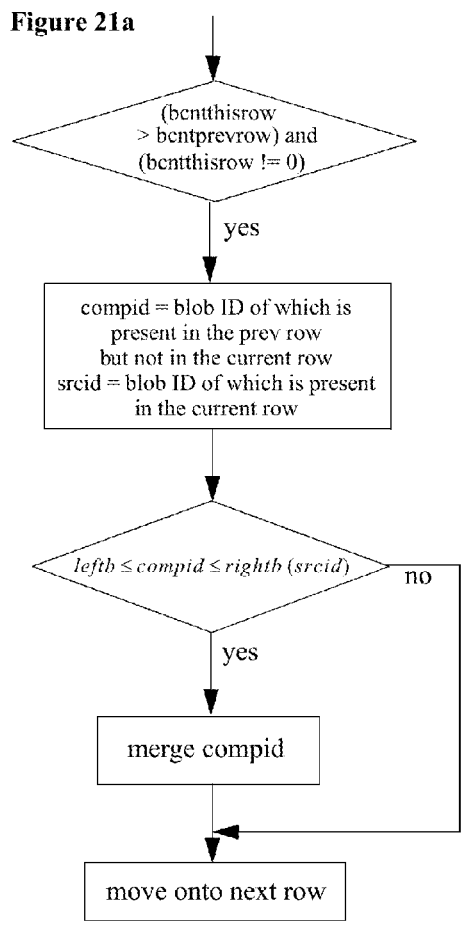
FIG. 21b depicts an exemplary process for identifying and indexing individual blobs within such data.
Figure 21D:
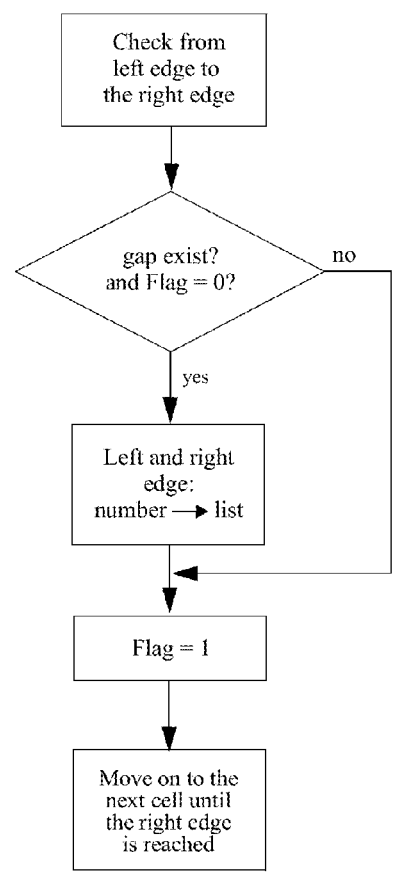
FIG. 21d depicts an exemplary process for identifying and indexing individual blobs within such data.

For example, at the end of row 10 in this specific case illustrated in FIG. 21c, the list of blob IDs that are present in row 10 is {2, 2, 3} and the list of blob IDs that are present in the previous row is {2, 3}, and the leftb contains {2, 7, 13} and rightb contains {4, 9, 15}. So blob 2 gets counted twice in this row, and both 2 and 7 as the left boundary belongs to blob 2. Hence 2 and 7 are combined as a list and the list gets stored in leftb. The list now contains {{2, 7}, 13} instead of {2, 7, 13}. Same method is applied to the list rightb. The first two elements in the rightb list, 4 and 9, belong to blob 2, so they are combined as a list and the list gets stored in rightb. The rightb list contains {{4, 9}, 15} instead of {4, 9, 15}.

Figure 21E:
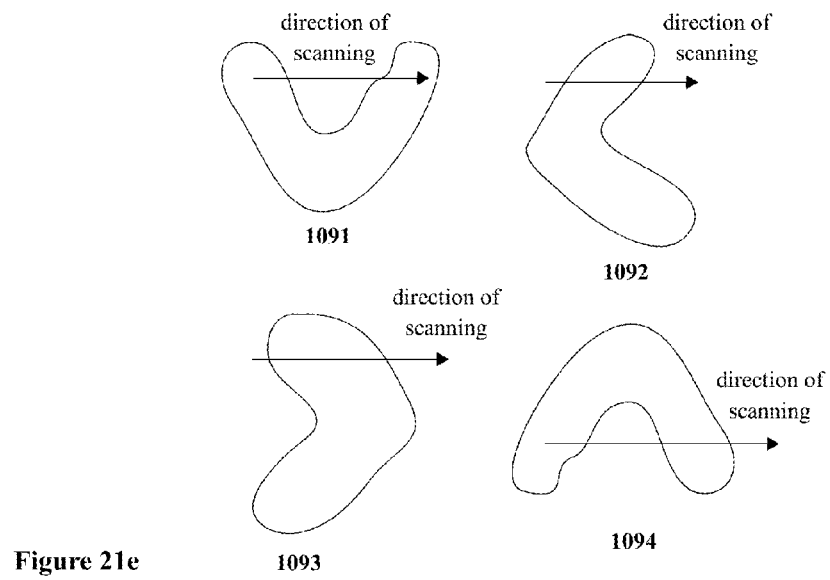
FIG. 21e depicts example orientations of exemplary non-convex blobs that result in various outcomes during a scan of a particular orientation.

When the left or right side of a blob is non-convex, no extra steps are needed. This is because the direction of scanning does not encounter multiple crossings of the blob. As a result, the blobs are processed as would blobs that are round or oval shaped, although the left and right boundary of one blob could even meander considerably. Two examples 1092, 1093 of this situation are illustrated in FIG. 21e.

1.2.5 Multiple-Blob Parameter, Rate, and Symbol Production

The invention provides for the expansion of the single blob arrangement of FIG. 18 so as to handle multiple independent individual blobs. In an embodiment, this may be handled by replicating the arrangement of FIG. 18, or by multiplexing these operations among the running sums associated with each of the multiple blobs.

2. Compound Hand Postures

In general, contact between the tactile-sensor array and multiple parts of the same hand forfeits some degrees of freedom but introduces others. For example, if the end joints of two fingers are pressed against the sensor array as in FIG. 5, it will be difficult or impossible to induce variations in the image of one of the end joints in six different dimensions while keeping the image of the other end joints fixed. However, there are other parameters that can be varied, such as the angle between two fingers, the difference in coordinates of the finger tips, and the differences in pressure applied by each finger.

Figure 22A:
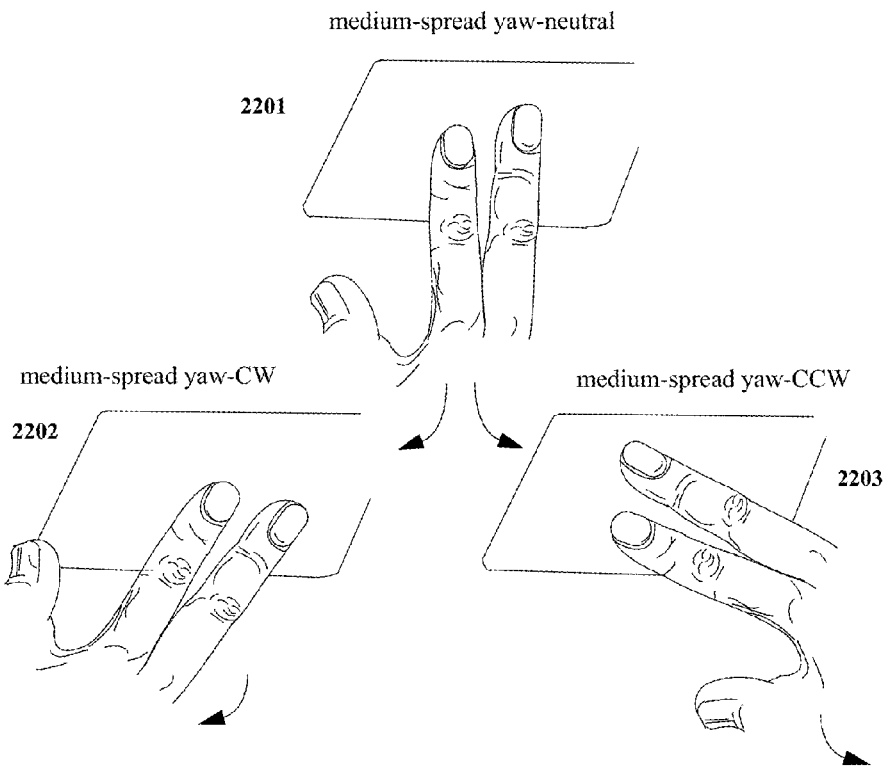
Figure 22B:
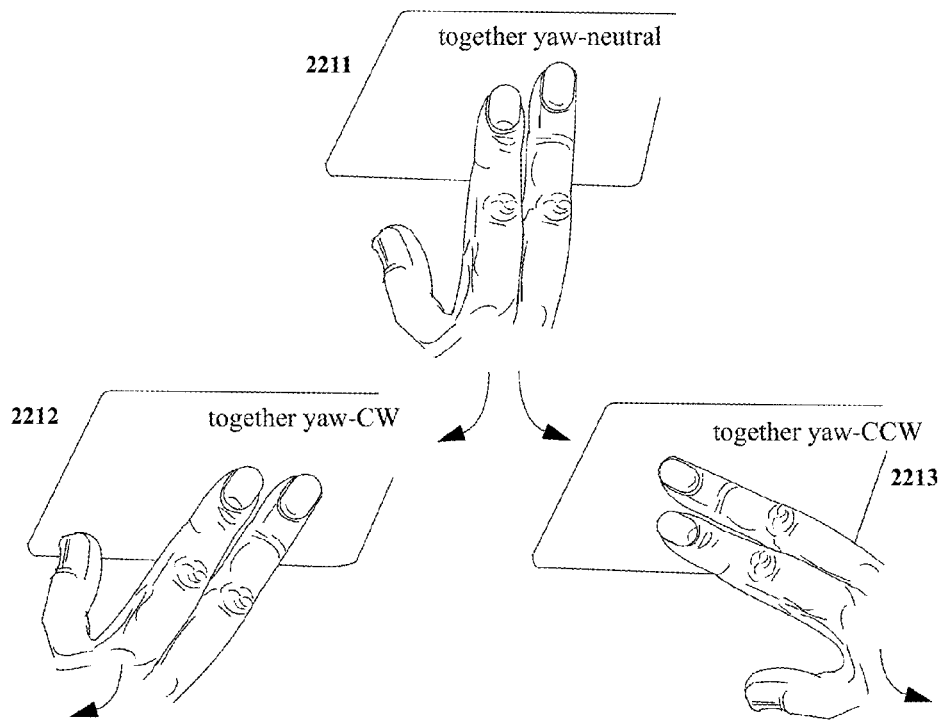

Consider, for example, contact of a tactile sensor array by a two-finger posture such as in the situations depicted in the examples shown in FIGS. 22a and 22b. The two fingers may be spread apart somewhat, as in the top three cases 2201-2203 in the figure, or may be brought together, as in the bottom three cases 2211-2213. In this example, the image of the two-finger posture could be considered as two separate regions of contact, or may be interpreted as a compound image comprising an asterism or constellation of smaller separated blobs.

When interpreted as a compound image, extracted parameters such as geometric center, average downward pressure, tilt (pitch and roll), and pivot (yaw) may be calculated for the entirety of the asterism or constellation of smaller blobs. Additionally, other parameters associated with the asterism or constellation may be calculated as well, such as the aforementioned angle of separation between the fingers. Other examples include the difference in downward pressure applied by the two fingers, the difference between the left-right ("x") centers of the two fingertips, and the difference between the two forward-back ("y") centers of the two fingertips. Other compound image parameters are possible and are provided for by the invention.

Figure 23A:
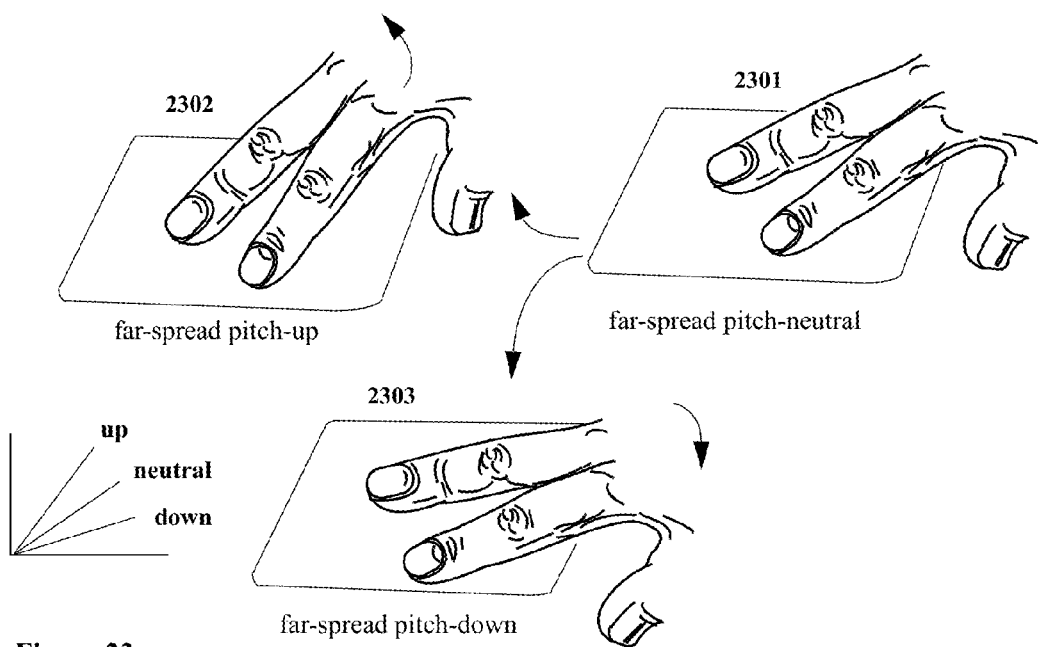
Figure 23B:
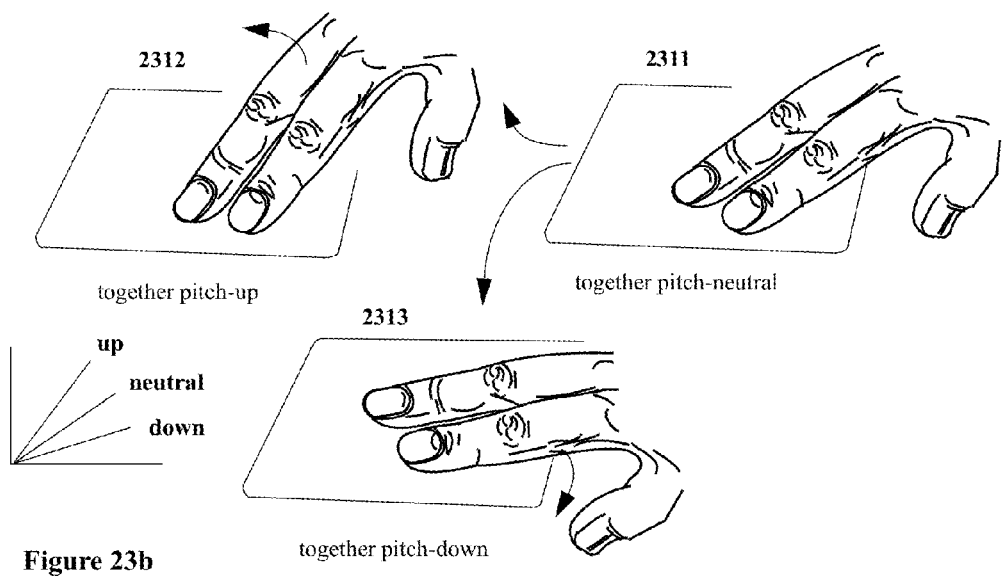

FIGS. 22a and 22b illustrate examples of how the pivot (yaw) parameter may be varied independently from the newly introduced finger separation parameter. The hand can pivot clockwise 2202, 2212, or counter-clockwise 2203, 2213 from the neutral position 2201, 2211. Similarly, FIGS. 23a and 23b show examples of how the pitch can be raised 2302, 2312 or lowered 2303, 2313 with respect to a neutral position 2301, 2311, while independently from these motions the two fingers are spread apart 2301-2303 or brought together 2311-2313. Note the finger spread can be varied considerably in this two-finger posture—for example the finger spread depicted in FIG. 23a is larger than that of FIG. 22a.

Figure 24B:
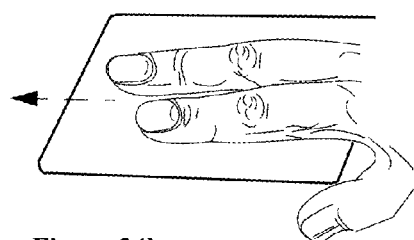
Figure 24C:
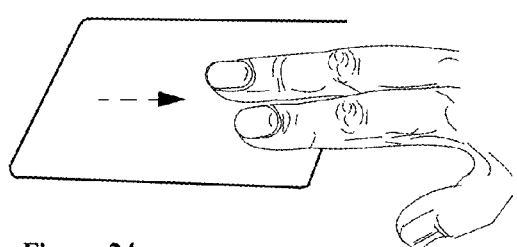
Figure 24A:
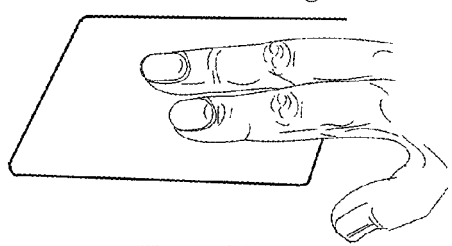
Figure 24D:
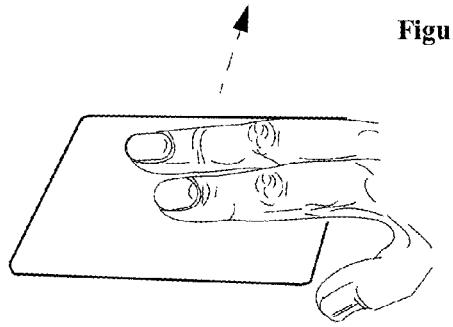
Figure 24E:
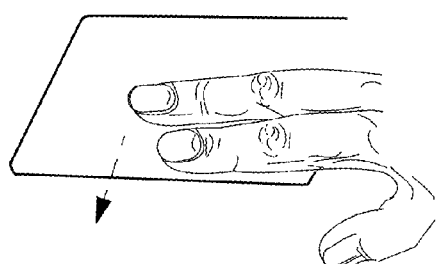

Similarly, FIGS. 24b-24c show exemplary forward-backward repositioning of a closely spaced two-finger posture with respect to the exemplary neutral posture of FIG. 24a, and FIGS. 24d-24e show exemplary left-right repositioning of a closely spaced two-finger posture with respect to the exemplary neutral posture of FIG. 24a. FIGS. 25a-25e illustrate similar exemplary neutral and repositions as FIGS. 24a-24e but with the fingers spread. Thus again, finger spread is independent of forward-backward and left-right positioning. Finger spread is similarly independent of downward pressure and finger roll. Similarly, differential downward pressure is also independent of composite image x position, y position, average pressure, roll, pitch, and yaw. Additionally, finger spread can be viewed as an angle, or, if the fingers are permitted to curl, are further separable into independent differential "x" and "y" components.

In general, compound images can be adapted to provide control over many more parameters than a single contiguous image can. For example, the two-finger postures considered above can readily provide a nine-parameter set relating to the pair of fingers as a separate composite object adjustable within an ergonomically comfortable range. One example nine-parameter set the two-finger postures consider above is:
    composite average x position;
    inter-finger differential x position;
    composite average y position;
    inter-finger differential y position;
    composite average pressure;
    inter-finger differential pressure;
    composite roll;
    composite pitch;
    composite yaw.

As another example, by using the whole hand pressed flat against the sensor array including the palm and wrist, it is readily possible to vary as many as sixteen or more parameters independently of one another. A single hand held in any of a variety of arched or partially-arched postures provides a very wide range of postures that can be recognized and parameters that can be calculated.

2.1 Additional Operations for Compound Postures

Figure 26A:
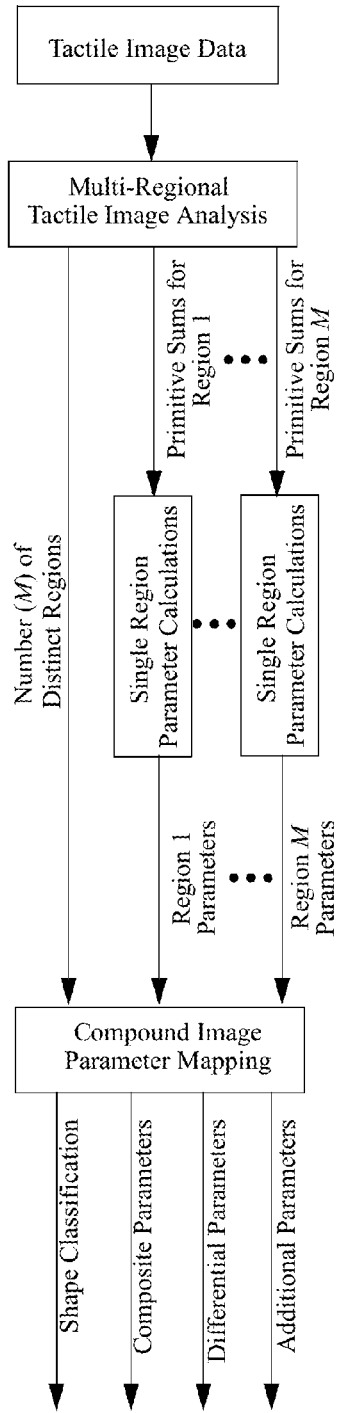
FIG. 26a, 26b, 27, and 28 depict various exemplary approaches to the handling of compound posture data images.
Figure 26B:
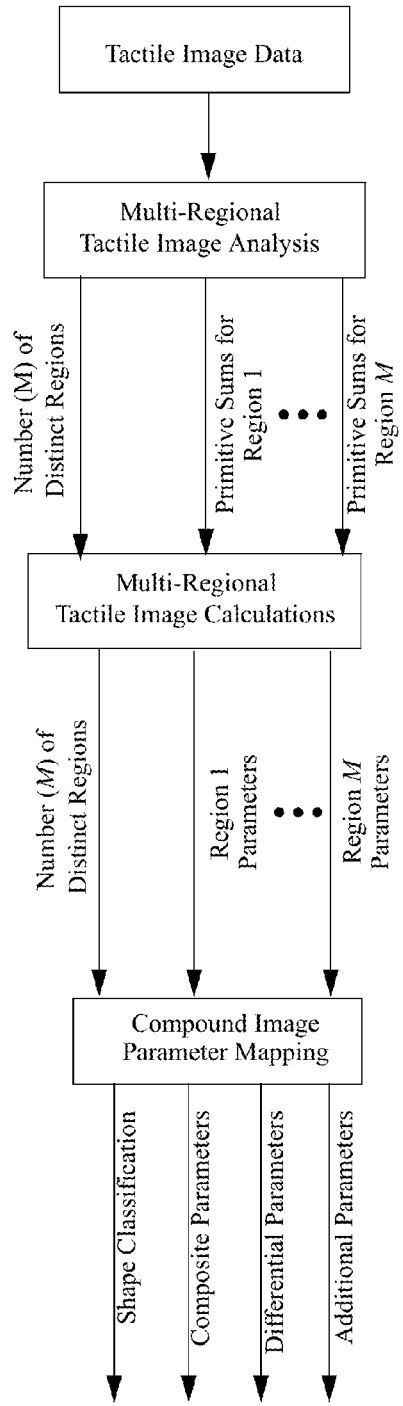

There are number of ways for implementing the handling of compound posture data images. Two contrasting examples are depicted in FIGS. 26a and 26b, although many other possibilities exist and are provided for by the invention. In the exemplary embodiment of FIG. 26a, tactile image data is examined for the number "M" of isolated blobs ("regions") and the primitive running sums are calculated for each blob. This may be done, for example, with the algorithms described earlier. Post-scan calculations may then be performed for each blob, each of these producing an extracted parameter set (for example, x position, y position, average pressure, roll, pitch, yaw) uniquely associated with each of the M blobs ("regions"). The total number of blobs and the extracted parameter sets are directed to a compound image parameter mapping function to produce various types of outputs, including:

Shape classification (for example finger tip, first-joint flat finger, two-joint flat finger, three joint-flat finger, thumb, palm, wrist, compound two-finger, compound three-finger, composite 4-finger, whole hand, etc.);

Composite parameters (for example composite x position, composite y position, composite average pressure, composite roll, composite pitch, composite yaw, etc.);

Differential parameters (for example pair-wise inter-finger differential x position, pair-wise inter-finger differential y position, pair-wise inter-finger differential pressure, etc.);

Additional parameters (for example, rates of change with respect to time, detection that multiple finger images involve multiple hands, etc.).

FIG. 26b depicts an exemplary alternative embodiment, tactile image data is examined for the number M of isolated blobs ("regions") and the primitive running sums are calculated for each blob, but this information is directed to a multi-regional tactile image parameter extraction stage. Such a stage may include, for example, compensation for minor or major ergonomic interactions among the various degrees of postures of the hand. The resulting compensation or otherwise produced extracted parameter sets (for example, x position, y position, average pressure, roll, pitch, yaw) uniquely associated with each of the M blobs and total number of blobs are directed to a compound image parameter mapping function to produce various types of outputs as described for the arrangement of FIG. 26a.

Additionally, embodiments of the invention may be set up to recognize one or more of the following possibilities:
    single contact regions (for example a finger tip);
    multiple independent contact regions (for example multiple fingertips of one or more hands);
    fixed-structure ("constellation") compound regions (for example, the palm, multiple-joint finger contact as with a flat finger, etc.);
    variable-structure ("asterism") compound regions (for example, the palm, multiple-joint finger contact as with a flat finger, etc.).

Embodiments that recognize two or more of these possibilities may further be able to discern and process combinations of two more of the possibilities.

Figure 27:
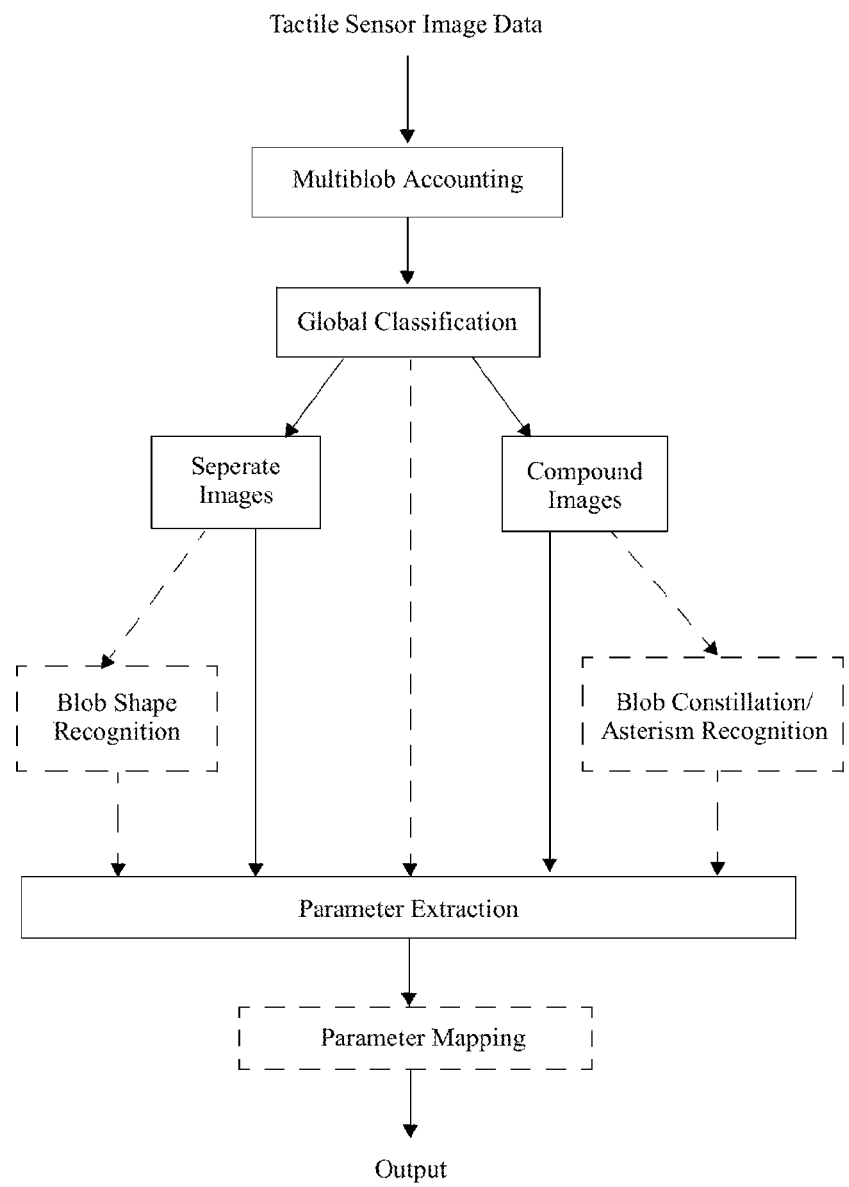

FIG. 27 depicts a simple exemplary system for handling one, two, or more of the above listed possibilities, individually or in combination. In the exemplary general arrangement depicted, tactile sensor image data is analyzed (for example, in the ways described earlier) to identify and isolate image data associated with distinct blobs. The results of this multiple-blob accounting is directed to one or more global classification functions set up to effectively parse the tactile sensor image data into individual separate blob images and/or individual compound images. Data pertaining to these individual separate blob and/or compound images are passed on to one or more parallel and/or serial parameter extraction functions. The one or more parallel and/or serial parameter extraction functions may also be provided information directly from the global classification function(s). Additionally, data pertaining to these individual separate blob and/or compound images are passed on to additional image recognition function(s), the output of which may also be provided to one or more parallel and/or serial parameter extraction function(s). The output(s) of the parameter extraction function(s) may then be either used directly, or first processed further by parameter mapping functions. Clearly other implementations are also possible to one skilled in the art and these are provided for by the invention.

In an exemplary embodiment, algorithms provide for identifying and segregating spatially disjoint regions of active cells on a tactile sensor array, creating separate data records for each region, executing parallel or serial instances of parameter calculation algorithms on each data record, and providing parallel output provisions for each region.

As an example of a simple classification system, the simple count of the number of blobs can be used in an exemplary simple embodiment to differentiate between single finger and two-finger contact. It is noted that due to non-planar finger curvature, the regions of contact from two adjacent fingers never fuse into a single contiguous region. Thus an embodiment of such a simplified classification algorithm simply searches for a gap of at least one sensor element between separate contiguous regions.

As an example embodiment, upon recognition of a same-hand two finger patterns considered above, the process shifts from providing two independent single-finger six parameter (x position, y position, average pressure, roll, pitch, yaw) outputs to, for example, the nine-parameter set relating to the pair of fingers as an separate composite object adjustable within an ergonomically comfortable range.

In this example, the tactile image is first classified (one finger or finger-pair) and the parallel parameter outputs for the two un-joined tactile images are produced. The average and differential composite proximal parameters are calculated for each of the pairs of x position, y position, and average pressure finger proximal parameters.

In various exemplary embodiments, the composite parameters for the angles (composite roll, composite pitch, and composite yaw) can be obtained by either an averaging operation or a selecting operation. For example, the roll, pitch, and yaw for the first finger to serve as the composite proximal parameters for the angles. As is clear to one skilled in the art, there are many other possible ways to perform the selection, including use of Min, Max, or other conditional selection criterion, and additionally other possible composite parameter computations. When adjusting the composite angles of the two-finger contact with a tactile sensor array, it may appear natural to choose one of the two adjacent fingers as the pivot point for the movement and alignment. Roll movement and alignment typically favors the middle finger while yaw typically favor the first finger. When a user chooses the first finger for yaw, informal observations show that the second finger is largely ignored and its "tag along" presence does not seem to affect yaw positioning actions of the user.

2.2 Generalizations of Parameters that can be Generated by Ergonomically-Viable Single-Hand Compound Postures There are many ways to organize the possible degrees of freedom generated by ergonomically-viable single-hand compound postures. One exemplary organization is to first consider the overall orientation attributes of the entire compound posture, and then consider the finger-by-finger variations that are possible with respect to it. This approach has several variations, a few of which are presented here.

The overall orientation attributes of the entire compound posture may include one or more of the following:
  Overall POSITIONS/DISPLACEMENTS of the Compound Posture:
    left-right position or translation;
    forward-back position or translation;
    more-less downward displacement or translation (pressure);
  Overall ANGLES/ROTATIONS of the Compound Posture:
    pivoting rotation (yaw);
    left-right tilt (roll);
    forward-back tilt (pitch).

These overall compound posture parameters may be obtained by various means, some of which as discussed above. These include selecting parameters individually calculated for a representative finger or non-finger region, averaging individually calculated parameters, and/or merging at least some running sums at the data acquisition stage.

The finger-by-finger differential variations that are possible with respect to the overall orientation attributes of an entire compound posture (including ones that involve most or all of the fingers lying flat) may include one or more of the following:
  separation angle of adjacent fingers
  difference in downward pressure
which gives up to two extra parameters for each added finger. In a more sophisticated approach for arched finger postures, the finger-by-finger differential variations that are possible with respect to the overall orientation attributes of the entire compound posture may include one or more of the following:
  difference in left-right position
  difference in forward-back position
  difference in downward pressure
which gives up to three extra parameters for each added finger. Thus, most generally, for a single-hand compound posture employing N of the five fingers of the hand, the maximum number of independent parameters that can be independently controlled at the same time is in the range of 6+2(N−1) to 6+3(N−1). For five fingers, this gives a maximum of fourteen parameters to as many as eighteen parameters for an arched single-hand posture. The number of parameters can be yet further expanded by including the palm and the wrist.

Figure 28:
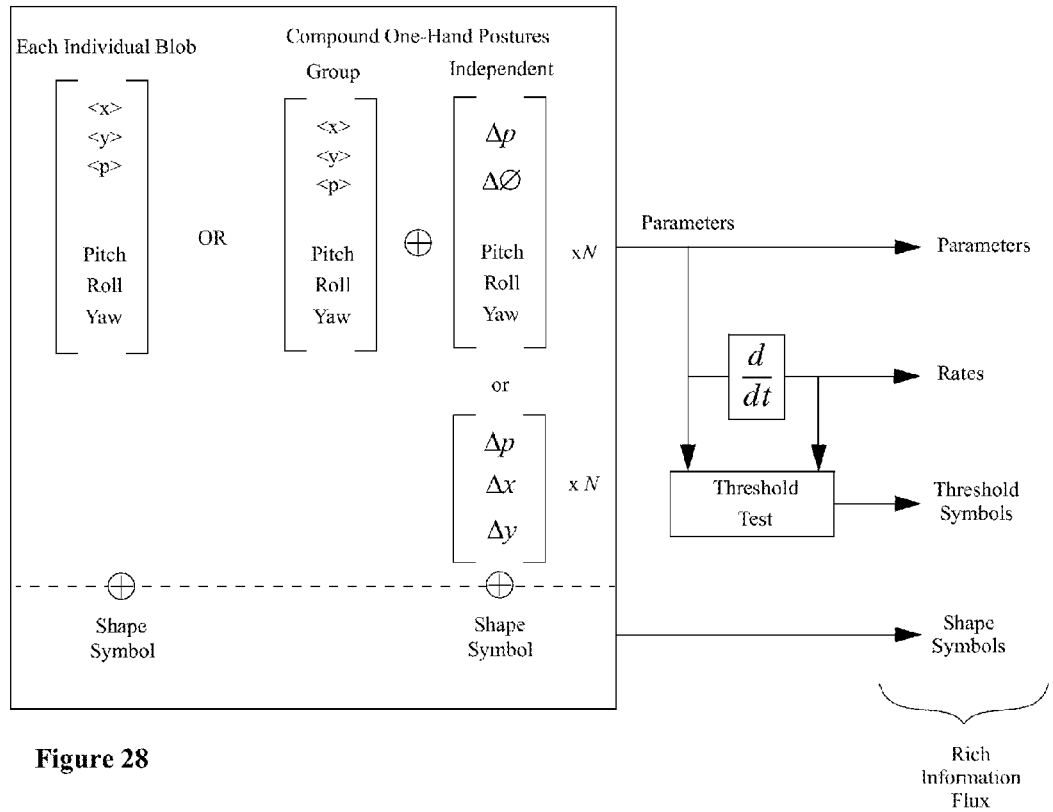

The invention provides for the expansion of the single blob arrangement of FIG. 18 so as to provide parameter calculations for the cases of multiple independent individual blobs and/or compound image blobs. The top portion of FIG. 28 depicts an example embodiment wherein sensor data can be interpreted as one blob, two or more individual blobs, or as a compound posture. These may be calculated in parallel and/or selectively, and in selective modes the selection may be controlled by the application using a control arrangement like that of FIG. 19c or by semantic feedback using a control arrangement similar to FIG. 19d.

2.3 Compound Posture Parameter, Rate, and Symbol Production

The invention provides for the expansion of the single blob arrangement of FIG. 18 so as to provide shape and posture recognition calculations for the cases of multiple independent individual blobs and/or compound image blobs. The bottom portion of FIG. 28 depicts an example embodiment wherein sensor data can be interpreted as one blob, two or more individual blobs, or as a compound posture. These may be calculated in parallel and/or selectively, and in selective modes the selection may be controlled by the application using a control arrangement like that of FIG. 19c or by semantic feedback using a control arrangement like that of FIG. 19d.

3. Gesture Recognition

Figure 29:
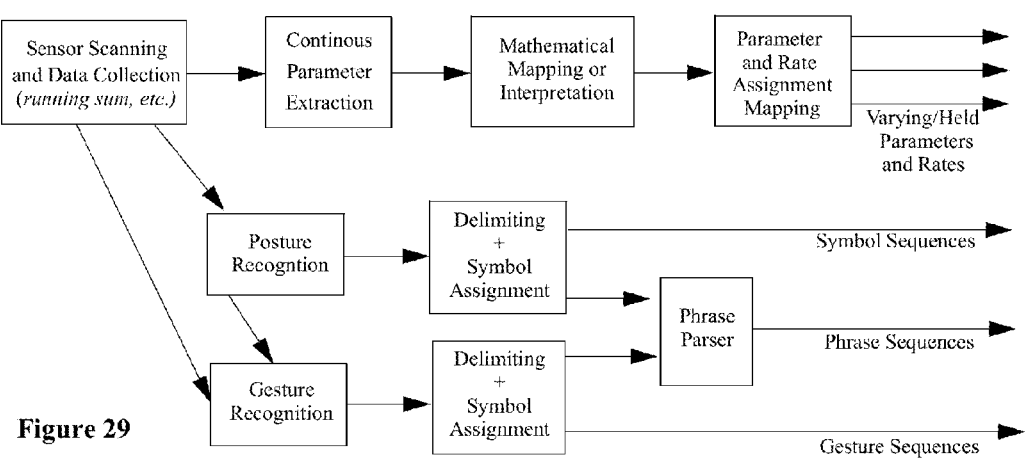
FIG. 29 depicts an exemplary approach to implementation of exemplary gesture recognition, syntax recognition, and parsing functions as provided for by the invention.

The invention as described thus far provides the basic framework for incorporating gesture recognition approaches, applications, and techniques and is provided for by the invention. In one embodiment, the symbols produced by arrangements such as that of FIG. 18 and FIG. 28 include symbols that are responsive to rate values. In some embodiments, these rate-responsive symbols serve as recognitions of simple gestures. In other embodiments, these rate-responsive symbols, and possibly other symbols, are directed to any of the arrangements of FIGS. 19a-19d. Another exemplary embodiment is depicted within a portion of FIG. 29, described below.

4. Syntax and Parsing

The invention as described thus far provides the basic framework for incorporating syntax and parsing features and functions and is provided for by the invention. In general syntax and parsing features and functions can be implemented via state machines provided with symbol sequences as depicted in FIG. 19a. Here the symbol sequences may be provided by arrangements such as those of FIG. 18 and FIG. 28, or these further processed by arrangements such as those depicted in FIG. 19c and FIG. 19d.

One exemplary embodiment for the use of syntax features and functions is the arrangement described earlier in relation to FIG. 19d. Another is the exemplary embodiment depicted in FIG. 29.

5. Partitioned Scanning

Next, attention is directed to partitioned scanning of tactile sensor arrays. There are at least three cases where separate running sums may be employed for separate scanned regions of a tactile sensor array:
- Aggregation of a plurality of smaller tactile sensor arrays into a larger virtual array;
- Partitions of a single tactile sensor array into separately scanned regions;
- Partitions of a single tactile sensor array into separate control regions.

These are each considered in turn in the sections to follow. In these, the separate scans may be synchronized or fully independent as may be advantageous or required in various implementations and applications.

Figure 30A:
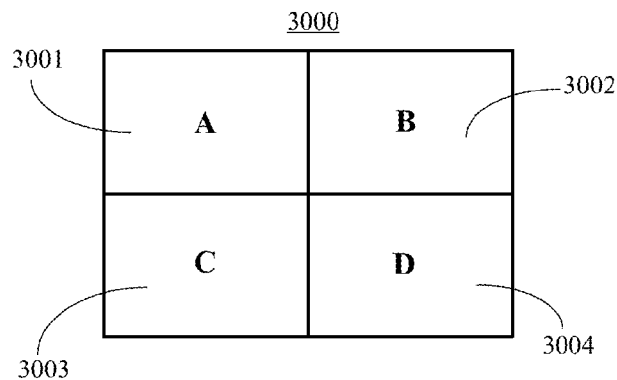
FIG. 30a illustrates such exemplary arrangement composed of four separate tactile sensor arrays.

5.1 Aggregation of a Plurality of Smaller Tactile Sensor Arrays into a Larger Virtual Array It is possible to treat a group of multiple tactile sensor arrays as a larger, single contiguous "virtual" tactile sensor array. As an example, FIG. 30a illustrates such exemplary arrangement 3000 composed of four separate tactile sensor arrays, 3001, 3002, 3003, and 3004. An exemplary associated procedure is outlined in FIG. 30b and is described below.

The running sum structure can be used to allow a plurality of unitary tactile sensor array contiguously positioned to operate as a single contiguous sensor. In such an arrangement, particularly applicable in situations wherein the multiple tactile sensor arrays contiguously border one another, a separate running sum algorithm can be implemented for each of the separate tactile sensor arrays.

In one embodiment, each individual tactile sensor array 3001, 3002, 3003, and 3004 may be provided a dedicated scanning electronics. In one implementation of this embodiment, each individual tactile sensor array may be provided with its own processor. At the end of a scan, the collection of running sums created for each of the individual tactile sensor arrays 3021, 3022, 3023, and 3024 may be combined at the end for the post-scan calculation 3050. If the individual tactile sensor arrays are spaced so that there is no spatial disturbance in consecutive pixel locations, the result will be mathematically indistinguishable from a larger single tactile sensor array with the same pixel location geometry.

5.2 Partitions of a Single Tactile Sensor Array into Separately Scanned Regions

The above approach can be used to increase the performance of a single tactile sensor array by splitting a large array into separate regions which are scanned in parallel and whose individual sets of running sums are merged and post-scan computations performed on the merged running sum values.

Figure 31A:
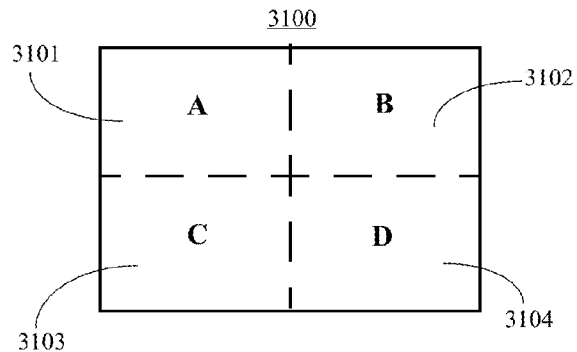
FIG. 31a illustrates a single unitary tactile sensor array partitioned into four sections.
Figure 31B:
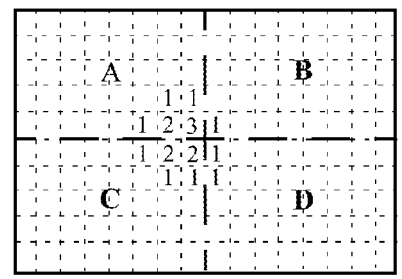
FIG. 31b depicts exemplary tactile data blob spanning all four segments of the above partition.
Figure 31C:
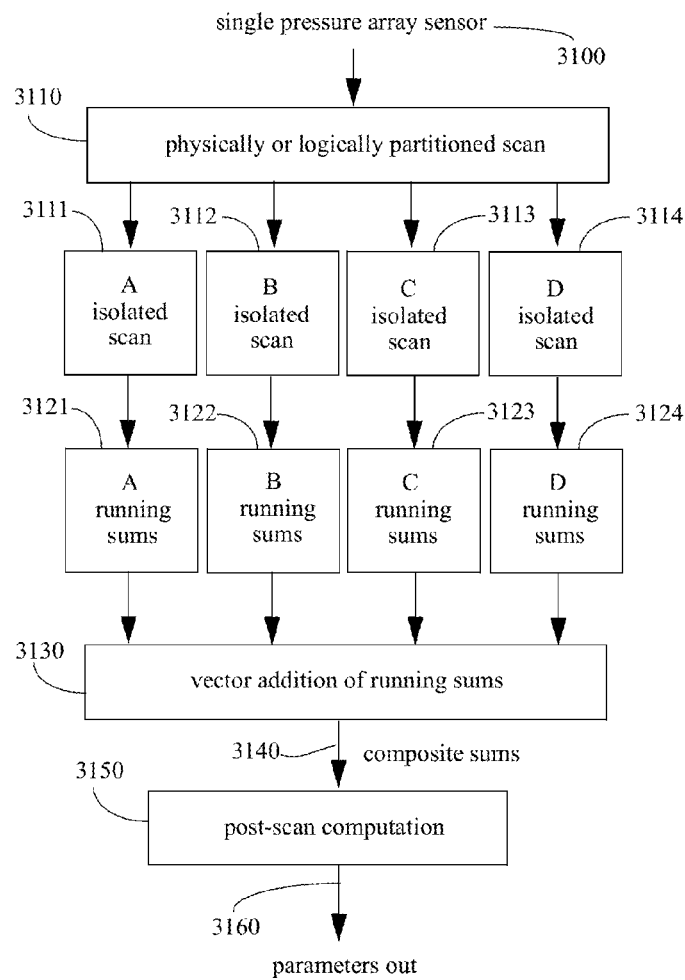
FIG. 31c illustrates an exemplary running sum arrangement for partitioning the scan of a single tactile sensor array into separately scanned regions and aggregating corresponding sums prior to other post-scan computations.

FIG. 31a illustrates a single unitary tactile sensor array 3100 partitioned into four sections 3101, 3102, 3103, and 3104. Partitioning the scanning of the tactile sensor array can expedite the processing of data by reducing the time that takes to scan all the cells in an array, by a factor of 4 in this specific embodiment shown in FIG. 31a. After separate scanning 3111, 3112, 3113, and 3114 is done and running sums 3121, 3122, 3123, and 3124 are obtained for each section, all the running sums are summed up, and post-scan computation 3150 is done on the composite sums 3140, as illustrated in FIG. 31c.

Partitioning does not affect the calculation process in terms of obtaining total or average. FIG. 31b illustrates how a tactile sensor array 3100 is composed of an arbitrary number of individual cells. If the tactile sensor array shown in FIG. 31b were not partitioned, calculation of the total of the tactile measurement value of all active cells in the tactile sensor array is readily obtained by simply adding up the tactile measurement value for each active (measurement exceeding the threshold) cell (tactile measurement sensor). Then the average tactile measurement value is divided by the total number of cells to obtain the average tactile measurement. For example, in FIG. 31b, there are sixteen columns and ten rows of cells, i.e. 160 cells. In this example:

Total tactile measurement=1+1+1+2+3+1+1+2+2+1+1+1+1=18

Total active cells=1+1+1+1+1+1+1+1+1+1+1+1+1=13

Average tactile measurement=18/13.

To calculate the total tactile measurement value of partitioned tactile sensor array, separate running sums 3111, 3112, 3113, and 3114 for active cells of each partitioned section A through D 3101-3104 as illustrated in FIG. 31b. As an example, assume each partition is of equal size and cell count, for example there are 40 cells, 8 columns and 5 rows of cells, in each of four partitioned sections totaling 160 cells. Calculating separately for each partition:

Partition A: Isolated scan 3111 can produce running sums 3121 including, for example:

Subtotal tactile measurement in Partition A=1+1+1+2+3=8

Subtotal active cells in Partition A=1+1+1+1+1=5.

Partition B: Isolated scan 3112 can produce running sums 3122 including, for example:

Subtotal tactile measurement in Partition B=1

Subtotal active cells in Partition B=1.

Partition C: Isolated scan 3113 can produce running sums 3123 including, for example:

Subtotal tactile measurement in Partition C=1+2+2+1+1=7

Subtotal active cells in Partition C=1+1+1+1+1=5.

Partition D: Isolated scan 3114 can produce running sums 3124 including, for example:

Subtotal tactile measurement in Partition D=1+1=2

Subtotal active cells in Partition D=1+1=2.

The (partial sum) subtotals 3111-3114 and 3121-3124 for each partition can subsequently be summed 3130 as vectors to create corresponding total sums 3140, including for example:

Total tactile measurement over all partitions=8+1+7+2=18

Total number of active cells over all partitions=5+1+5+2=13.

Post-scan computation 3150 may then be applied to these (vector) sums to provide output parameters 3160. For example, the average of each partitioned section is readily computed from the ration of these sums of the subtotals:

Overall average tactile measurement=18/13.

This result agrees with the outcome of previous calculation made for the unpartitioned array. In such a fashion, a partitioned tactile sensor array can be adapted to produce the same results as a non-partitioned tactile sensor array.

Similar arrangements involving sums of subtotals can also be employed for other output parameters. The two (row and column) geometric weighted centers and two (row and column) tactile-measurement weighted centers readily partition in the same fashion, and the resultant partial sum subtotals summed to give the same results used to compute the values of these output parameters with the unpartitioned calculation. Similarly, least squares slope calculations also comprise the ratios of several global sums which may be readily partitioned in the same way. The resultant partial sum subtotals can then, by category, be summed to provide the same results used to compute the values of these output parameters with the unpartitioned calculation.

5.3 Partitions of a Single Tactile Sensor Array into Separate Control Regions As opposed to aggregating the running sums from a plurality of contiguously bordering tactile sensor arrays, the invention also provides for the partition a single tactile sensor array 3200 into a plurality of partitioned independently scanned regions wherein each partition operates entirely independently of the others, as illustrated in FIG. 32*a*. In one embodiment, a single tactile sensor array can be divided into any number of partitioned sections as may be defined by software. In one implementation of the embodiment, the number and geometry of the partitions may be defined by adjustable settings.

FIG. 32*a* illustrates an exemplary partition of a single tactile sensor array. FIG. 32*b* depicts a simple exemplary stage control application wherein each partition 3201, 3202, 3203, and 3204 of the larger tactile sensor array is directed to a different control function. For example, partitioned section A through D each controls different aspects: brightness, volume, pan of lighting, and pan of sound. The running sum structure can be used to allow a plurality of unitary tactile sensor array contiguously positioned to operate as a single contiguous sensor.

Although such a unit 3200 may be physically unitary, separate running sum 3221, 3222, 3223, and 3224 is obtained. In this case the purpose of the partition is to enable one tactile sensor array to act as multiple control units, post-scan computation 3251, 3252, 3253, and 3254 may be done independently as well. This process is summarized in FIG. 32*c*.

6. Distributed Data Acquisition and Preprocessing for Physically- or Logically-Partitioned Tactile Sensor Arrays In this section further attention is directed to the physical, electrical, or logical partition of a larger tactile-sensor array presented to a user for user interface purposes. Summarizing the material provided earlier, there can be various reasons for such partitioning, for example:

A single unitary tactile-sensor array can be electrically divided into partitions by splitting electrical scanning interconnection busses into separate sections, as shown in FIG. 33. This could be done, for example, in order to increase the scan rate performance of a single tactile sensor array by splitting a large array into separate regions which are scanned in parallel. Such parallel scanning can reduce multiplexing complexity, reduce electrical capacitance, increase operating frequency and/or scan rate, etc. Such parallel scanning has been considered earlier in Section 6.4 and described in conjunction with FIGS. 31*a*-31*c*.

A group of smaller tactile sensor arrays can be logically aggregated into a single larger "virtual" tactile sensor array. For example, a plurality of smaller tactile sensor array may be contiguously positioned into a single larger contiguous area. The invention provides for such an arrangement to be electrically wired or otherwise interfaced as a single larger sensor. However, the invention also provides for such a group of smaller tactile sensor arrays to each be separately scanned by an associated dedicated processor, wherein each dedicated processor individually preprocess its own dedicated tactile measurement information, and combines preprocessed information in such a way that the composite group of smaller tactile sensor arrays and associated processors operate as a single contiguous sensor. This was considered earlier in Section 6.1 and described in conjunction with FIGS. 30*a*-30*b*.

A single unitary tactile-sensor array can be physically or logically divided into separately scanned sections. Each separately scanned partition may produce separated sets of running sums and associated separate post-scan computations and separate parameters for each of the partitioned sections. This case was considered earlier in Section 6.3 and described in conjunction with FIGS. 32*a*-32*c*.

Figure 34A:
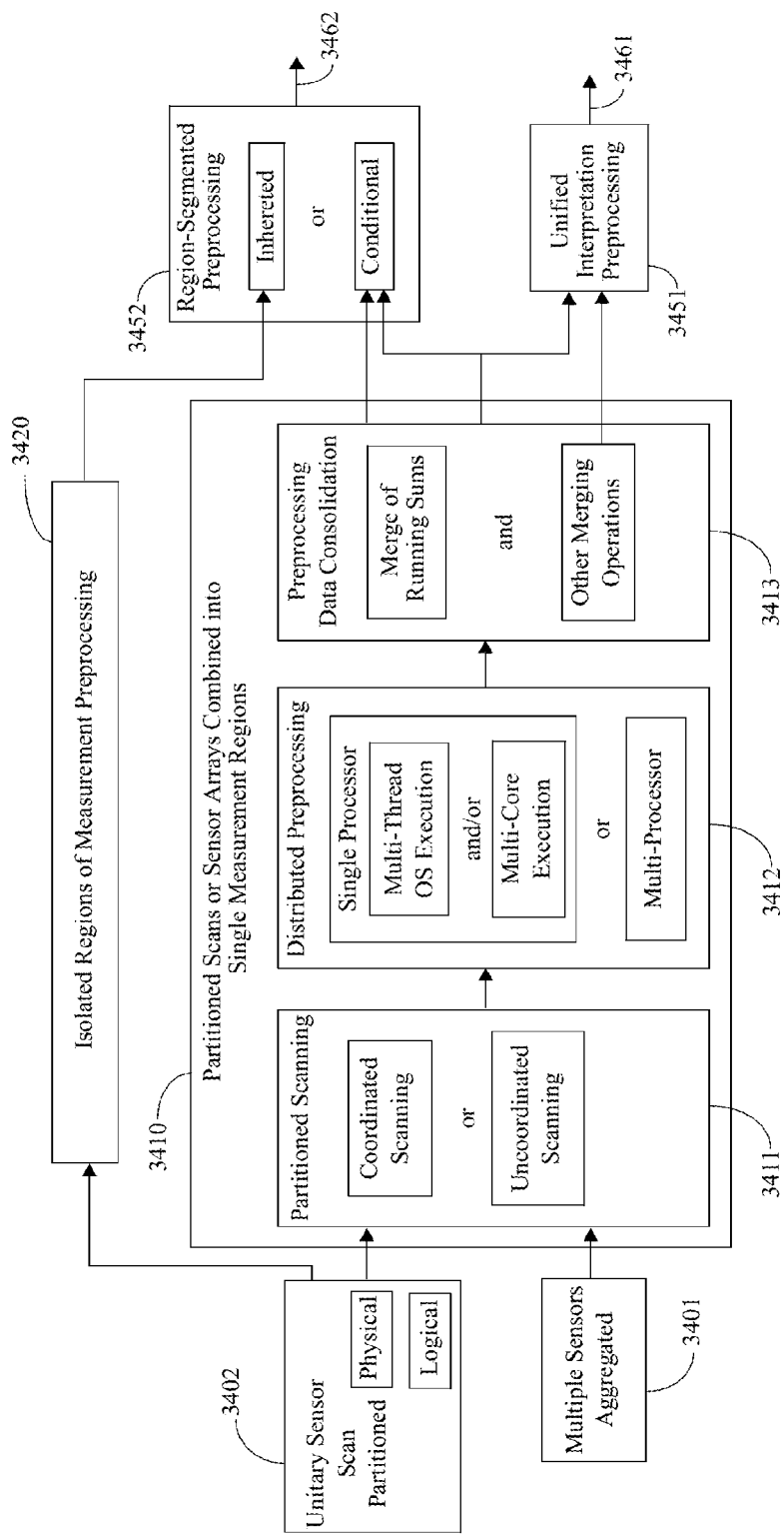
FIG. 34a depicts an exemplary unified framework for handling partitioned and partitioning of tactile sensor array(s), with FIGS. 34b-34c comprising varying dashed-line sections that correspond to various exemplary cases as provided for by the invention, with FIG. 34d comprising a depiction of an exemplary callout of the sections of FIG. 34a that pertain to then situation of the cases of FIGS. 32-32c.

A number of exemplary variations in implementation and embodiment are considered in the morphology depicted in FIG. 34*a*. The tactile user interface sensor may be an aggregate 3401 of a plurality of separate smaller tactile user interface sensors as considered in the case of FIGS. 30*a*-30*b*, or alternatively may be a physically or logically partitioned 3402 into a plurality of separate smaller tactile user interface sensors as considered in the cases of FIGS. 31*a*-31*c* and FIGS. 32*a*-32*c*.

Figure 30B:
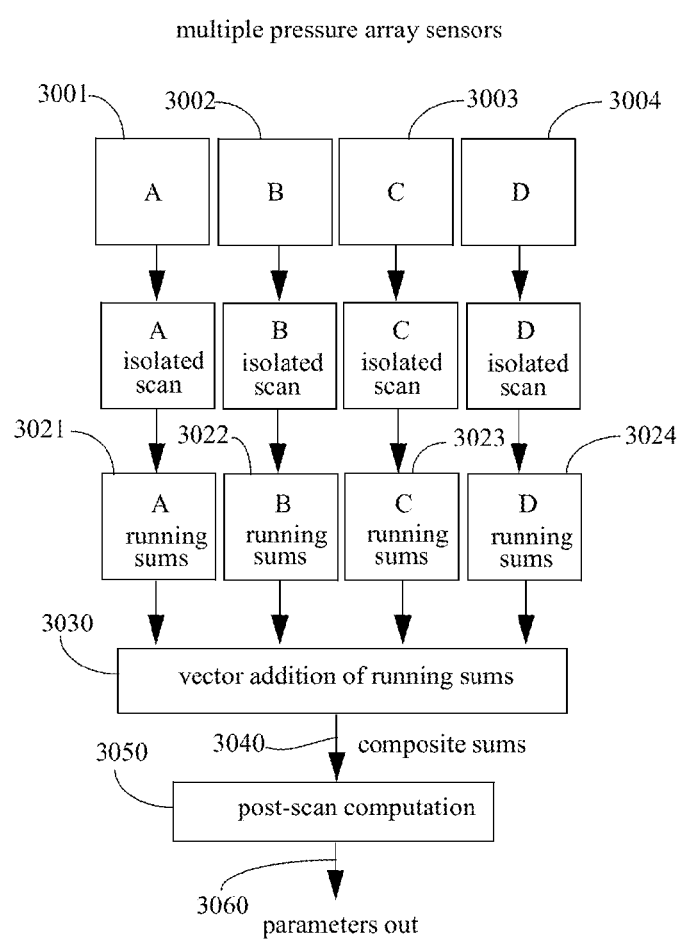
FIG. 30b illustrates an exemplary running sum arrangement for aggregation of a plurality of smaller tactile sensor arrays into a larger virtual array.
Figure 34B:
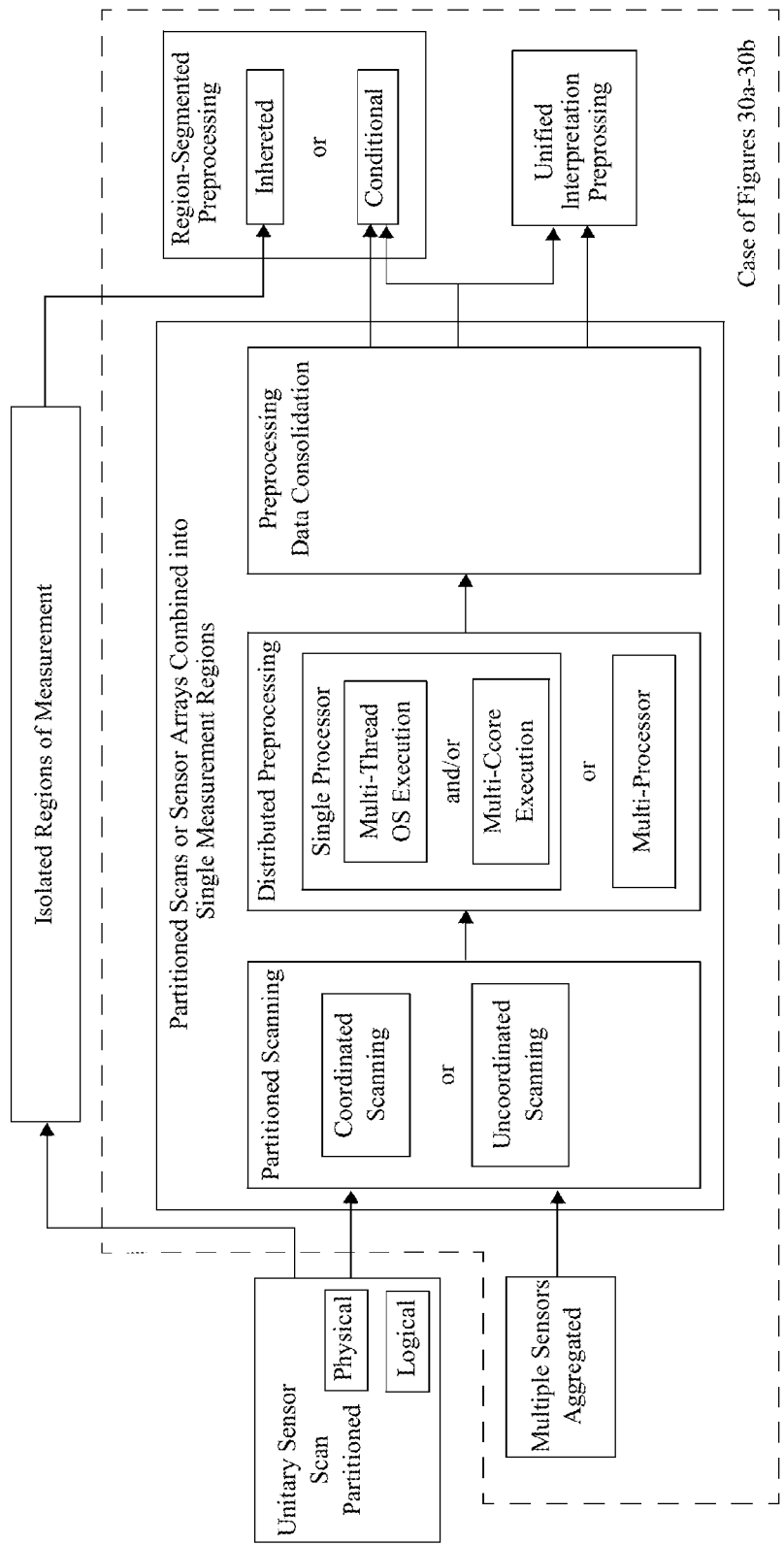
Figure 34C:
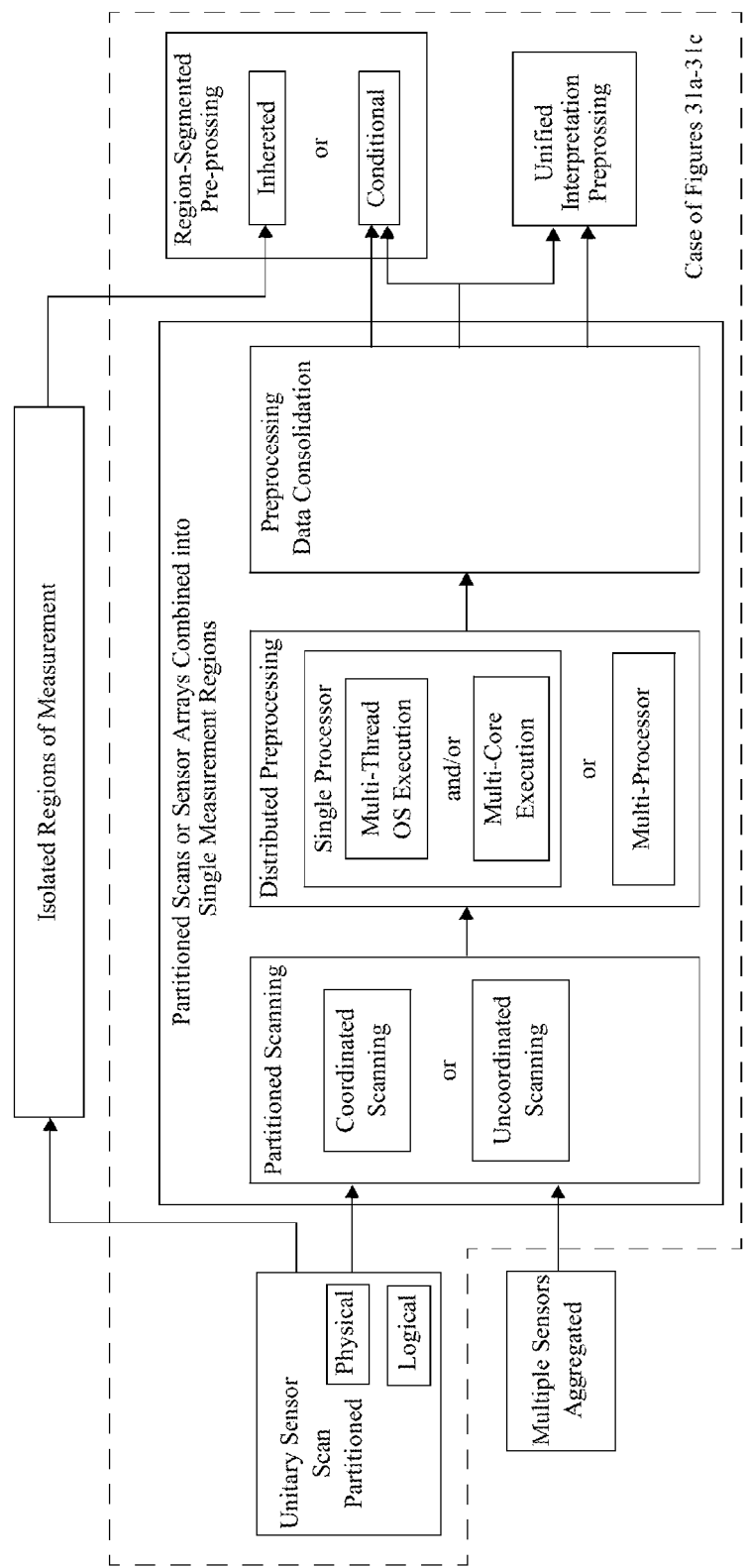
Figure 34D:
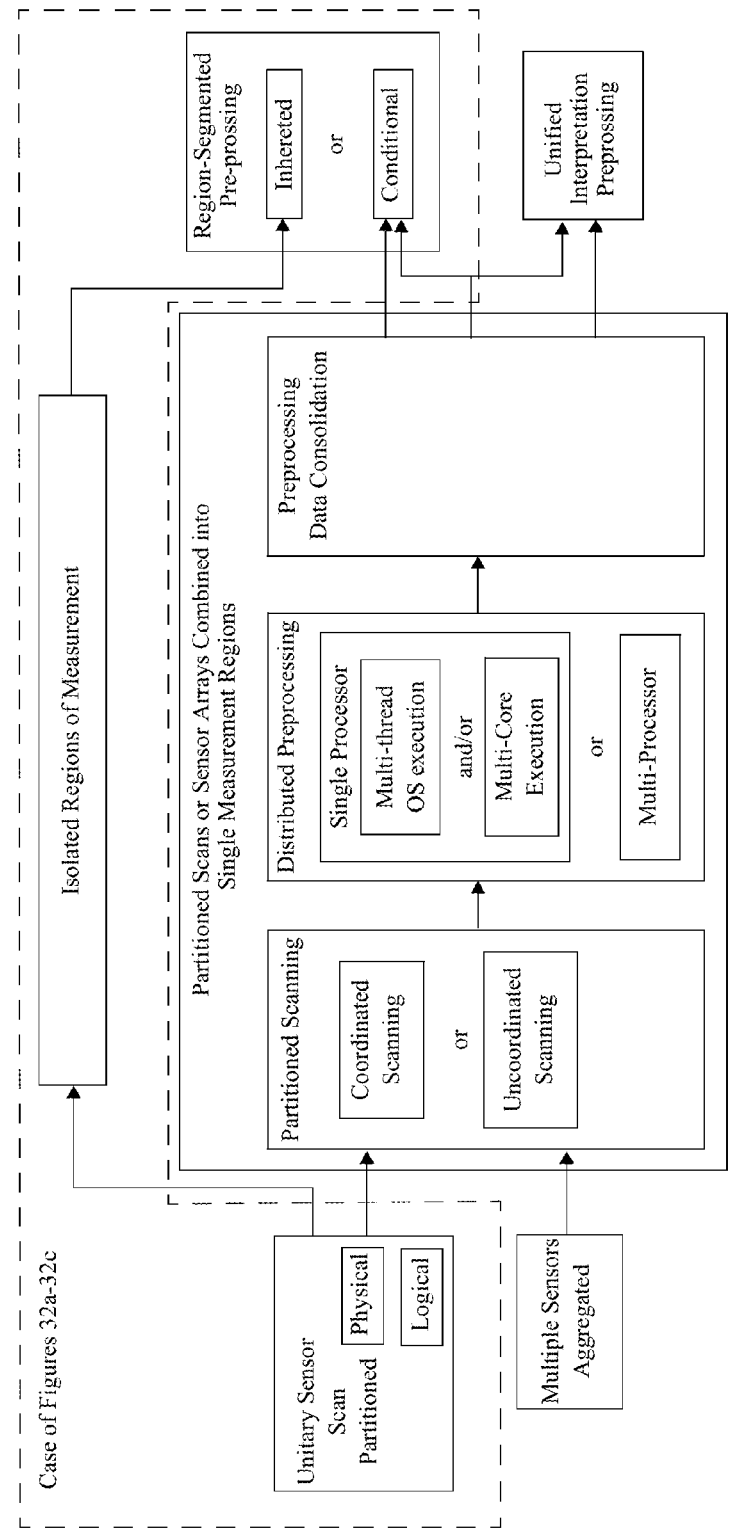

Accordingly, FIG. 34*b* depicts a callout of the sections of FIG. 34*a* that pertain to then situation of the cases of FIGS. 30*a*-30*b*. Similarly, FIG. 34*c* depicts a callout of the sections of FIG. 34*a* that pertain to then situation of the cases of FIGS. 31*a*-31*c*, while FIG. 34*d* depicts a callout of the sections of FIG. 34*a* that pertain to then situation of the cases of FIGS. 32*a*-32*c*.

Referring to FIG. 34*a* in situations of the cases of FIGS. 30*a*-30*b* (elements encircled in FIG. 34*b*) and FIGS. 31*a*-31*c* (elements encircled in FIG. 34*c*), the measurements resulting from the separate sensor arrays (such as 3001-3004 in FIGS. 30*a*-30*b*) or partitioned array scans (such as 3110-3114 in FIG. 31*c*) can be separately pre-processed 3412 (such as 3021-3024 in FIGS. 30*b* and 3121-3124 in FIG. 31*c*) combined 3413 (such as 3030 in FIGS. 30*b* and 3130 in FIG. 31*c*) by software or other systems 3410 so as to act as a single measurement region and provide consolidated pre-processed data. This consolidated pre-processed data is then directed to one or both of:

Unified interpretation post-scan processing 3451 (such as 3040 in FIGS. 30*b* and 3140 in FIG. 31*c*) to produce user interface parameter values 3461 (such as 3060 in FIGS. 30*b* and 3160 in FIG. 31*c*), and/or Separate user interface parameter values 3462 each corresponding to a conditionally-defined associated isolated region of measurement.

Referring to FIG. 34*a* in the situation of the case of FIGS. 32*a*-32*c* (elements encircled in FIG. 34*d*), the physically or logically partitioned sensor scans 3402 are pre-processed 3420 assuming corresponding isolated regions of measurement (such as 3221-3224 in FIG. 32*c*). This pre-processed information is then directed to (subsequently inherited) regional-sectionalized post-scan processing 3452 (such as 3251-3254 in FIG. 32*c*) to produce separate user interface parameter values 3462 (such as 3261-3264 in FIG. 32c), each corresponding to an associated isolated region of measurement.

6.1 Partitioned Preprocessing by Separately Executing Processes

In the arrangements of FIG. 34b (associated with FIGS. 30a-30b) and FIG. 34c (associated with FIGS. 31a-31c), particularly if the multiple tactile sensor arrays contiguously border one another, a separate running sum algorithm can be implemented for each of the separate tactile sensor array elements or separate partitioned tactile sensor array regions. The resulting sets of running sums can then be merged. Post-scan computations can then be performed on the merged running sum values. Also other information, such as extremal values, could also be obtained from each of the separately processed areas and presented to post-scan computations.

As described earlier, in an embodiment where the scan of the tactile-sensor array produces a stream of ordered-triples of data, each ordered-triple comprising a tactile measurement for a sensor, the sensor row coordinate and sensor column coordinate. The tactile measurement is compared to a noise threshold and is classified as non-zero if it exceeds the threshold and otherwise forced to a value of zero. The resulting modified data can be called "thresholded measurements."

Also as described earlier, in an embodiment each time the thresholded measurement of a sensor is encountered with a non-zero value, the row and column coordinates of the sensor are subjected to an adjacency test to determine whether the sensor is a neighbor of a previously-scanned sensor with a non-zero tactile measurement. If it is not, a new record is created. Otherwise, record assignment logic assigns the sensor to the appropriate record, identified by a label, and the record is updated on the basis of the ordered triple associated with the sensor.

Figure 35:
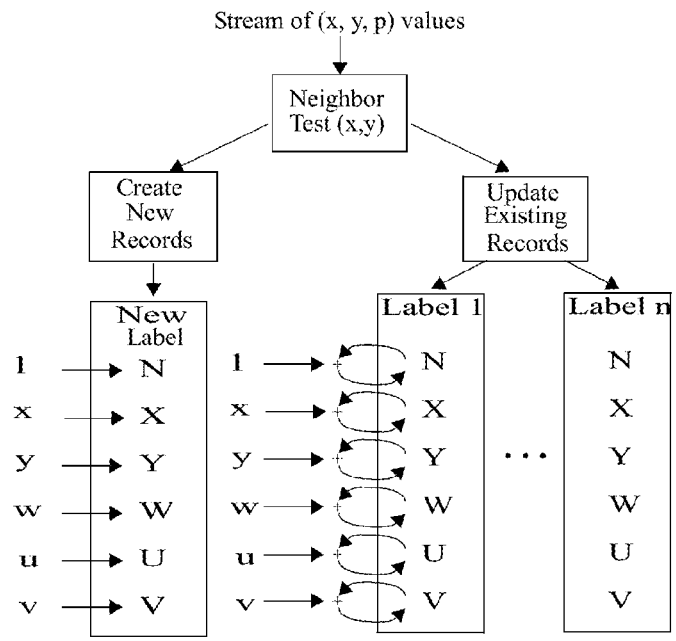
FIG. 35 illustrates the exemplary update of an exemplary existing record as provided for by the invention.

In the example of illustrated in FIG. 35, an exemplary existing record is updated as follows (x may signify a column index and y may signify a row index):

- N, the area of the region of non-zero tactile measurement value, is incremented by 1;
- the x coordinate of the just-scanned sensor is added to X, the sum of all the x coordinates of the sensors in the region;
- the y coordinate is added to Y, the sum of all the y coordinates of the sensors in the region;
- the tactile measurement value is added to W, the sum of all the tactile measurement values of the sensors in the region;
- the product of the x coordinate and tactile measurement value is added to U, the sum of the products of the x coordinate of each sensor in the region and its tactile measurement values;
- the product of the y coordinate and tactile measurement value is added to V, the sum of the products of the y coordinate of each sensor in the region and its tactile measurement value.

Other running sums, such as the square of the x coordinate, square of the y coordinate, cross product of the x and y coordinates, etc. may also be included and/or replace one or more of the above examples as may be needed or advantageous for various parameter or other post-scan computations.

The partitions can be scanned and preprocessed by parallel executions software and/or firmware. In one embodiment, a single processor may implement parallel executions via a multi-core architecture, a multi-thread scheduler, multi-thread operating system, etc.

However, the invention also provides for such a group of smaller tactile sensor arrays to each be separately scanned by an associated dedicated processor, wherein these dedicated processors individually preprocess their own dedicated tactile measurement information, and combine preprocessed information in such a way that the composite group of smaller tactile sensor arrays and associated processors operate as a single contiguous sensor.

6.2 Segmented Busses and Pipelined-Interleaved Scanning

In this subsection we consider how tactile-sensor arrays can be partitioned to facilitate improved or lower cost data acquisition.

Figure 36:
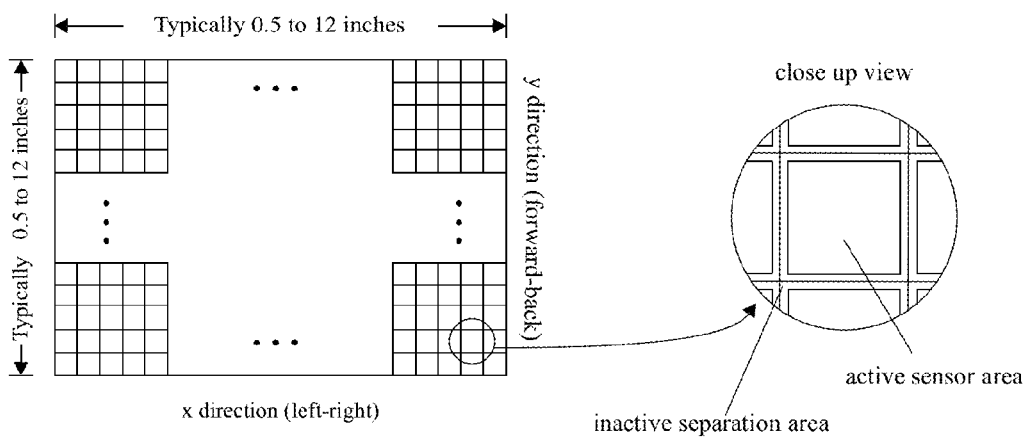
FIG. 36 depicts exemplary details of an exemplary tactile sensor array.

A tactile-sensor array, such as that depicted in FIG. 36, can be divided into partitions by splitting electrical scanning interconnection busses into separate sections, as shown in FIG. 33. Splitting the busses in this way makes it possible to use a number of "concurrent" or "pipelined-interleaved" scanning techniques, and reduces the computational and electronics requirements for rapid scanning of the sensor array; for instance, settling time requirements are eased and bus electrical capacitance is reduced.

The streams of data produced as the array is scanned can be processed in parallel or the data can be merged. The latter can be done in such a way that the same data processing techniques can be used. In either case, partitions of the sensor array need to share information.

FIG. 37 illustrates an exemplary signal flow that accomplishes this. The arrows indicate the interactions between neighboring tactile sensor array modules. Depending on the arrangement (or shape) a cell has one to four immediate neighbors including one on the left, right, top, and bottom. In this case, each partition is electrically (or optically) connected to its immediate neighbors, though partitions can be interconnected in other ways, such as via busses or star-topologies. Diagonal and unidirectional signal flows are also possible, and a few examples of these will be provided later.

Attention is directed to cases where there are contiguous regions of contact that span two or more partitions. Consider a tactile sensor area with partitions A, B, C and D, as shown in FIG. 38a. In FIG. 38b two contiguous regions of contact that span multiple partitions are depicted, with the top region spanning partitions A and B, and the bottom region spanning partitions A, B, C and D. In each, the partitions the regions span share and pool information via the flows shown in FIG. 37, as suggested by the arrows in FIG. 38b.

Consider the case of a contiguous region that spans all four partitions, as shown in FIG. 38c. In one approach, each partition creates its own record for the portion of the contiguous region it detects and updates the record as the scan progresses. The records are merged after the scan is complete by adding the corresponding running sums in all the records. In another approach, a single record is created for all four partitions, and, as the scan progresses, the relevant values for each partition are added to the appropriate running sums in the record. In both approaches, the ultimate result is a single record with entries that are sums of the relevant values for each partition, as shown in FIG. 38d. Running sum partitions can be freely segregated or aggregated.

6.3 Ganging of Multiple Sensor Arrays

In implementations of the tactile sensor array in which the individual tactile sensors are sequentially scanned, it will often be advantageous to perform the scan periodically or algorithmically, as is done with light sensing elements in a CCD camera. For large sensor arrays, this would require the additional cost and complexity of high-performance electronics, EMI shielding and high computational speeds. In implementations of the tactile sensor array in which the sensors are scanned in parallel, scaling to large sensor arrays would also introduce additional cost and complexity. In addition, the fabrication of large sensor arrays would be costly and would likely suffer from yield problems, and damage in the field would also be costly. A further problem arises from the requirement of some applications to have sensor arrays of unusual shapes or aspect ratios. This could be the case, for instance, for sensor arrays affixed to musical instrument keys and for musical instrument bodies. For these reasons, methods for ganging multiple small tactile-sensor arrays to behave collectively as one large one are of interest.

The methods described in the previous subsection for sharing information among partitions and for handling contiguous regions of contact that span multiple partitions, as well as variations on this as is apparent to one skilled in the art, can be used to gang sensor arrays.

6.4 Misalignment of Multiple Sensor Arrays

There is, however, an additional problem that must be addressed, specifically how to handle cases in which individual sensor array modules are misaligned. An example in which four sensor array modules are misaligned with respect to one another is shown in FIG. 39a. If the degree of misalignment is small enough relative to the sensor size, only a negligible error will result. If the degree of misalignment is larger, additional capabilities will be needed to correct for it.

An exemplary approach to addressing misalignment is to calibrate the composite sensor array using an object of known size and shape, as illustrated in FIG. 39b. The object is placed on the composite sensor array so that it covers the area where the modules meet. Each module determines which sensors are under the edges of the object, and the modules communicate with one another to associate the sensors under one edge of the calibration object in one module with the sensors under the same edge in the adjacent module. Once these associations have been made, the coordinates of the sensors in each module can be adjusted to correct for the misalignment. In some cases, the misalignment may result in a gap between modules. The calibration procedure can determine the size of the gap, and, if it is not too large (no more than a few sensors areas in size), it can be treated in the same fashion as the failure of isolated sensors described in the last section.

6.5 Scan Synchronization among Partitioned Scans

The invention provides for the partitioned scans executed by separate processors or scanning hardware to be temporally synchronized or asynchronous as may be advantageous in various embodiments. In embodiments where partitioned scans to be temporally synchronized, synchronization signals may be distributed to or among the separate processors or scanning hardware as may be advantageous. In situations where data is exchanged between modules, self-clocking data encoding (such as Manchester encoding, Dallas Semiconductor 1-Wire™ protocol, etc.) may be used to carry clocking signals that may be used for synchronization purposes.

6.6 Scanning and Running Sums of Partitioned Areas

Figure 40:
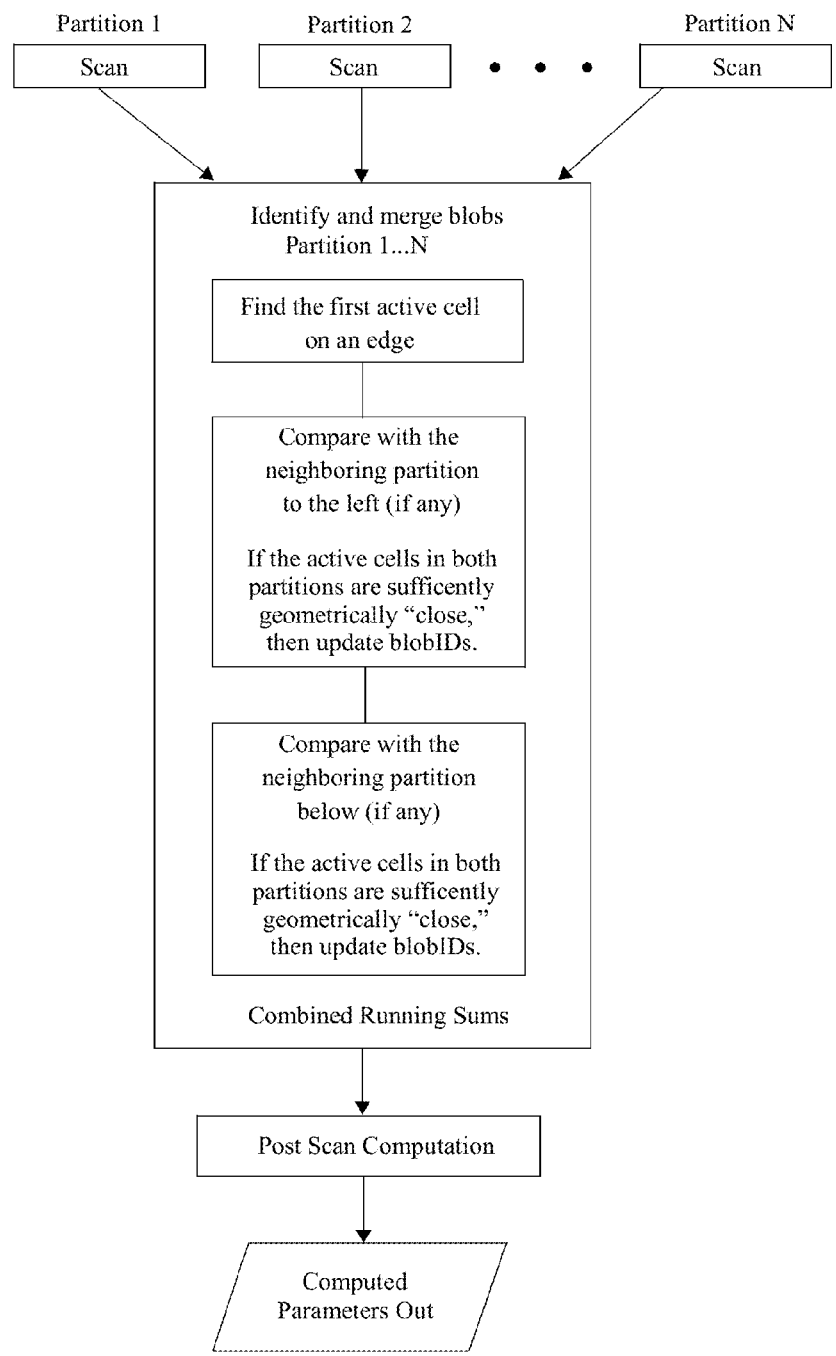
FIG. 40 illustrates an exemplary algorithm for handling and combining the running sums of portioned sensor arrays or segregated sensor array modules.
Figure 41A:
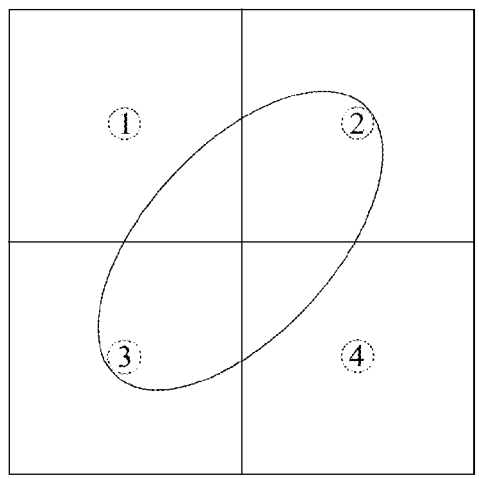
Figure 41B:
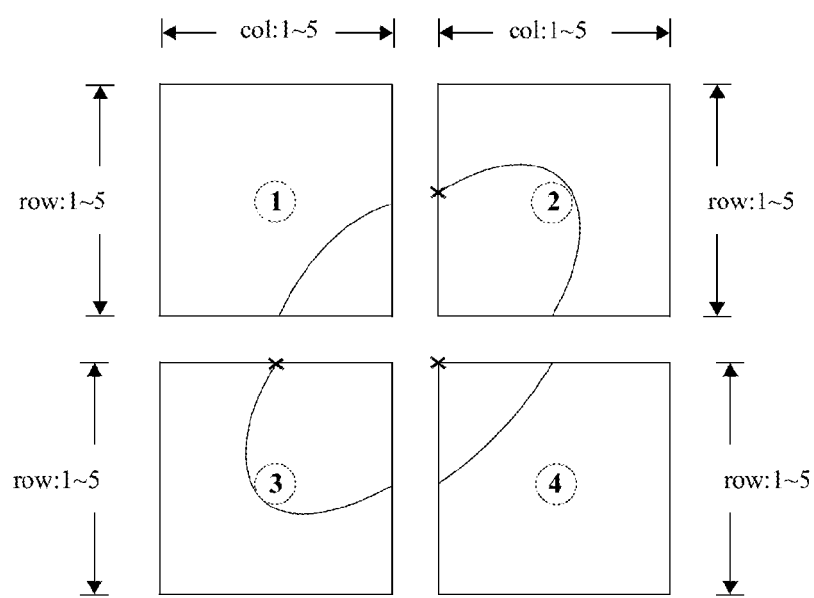
Figure 41C:
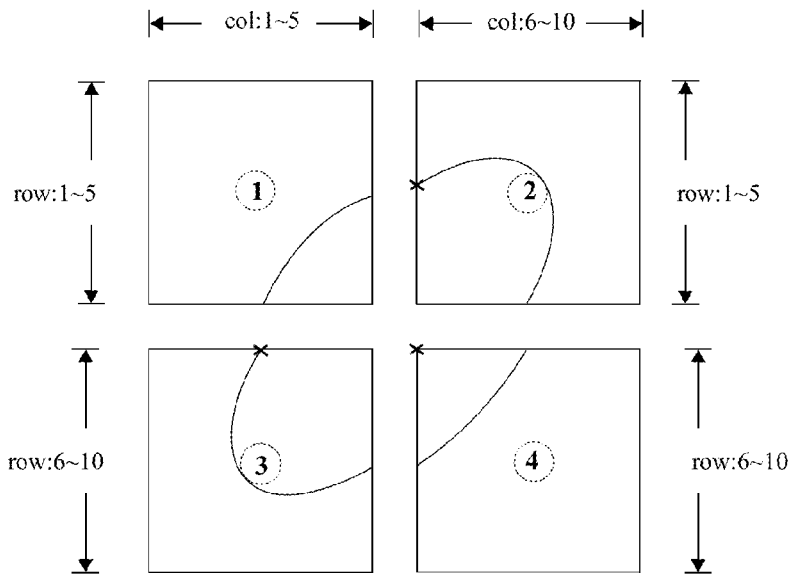

FIG. 40 illustrates an exemplary algorithm for handling and combining the running sums of portioned sensor arrays or segregated sensor array modules. Each partition is scanned and running sum for each partition is obtained separately. As examples, FIGS. 41a-41c, 42-44, 45a-45c, 46a, and 46b contain tactile sensor arrays with 3, 4, 9, or 16 partitions, and circled numbers signify a serial sensor numbering for the purposes of simplified discussion. FIG. 41a illustrates a case where a blob is placed across four different partitions. Partitions 1 through 4 will be scanned separately and four separate running sums will be obtained for each partition. During the scanning process, when active cells are detected against the left, right, top, or bottom edge of the partition, the row index, column index, and the ID of the blob which that cell belongs to are appended to a list. This recorded information will be used to check if blobs in neighboring partitions belong to the same blob. To test if the blobs in two different partitions belong to a same blob, the row and column indices are checked if they lay within a reasonable range. The column and row indices of each partition can be set from 1 to the number of columns or rows in the partition, as illustrated in FIG. 41b, or they can be continued after the neighboring partition to the left or to the top as illustrated in FIG. 41c.

Figure 42:
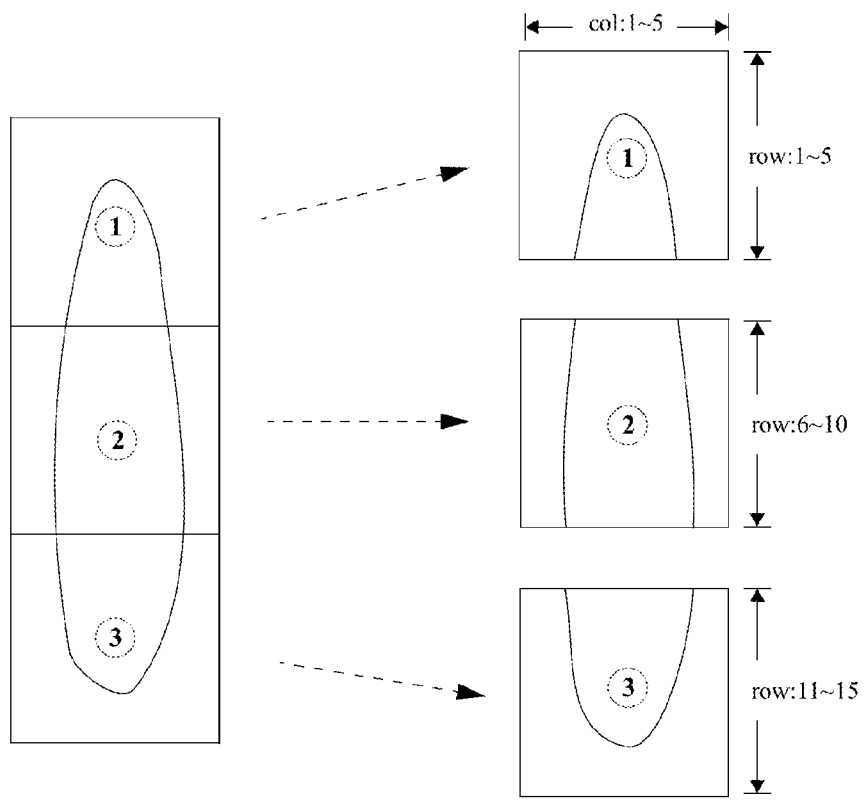

For example, the first partition can have row and column indices from 1 to the N, the number of rows and columns in each equally-sized partition, and the neighboring partition to the right of the first partition can have column indices from 1 to 5 or from N+1 to 2N. Row indices will remain the same, 1 to N, since this partition and the first partition will have the same vertical position. Similarly, the neighboring partition to the bottom of the first partition can have the same column indices 1 to 5 or from N+1 to 2N. The latter case will keep the accounting simpler, since in the representation of data across all the partition as a whole, i.e. the vertical center of the blob that is present across more than one partition, the column and row indices will be unique. If there are more partitions that share the same row and column indices, that is if row and column indices from 1 to 5 are used repeatedly in different partitions, distinguishing one partition from another will be more complicated. This will be the case in general if there is more than one partition. FIG. 42 illustrates a case where a blob is placed across three different partitions. FIG. 43 illustrates a case where blobs are placed across nine different partitions. FIG. 44 illustrates a case where a V-shaped is placed across nine different partitions.

6.6.1 Listing of Active Cells at a Boundary

In an exemplary embodiment, during the scanning of each partition, a list of active cells on an edge is recorded except in the case where there are no pre-existing blobs. The row index, column index, and the blob ID which the cell is assigned to are appended to the list for each partition. For example, in FIG. 43, at the end of scanning partition 1, such list will contain $\{\{2, 6, 1\}, \{7, 6, 1\}, \{6, 10, 2\}, \{6, 11, 2\}, \{11, 3, 1\}, \{11, 6, 1\}\}$. If the neighboring partition contains active cells adjacent to such active cells, it will mean the blobs in the neighboring partitions belong to the same blob.

6.6.2 Comparison of Blobs Across All the Partitions

In an exemplary embodiment, after scanning, running sum, and accounting processes for each partition have been completed, comparisons among the partitions are made. Not every active cell in a partition needs to be examined. If one cell is determined to belong to a certain blob, this implies that the rest of the cells in the same blob in that partition belong to that blob, and all of their blob IDs should be updated. For example, the only cells that need to be examined are marked with an X in FIG. 41c. All the rest of the cells in the same blob and in the same partition will be concluded to belong to the same blob to whichever blob the cell marked with an X is determined to belong to.

6.6.3 Selection of Neighboring Partition for Comparison

In an exemplary embodiment, depending on the position of the partition, comparison across 2 to 4 neighboring partitions need to take place. For each row, (col−1) comparisons are made, and for each column, (row−1) comparisons are made. Combining these, a total then of (col−1)*row+(rows−1)*col comparisons are made in total.

Figure 45A:
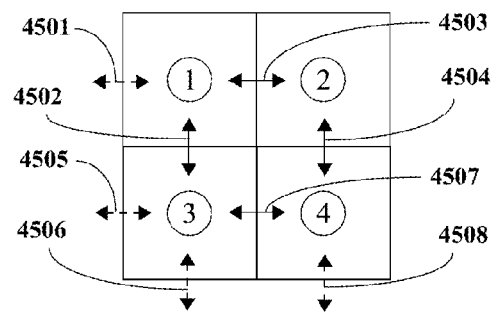

If there are four partitions, with two rows and two columns as illustrated in FIG. 45a, one comparison is to be made for each row, and one comparison is to be made for each column, four comparisons are to be made in total:

(2 columns−1)*2 rows+(2 rows−1)*2 columns=2+ 2=4.

Steps 4502, 4503, 4504, and 4507 in FIG. 45*a* represent all comparisons in order.

Figure 45B:
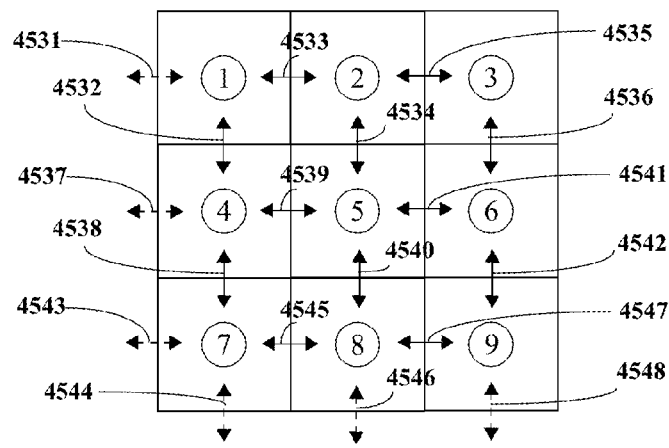

If there are nine partitions, with three rows and three columns as illustrated in FIG. 45*b*, two comparisons are to be made for each row, and two comparisons are to be made for each column, twelve comparisons are to be made in total:

(3 columns−1)*3 rows+(3 rows−1)*3 columns=6+ 6=12.

Steps 4532, 4533, 4534, 4535, 4536, 4538, 4539, 4540, 4541, 4542, 4545, and 4547 in FIG. 45*b* represent all comparisons in order.

Figure 45C:
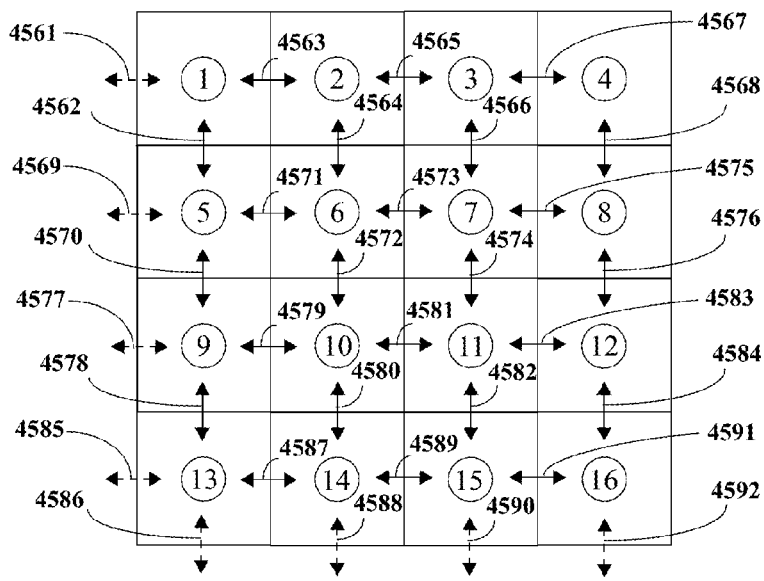

If there are sixteen partitions, with four rows and four columns as illustrated in FIG. 45*c*, three comparisons are to be made for each row, and three comparisons are to be made for each column, twelve comparisons are to be made in total:

(4 columns−1)*4 rows+(4 rows−1)*4 columns=12+ 12=24.

Steps 4562 through 4591, except 4569, 4577, 4585, 4586, 4588, and 4590 in FIG. 45*c* represent all comparisons in order.

From partition 1 to partition N, neighboring partition to the left is examined, then the neighboring partition below. If there are no such neighboring partitions, then the step can be skipped. Keeping it in this order prevents any repetitions. FIG. 45*b* illustrates the comparisons made between neighboring partitions in nine partitions, three rows and three columns. 4531 through 4548 represent all the comparisons to be made in order. Among the eighteen comparisons, 4531, 4537, 4543, 4544, 4546, and 4548 are skipped, thus twelve comparisons are to be made in total.

The above is only exemplary. Other implementations are possible, anticipated, and provided for by the invention.

6.6.4 Handling Results of the Comparison

Figure 46A:
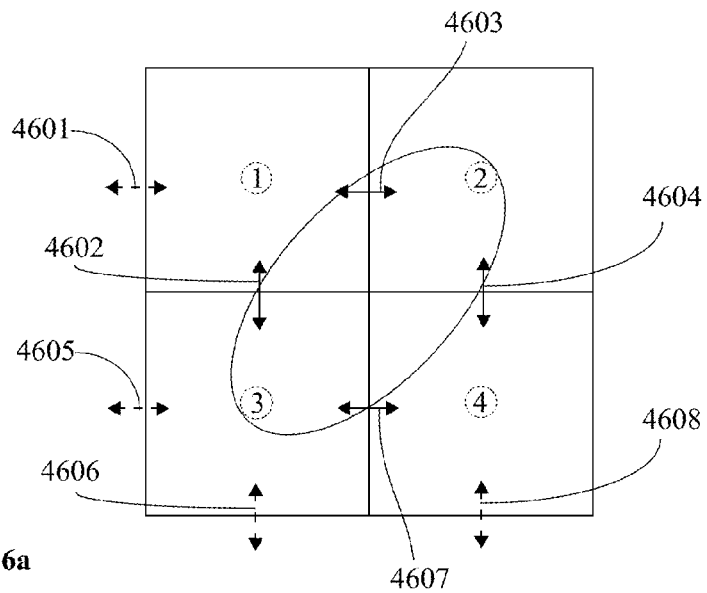
Figure 46B:
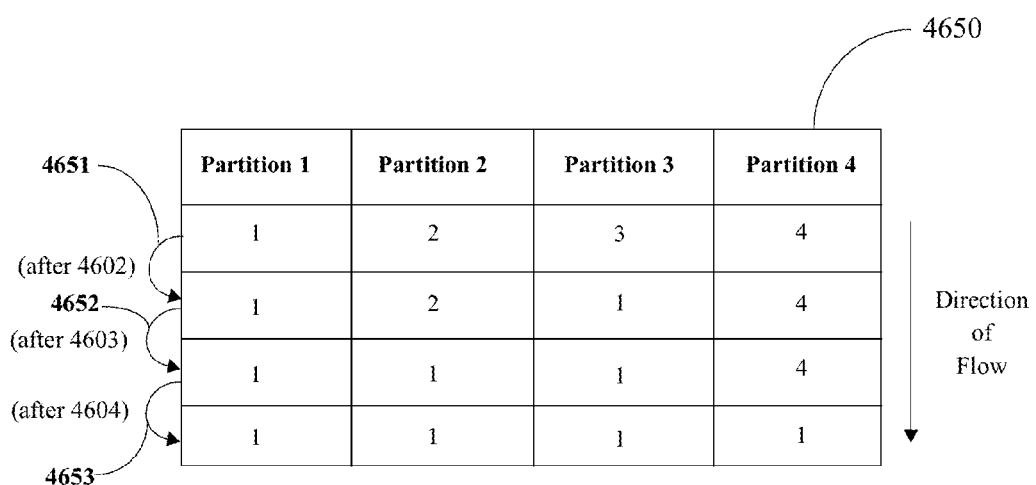

Once a cell is determined to belong to the same blob as the blob in the other partition being compared, the blob ID of the current partition will be updated with the blob ID in the other blob being compared to. FIG. 46*a* illustrates an exemplary comparison between neighboring partitions. The table 4650 in FIG. 46*b* illustrates exemplary steps that are involved in determining the blob IDs in four partitions. As mentioned above, from partition 1 to partition N, neighboring partition to the left is examined, then the neighboring partition below. Steps 4601 through 4608 in FIG. 46*a* illustrate detailed exemplary comparison between neighboring partitions.

For example, if partition 1 contains a blob with a blob ID of 1, and since there is no neighboring partition to the left of partition 1, so the neighboring partition to the bottom of partition 1, partition 3, is examined. Partition 3 initially contains a blob with blob ID of 3, and the blob ID in partition 3 will be overwritten with the blob ID present in partition 1, which is 1 after this blob is determined to belong to the same blob with blob ID of 1. Step 4651 represents this transition. Now the comparisons are made with partition 2 as the base. The blob in the neighboring partition, partition 1, to the left from partition 2, is considered. After the blob in partition 1 is considered to belong to the same blob in partition 2, the blob ID of the blob present in partition 2 will be overwritten with that of partition 1, which is 1. When two partitions contain the same blob, the blob ID of the preceding one is kept. Step 4652 presents this transition. Then the neighboring partition below partition 2—that is, partition 4, is examined. After the blob present in partition 4 is determined to belong to the same blob present in 2, the blob ID of the blob present in partition 4 will be overwritten with the blob ID of the blob present in partition 2, which is 1. Step 4653 represents this transition. The next partition, partition 3, is now examined. There is no neighboring partition to the left or below of partition 3, so this step is skipped, and partition 4 is examined. The neighboring partition to the left of partition 4, partition 3 is examined. The blob in partition 3 and partition 4 are determined to be the same and they have the same blob ID, so there is nothing to be done. There is no neighboring partition below partition 4, so the comparison among partitions is now complete.

The above is again only exemplary. Other implementations are possible, anticipated, and provided for by the invention.

7. Modular and/or Chip Implementations

Figure 47A:
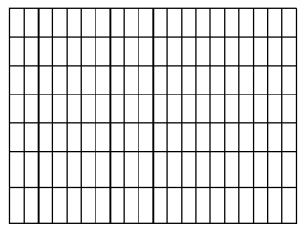
FIG. 47a depicts exemplary arrangements of planar arrays of modules, tiles, or chips as provided for by the invention.
Figure 47B:
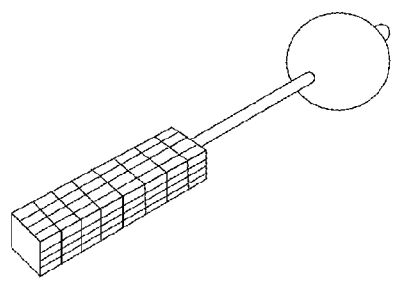
FIG. 47b depicts an exemplary object such as a mallet comprising polygonal or curved cross-sectional handle adorned with piecewise-planar arrays of such modules, chips or tiles.

It is possible to package a small tactile-sensor array with data acquisition hardware and a small processor to create a module or low-profile chip. A chip can be configured to have a tactile sensor on top and a computational processor inside. Such modules or chips can be laid as tiles to form an array. Exemplary arrangements include larger planar arrays of such modules, chips or tiles, such as the example depicted in FIG. 47*a*, or piecewise-planar arrays of such modules, chips or tiles, such as adorning a polygonal or curved cross-sectioned handle of an object such as the mallet depicted in FIG. 47*b*. The "chip" realizations may be designed to permit other types and shapes of tiled assemblies, and may also be fabricated with flat, curved, or flexible surfaces. Additionally, such a modular approach may be realized using flexible or printed electronics, permitting a wider degree of possible surface shapes and applications. In these, each "chip" or other type of module, a processor within may run an instance of the types of distributed algorithms described earlier. Each "chip" or module requires communications with other "chip" or modules in the combined array, as well as power. Further, post-scan computations must be implemented, and results from the post-scan computation need to be output. These and other considerations are addressed in this section.

7.1 Powering and Signal Exchange

Figure 48:
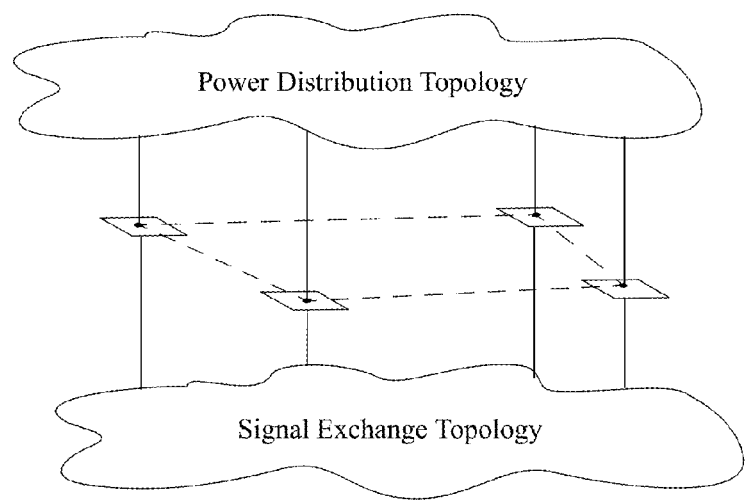
FIG. 48 illustrates an array of "chips" or modules, each connected to a power distribution topology and with a signal exchange topology.

As described above, each "chip" or module requires both power and communications with other processors in a combined array. FIG. 48 illustrates an array of said "chips" or modules, each "chip" or module connected to a power distribution topology and with a signal exchange topology. The power distribution topology and signal exchange topology in comparison may have similar, parallel, or dissimilar structure as may be advantageous in various embodiments for reasons of packaging, performance, each of manufacturing, etc. Further attention will be directed to this in subsequent discussion of packaging and physical interconnection. In one embodiment the chips or modules can be designed so that the physical connections needed for signal transmission are made only with direct neighbors.

7.2 Signal Exchange among Neighboring Modules or Chips

As described above, each "chip" or module in a combined array needs to be interconnected in some way with other "chips" or modules in the combined array so as to exchange signals. The signal interconnection may be, for example, electrical, optical, or a combination of electrical and optical. In some embodiments, electrical power distribution and electrical signal interconnection may be implemented over the same electrical connection, for example using the Dallas Semiconductor 1-wire protocol.

Data processing for an array of chips can be performed by partitioning the array and using relatively simple distributed message-passing algorithms. The chips can direct their output streams to a processor that processes the data and assigns the parameter values that are derived to control signals. Alternatively, in place of a dedicated processor, there can be multiple types of chips. For instance, different types can be used to process the edges and the interiors of regions of contact, or one type can be general purpose while another type is dedicated to input/output. It is also possible for the functions of each type of chip to be programmable. This would enable the user to select the function for each type of chip that is best suited for its location in the chip array. In a more sophisticated implementation, the chips communicate among themselves to determine automatically how they are interconnected and what function is best suited to their location in the array.

An array of chips or modules can be interconnected by a network such as a tapped passive bus, a one- or two-dimensional mode active bus daisy-chain, a centralized, expandable star-wired message-passing element, or other means. It is noted that the chips or modules can be designed so that various logical signal transmission network topologies can be implemented via physical connections made only with directly boarding neighbors. Additionally, it is also noted that the chips or modules can be designed so that all needed communications can be realized via only connections with directly boarding neighbors (i.e., realizing a so-called "Manhattan street network").

Figure 49:
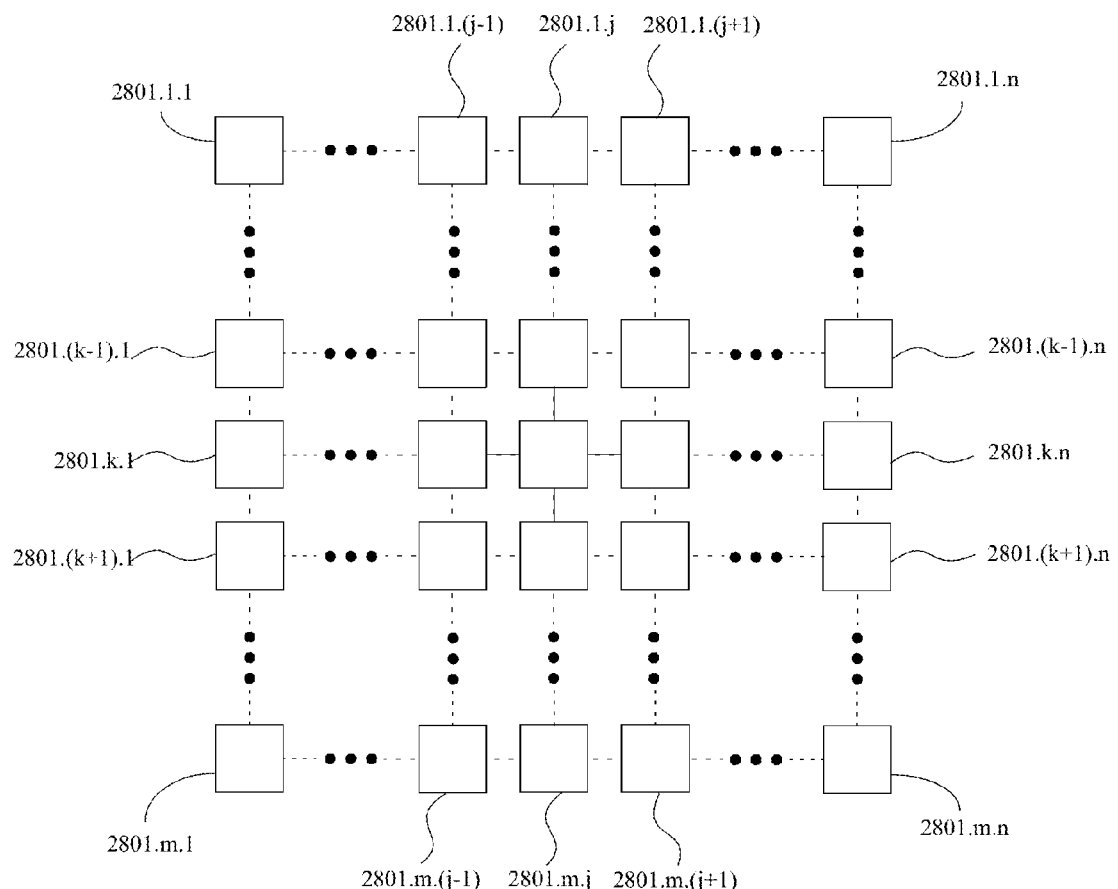
FIG. 49 illustrates an n-column by m-row rectangular array of geometrically square or rectangular chips or modules that share signal connections only with directly boarding neighbors.

FIG. 49 illustrates an n-column by m-row rectangular array of geometrically square or rectangular chips or modules that share signal connections only with directly boarding neighbors. The chips or modules themselves are in many embodiments advantageously geometrically square or rectangular in shape so as to provide intimate neighbor bordering, but other shapes may be used with this interconnection. Alternatively, geometrically triangle or hexagon shaped chips or models may be used so as to provide intimate neighbor bordering, resulting in diagonal interconnection paths.

The chips or modules on the interior of the rectangular array depicted in FIG. 49 have interconnections in keeping with those suggested in FIG. 37. Additionally, there are 2m+2n−4 chips or modules on the edges of the rectangular array, of which four chips or modules are also on a corner of the array. The chips or modules in the interior have four directly boarding neighbors, the chips or modules on edges but not at corners have three directly boarding neighbors, and the chips or modules on the corners have two directly boarding neighbors.

Figure 50:
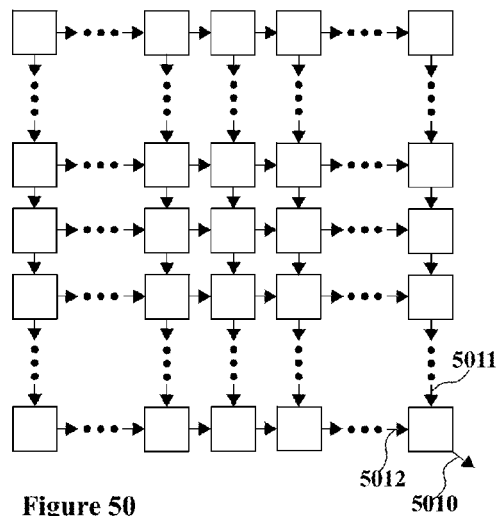
FIG. 50 illustrates exemplary communications among bordering neighbors.

In one embodiment, each of the chips or modules communicates with at least one or two bordering neighbors at power-up or reset so as to comparatively establish their relative position in the rectangular array. In one embodiment, a count-off along a geometrically pre-defined chain is used to sequentially assign a unique index or address to each of the modules or chips. FIG. 50 illustrates an example of how this may be done. In one embodiment of the example, this "count-off" signal flow is predetermined to flow from left-to-right and form forward-to-back (top-to-bottom in the figure). In an embodiment of the example, each chip or module with an edge not connected to a neighboring chip or module determines that fact, either by electrical sense, special electrical termination, absence of signal, or other means. If an edge is determined to have no neighbor, then when an incoming count-off signal and neighbor index arrives from one port, it is sent out the antipodal port and out the orthogonal port that is connected to a neighbor. Arrangements are made so that far edges do not double-count due to incoming signals arriving from both orthogonal directions. A module or chip with no neighbor on either incoming port determines it should start the count-off sequence. A module or chip with no neighbor on either outgoing port determines it is at the complete end of both directions of the count-off sequence.

In another embodiment, there may be a separate count-off sequence for each row and each column, wherein a chip or module that determines it has no neighbor on its incoming port starts the sequence by directing the count-off signal to the neighbor connected to its antipodal port. Other implementations are apparent to one skilled in the art and are provided for by the invention.

Various methods may be used to provide output from the array; for example, by interfacing with one or both of the outgoing ports of the far corner chip or module to produce an output signal 5010 as illustrated in FIG. 50. In this case some distinguishing aspect or special termination condition may be used to ensure the far corner chip or module realizes it is the far corner chip or module. Alternatively, each chip may provide a special port for use as an output, and only the far corner chip has its special port provided with a connection of this type. Other implementations are apparent to one skilled in the art and are provided for by the invention.

Figure 51:
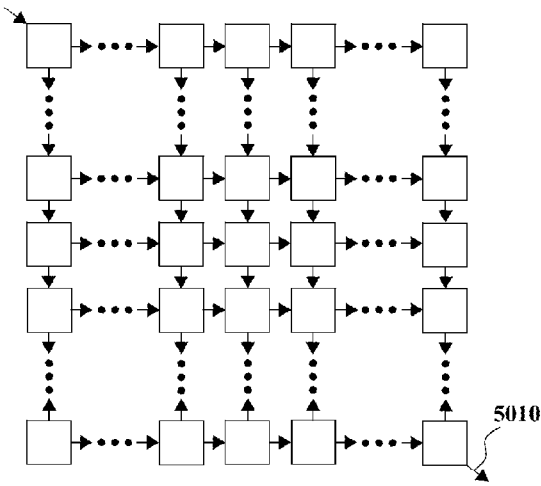
FIG. 51 illustrates an exemplary input port arrangement which may be used to carry the signal flow among the chips or modules.

Similarly, the chip or module on the opposite side of the array may be arranged by similar means to serve as an input port, as suggested in FIG. 51. Such an input port may be used to configure the array, carry clock information, execute testing, diagnostics, etc. Other similar adaptations are provided for by the invention.

Figure 52:
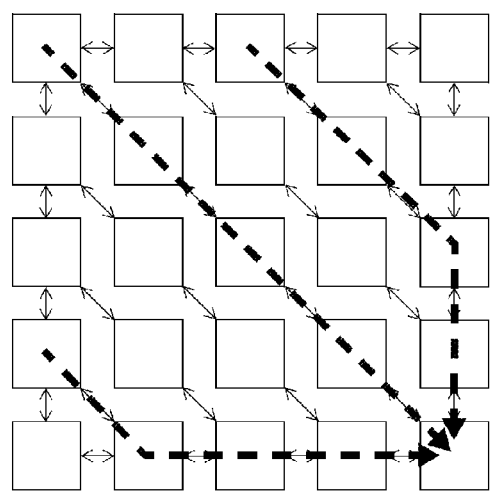
FIGS. 52-54 depicts exemplary diagonal signal flows that may be advantageous or needed for non-convexity and other features.
Figure 53:
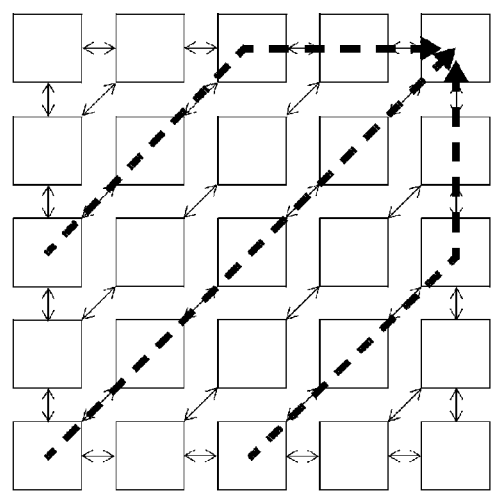
Figure 54:
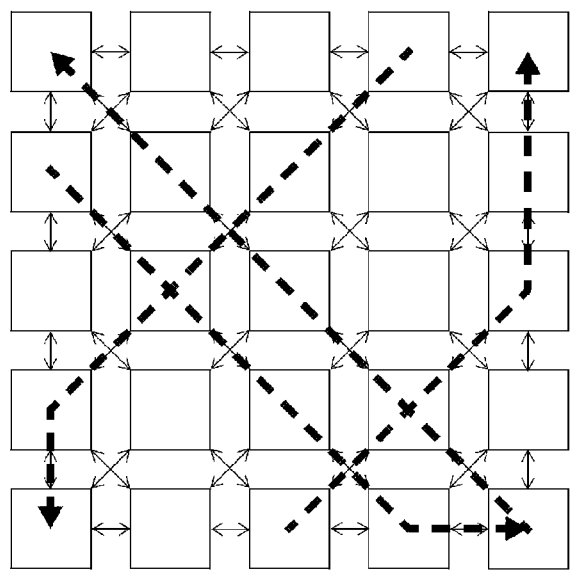

The arrangement of FIG. 51 may be used to carry the signal flow among the chips or modules. Running sums calculated within a neighboring chip or module and other information may be received from a neighbor, combined in some way with local tactile information calculated within and propagated to the next neighbor. In one embodiment, running sums involving rows may combined with internally-calculated running sums within the chip or module, and the sequentially accumulating running sum propagates forward across the row, with a similar arrangement in the column direction for column sums. Similar methods could be used to find minimum and maximum values within the array. More complex quantities, as may be used for least-square calculations, may require additional considerations. Also, provisions for non-convexity and other features may require or benefit from diagonal signal flows such as those depicted in FIGS. 52-54. These diagonal flows may be implemented with dedicated interconnections, or may be realized logically via the physical Manhattan street network interconnection topology depicted in FIGS. 37, 49, 50, and 51.

7.3 Packaging for Adjacent Tiling

The chips or modules described thus far, or variations of them, typically will need to be placed as close to one another as possible in order for the array to provide high performance and/or precision. Advanced seating and connector technologies, as used in laptops and other high-performance miniature consumer electronic devices, can be used to minimize the separation between adjacent chips and to make the top surface of the tiled array smooth. Such chips can be crafted with the profiles of contemporary integrated circuit packages with bottom-interconnect. Creating sensor arrays by tiling such chips or modules make maintaining the tactile sensor array easier and permit replacement of isolated failures.

Figure 55A:
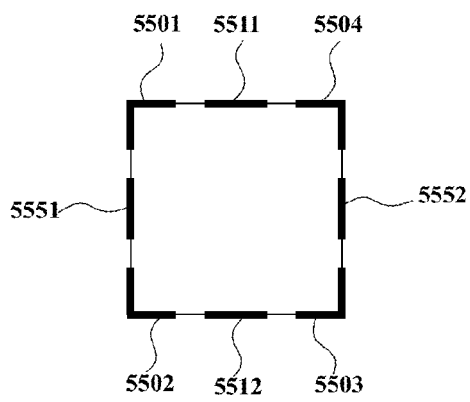
FIGS. 55a-55b depict exemplary packaging and interconnection configurations.
Figure 55B:
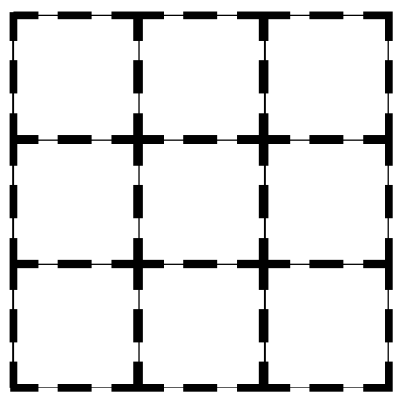

FIG. 55*a* illustrates an exemplary packaging and interconnection configuration. Here rectangularly-aligned electrical or optical interconnection areas 5511, 5512, 5521, 5522 may be used to realize the orthogonal non-diagonal signal interconnection topology depicted in FIGS. 37, 49, 50, and 51. The diagonally-aligned electrical or optical interconnection areas 5501, 5502, 5503, 5504 may be used to realize the orthogonal non-diagonal signal interconnection topology depicted in FIGS. 34-36, or may be used for power distribution. FIG. 55*b* shows how neighboring chips or modules with the exemplary packaging and interconnection configuration depicted in FIG. 55a would be able to interconnect as a result.

Figure 56A:
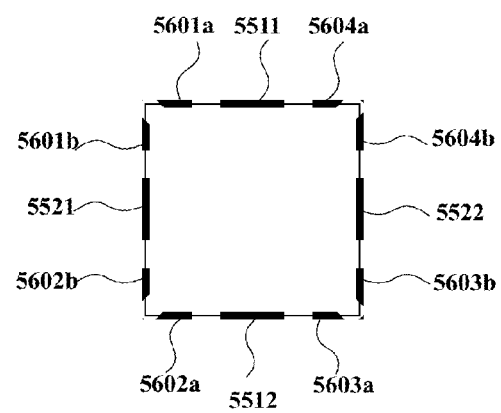
FIGS. 56a-56b depict more complex exemplary packaging and interconnection configurations.
Figure 56B:
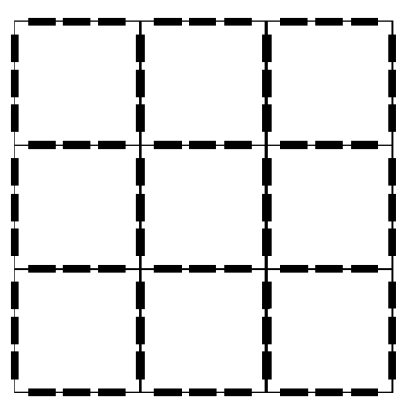

FIG. 56a illustrates another exemplary packaging and interconnection configuration. Here again rectangularly-aligned electrical or optical interconnection areas 5511, 5512, 5521, 5522 may be used to realize the orthogonal non-diagonal signal interconnection topology depicted in FIGS. 37, 49, 50, and 51. However, each of the diagonally-aligned electrical or optical interconnection areas 5501, 5502, 5503, 5504 of FIG. 55a have been split (5601a and 5601b, 5602a and 5602b, 5603a and 5603b, 5604a and 5604b); such an arrangement may be advantageous for power distribution. FIG. 56b shows how neighboring chips or modules with the exemplary packaging and interconnection configuration depicted in FIG. 56b would be able to interconnect as a result.

Other packaging and interconnection approaches are apparent to one skilled in the art and are provided for by the invention.

7.4 Incorporation of Visual Display Components

A flexible, durable film can be affixed to the surface of each chip to protect it from the outside world. Monochrome or color displays can be built into the chips under a transparent or translucent sensor.

While the invention has been described in detail with reference to disclosed embodiments, various modifications within the scope of the invention will be apparent to those of ordinary skill in this technological field. It is to be appreciated that features described with respect to one embodiment typically may be applied to other embodiments. Therefore, the invention properly is to be construed with reference to the claims.

The following is claimed:

1. A user interface system comprising:
    a two-dimensional optical tactile proximity sensor array comprising a two-dimensional array of light emitting diodes (LEDs) wherein at least one of the LEDs is configured to emit modulated light;
    an arrangement for scanning the two-dimensional tactile sensor array, the scan producing a corresponding array of measurement values, wherein the array of measurement values is a two-dimensional data array;
    a processor for processing a plurality of measurement values obtained from the array of measurement values obtained from scanning the two-dimensional array of LEDs;
    a post-scan computation algorithm for deriving at least three independently-adjustable interactive control parameters responsive to at least displacements or angles of contact of a single area of threshold contact or threshold proximity; and
    an algorithmic element for handling of regions of threshold contact or threshold proximity having non-convex shapes,
    wherein the processing is responsive to the modulated light emitted from the at least one LED as reflected from a user finger and sensed by at least one other LED configured, at least at a moment of measurement, as a photodiode;
    wherein the system provides output control signals, the control signals responsive to the independently-adjustable interactive control parameters as measured by the two-dimensional array of LEDs;
    wherein each of the LEDs is configurable to be in a receiving mode to sense the modulated light and to be in a light emitting mode to transmit the modulated light;
    wherein each of the LEDs is configured to be sequentially selected to be set in the receiving mode with adjacent LEDs to the sequentially selected LED configured to be set in the light emitting mode, wherein the LEDs configured to be set in the light emitting mode are modulated by a waveform and the user interface responds to only modulated light signal components extracted from a received light signal modulated by the waveform.

2. The system of claim 1 wherein the two-dimensional LED array also serves as a display.

3. The system of claim 1 wherein the single area of threshold contact or threshold proximity is that of a single fingertip.

4. The system of claim 1 wherein the system further comprises:
    an algorithmic element for identifying a plurality of isolated regions of threshold contact or threshold proximity, and
    an algorithmic element for each of the isolated region of threshold contact or threshold proximity the computation of a plurality of running sums from selected measurement values or functions of selected measurement values for that respective isolated region of threshold contact or threshold proximity,
    wherein the system derives a plurality of independently-adjustable interactive control parameters from each isolated region of threshold contact or threshold proximity of a plurality of parts of the hand.

5. The system of claim 1 wherein the system further comprises an algorithmic element for calculating the rate of change of one or more of the independently-adjustable interactive control parameters.

6. The system of claim 1 wherein the system further comprises an algorithmic element implementing shape recognition functions.

7. The system of claim 1 wherein the system further comprises an algorithmic element implementing gesture recognition functions.

8. The system of claim 1 wherein the system further comprises an algorithmic element for calculating one or more symbols.

9. The system of claim 1 wherein the system further comprises an algorithmic element implementing syntax functions.

10. The system of claim 1 wherein the tactile sensor array is comprises a plurality of partitioned sections.

11. A user interface system comprising:
    a two-dimensional optical tactile proximity sensor array comprising a two-dimensional array of light emitting diodes (LEDs);
    an arrangement for scanning the tactile sensor array, the scan producing a corresponding array of measurement values, wherein the array of measurement values is a two-dimensional data array;
    a processor for computation of a plurality of running sums from a plurality of processed measurement values obtained from processing the array of measurement values obtained from the scanning the two-dimensional array of LEDs;
    a post-scan computation algorithm for deriving at least three independently adjustable interactive control parameters responsive to at least displacements or angles of contact of a single area of threshold contact or threshold proximity using the measurement values obtained from the two-dimensional array of LEDs; and
    an algorithmic element for calculating a rate of change of one or more of the independently-adjustable interactive control parameters, wherein the two-dimensional LED array also serves as a display, and an output to output control signals, the control signals responsive to the independently-adjustable interactive control parameters as measured by the two-dimensional array of LEDs;

wherein each of the LEDs is configurable to be in a receiving mode to sense modulated light and to be in a light emitting mode to transmit the modulated light;

wherein each of the LEDs is configured to be sequentially selected to be set in the receiving mode with adjacent LEDs to the sequentially selected LED configured to be set in the light emitting mode, wherein the LEDs configured to be set in the light emitting mode are modulated by a waveform and the user interface responds to only modulated light signal components extracted from a received light signal modulated by the waveform.

12. The system of claim 11 wherein the modulated light emitted from at least one LED configured to be in the light emitting mode is reflected from a user finger and sensed by at least one other LED configured to be in the receiving mode.

13. The system of claim 11 wherein the single area of threshold contact or threshold proximity is that of a single fingertip.

14. The system of claim 11 wherein the system further comprises:
- an algorithmic element for identifying a plurality of isolated regions of threshold contact or threshold proximity; and
- an algorithmic element for each of the isolated region of threshold contact or threshold proximity the computation of a plurality of running sums from selected measurement values or functions of selected measurement values for that respective isolated region of threshold contact or threshold proximity,
- wherein the system derives a plurality of independently-adjustable interactive control parameters from each isolated region of threshold contact or threshold proximity of a plurality of parts of the hand.

15. The system of claim 11 wherein the system further comprises an algorithmic element for handling of regions of threshold contact or threshold proximity having non-convex shapes.

16. The system of claim 11 wherein the system further comprises an algorithmic element implementing shape recognition functions.

17. The system of claim 11 wherein the system further comprises an algorithmic element implementing gesture recognition functions.

18. The system of claim 11 wherein the system further comprises an algorithmic element for calculating one or more symbols.

19. The system of claim 11 wherein the system further comprises an algorithmic element implementing parsing functions.

20. The system of claim 11 wherein the tactile sensor array is comprises a plurality of partitioned sections.

* * * * *